(12) United States Patent
Heo et al.

(10) Patent No.: US 11,438,579 B2
(45) Date of Patent: Sep. 6, 2022

(54) METHOD AND APPARATUS FOR PROCESSING VIDEO SIGNAL BY USING INTRA-PREDICTION

(71) Applicant: LG ELECTRONICS INC., Seoul (KR)

(72) Inventors: Jin Heo, Seoul (KR); Seunghwan Kim, Seoul (KR); Junghak Nam, Seoul (KR); Sunmi Yoo, Seoul (KR); Ling Li, Seoul (KR); Jaehyun Lim, Seoul (KR); Jangwon Choi, Seoul (KR); Jungah Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/257,169

(22) PCT Filed: Jul. 2, 2019

(86) PCT No.: PCT/KR2019/008004
§ 371 (c)(1),
(2) Date: Dec. 30, 2020

(87) PCT Pub. No.: WO2020/009400
PCT Pub. Date: Jan. 9, 2020

(65) Prior Publication Data
US 2021/0281833 A1      Sep. 9, 2021

Related U.S. Application Data

(60) Provisional application No. 62/696,784, filed on Jul. 11, 2018, provisional application No. 62/692,885, filed on Jul. 2, 2018.

(51) Int. Cl.
*H04N 19/132* (2014.01)
*H04N 19/105* (2014.01)
(Continued)

(52) U.S. Cl.
CPC ........ *H04N 19/105* (2014.11); *H04N 19/132* (2014.11); *H04N 19/176* (2014.11); *H04N 19/423* (2014.11); *H04N 19/44* (2014.11)

(58) Field of Classification Search
None
See application file for complete search history.

(56) References Cited

U.S. PATENT DOCUMENTS 9,420,294 B2    8/2016  Jeon et al.
11,089,299 B2 *  8/2021  Lee ...................... H04N 19/105
(Continued)

FOREIGN PATENT DOCUMENTS

JP     2018-50151 A      3/2018
KR   10-2018-0026718 A   3/2018
WO    2018/062702 A1     4/2018

*Primary Examiner* — Shadan E Haghani
(74) *Attorney, Agent, or Firm* — Dentons US LLP

(57) ABSTRACT

Embodiments of the present disclosure provide a method and an apparatus for processing a video signal through intra prediction. A method for processing a video signal according to an embodiment of the present disclosure may include: checking that intra prediction is applied to a current block including a current sample to be predicted; determining a first reference sample value on a first reference location from at least one of samples positioned at an upper horizontal line and a left vertical line adjacent to the current block, based on an intra-prediction direction of the current block; determining a second reference sample value on a second reference location positioned in an opposite direction to the intra-prediction direction from a location of the current sample or the first reference location; determining a distance between the first reference location and the current sample as a first distance and determining a distance between the second reference location and the current sample as a second distance; and generating a prediction value of the current sample using the linear interpolation prediction based on a (Continued)

sample value of the first reference sample, the first distance, a sample value of the second reference sample, and the second distance.

9 Claims, 53 Drawing Sheets

(51) Int. Cl.
*H04N 19/176* (2014.01)
*H04N 19/423* (2014.01)
*H04N 19/44* (2014.01)

(56) References Cited

U.S. PATENT DOCUMENTS

| | | | |
|---|---|---|---|
| 2014/0010295 A1* | 1/2014 | Lu | H04N 19/14 |
| | | | 375/240.12 |
| 2017/0180751 A1 | 6/2017 | Suzuki et al. | |
| 2020/0120359 A1* | 4/2020 | Hanhart | H04N 19/167 |

* cited by examiner

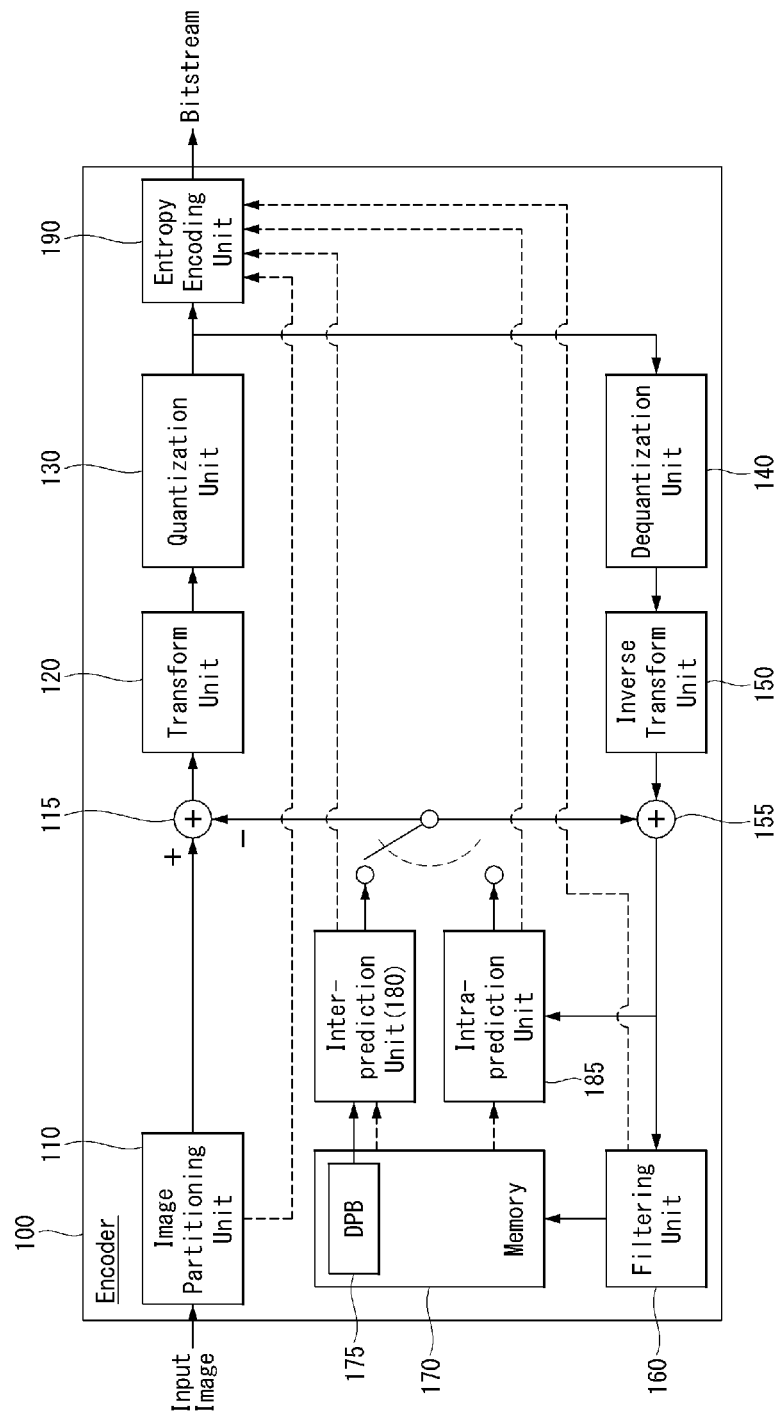
[FIG. 1]

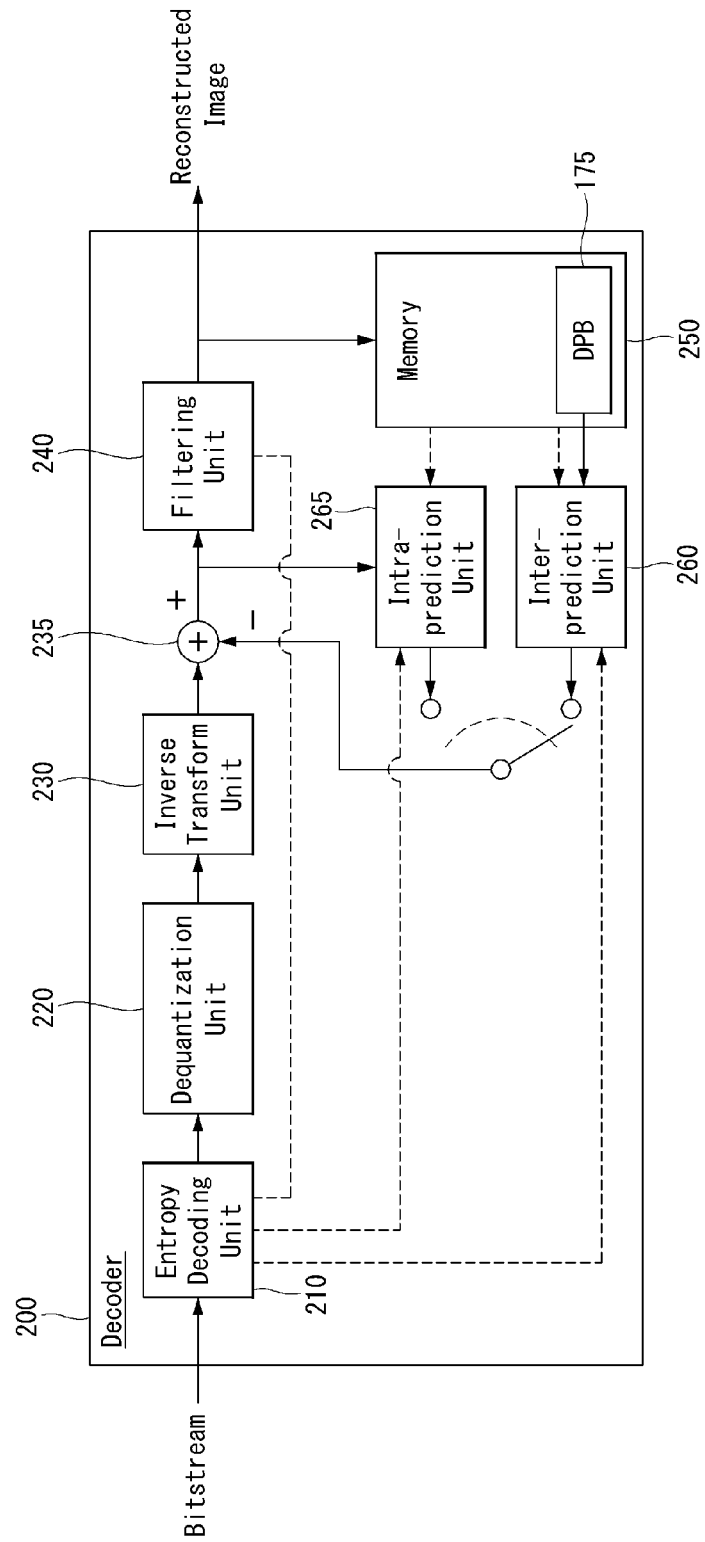
[FIG. 2]

[FIG. 3]
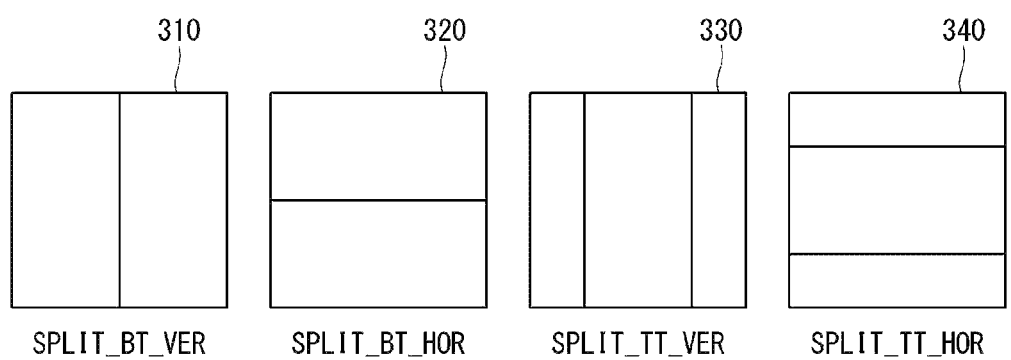

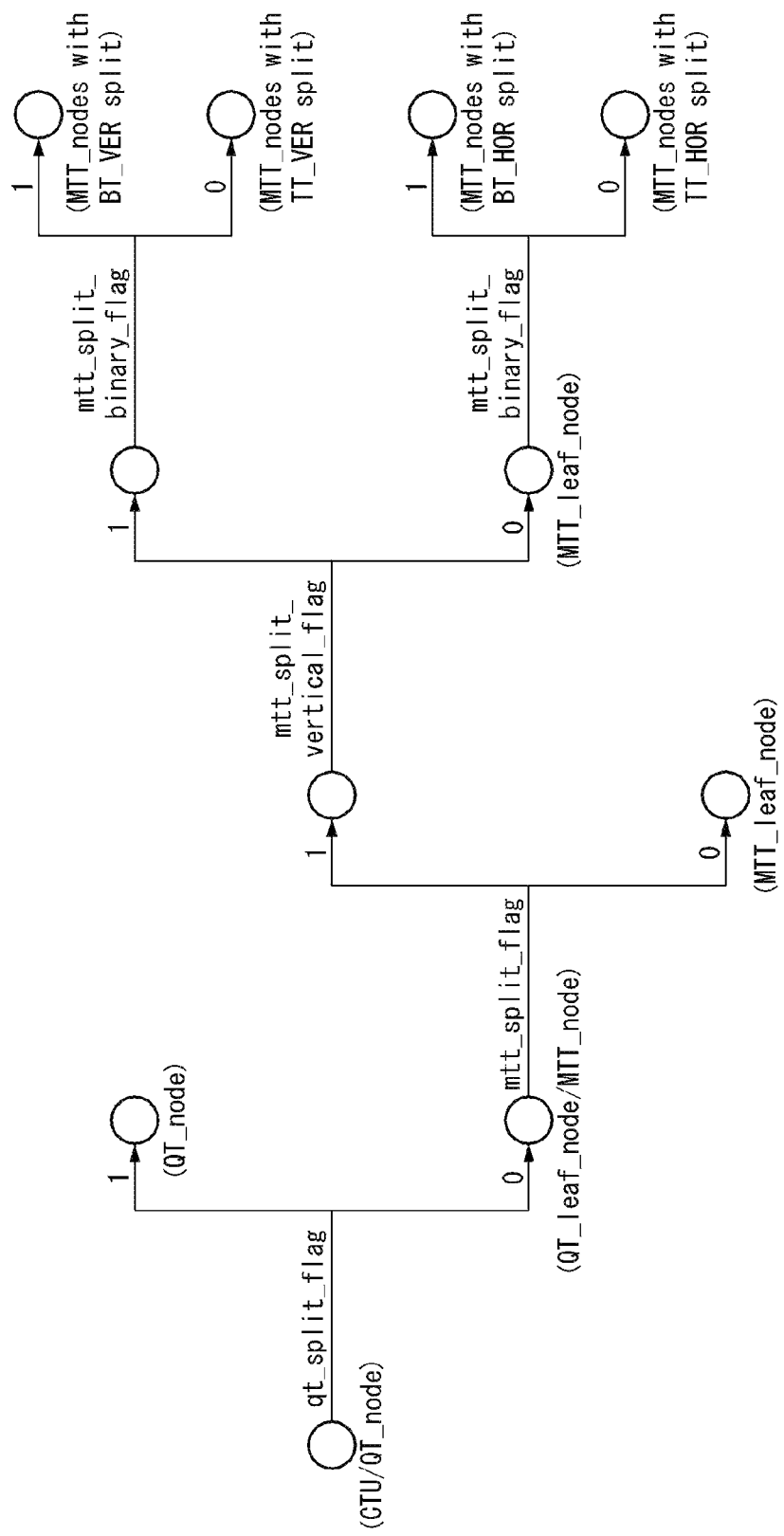
[FIG. 4]

[FIG. 5]
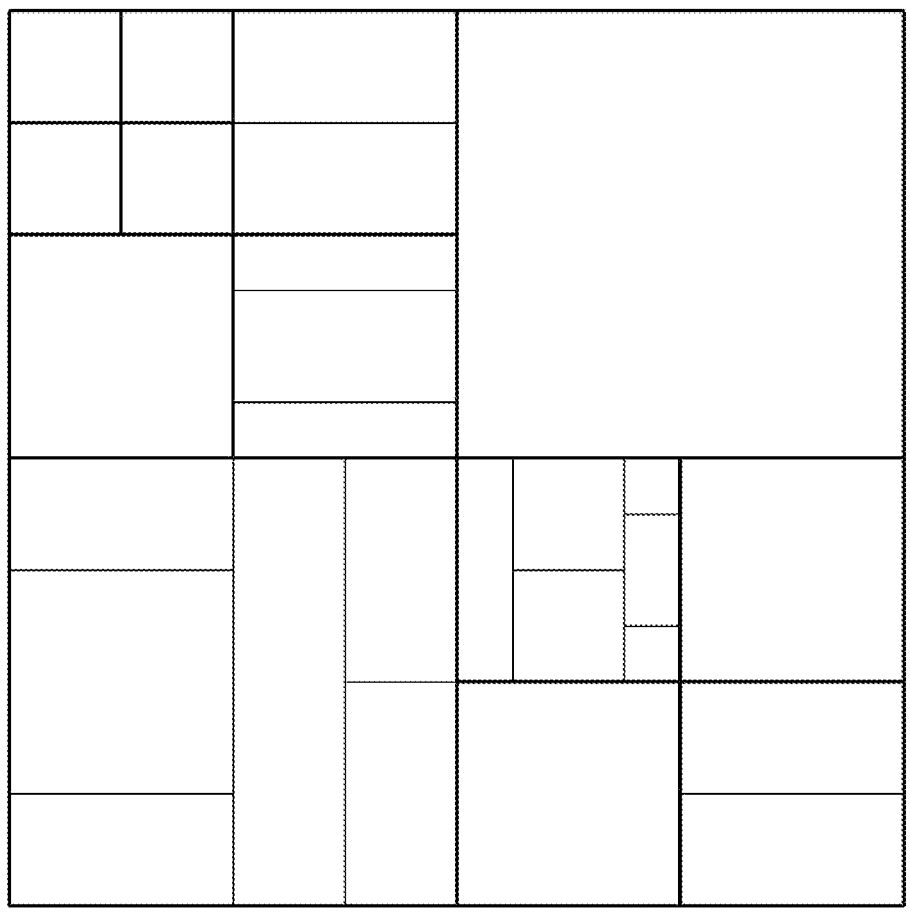

[FIG. 6]
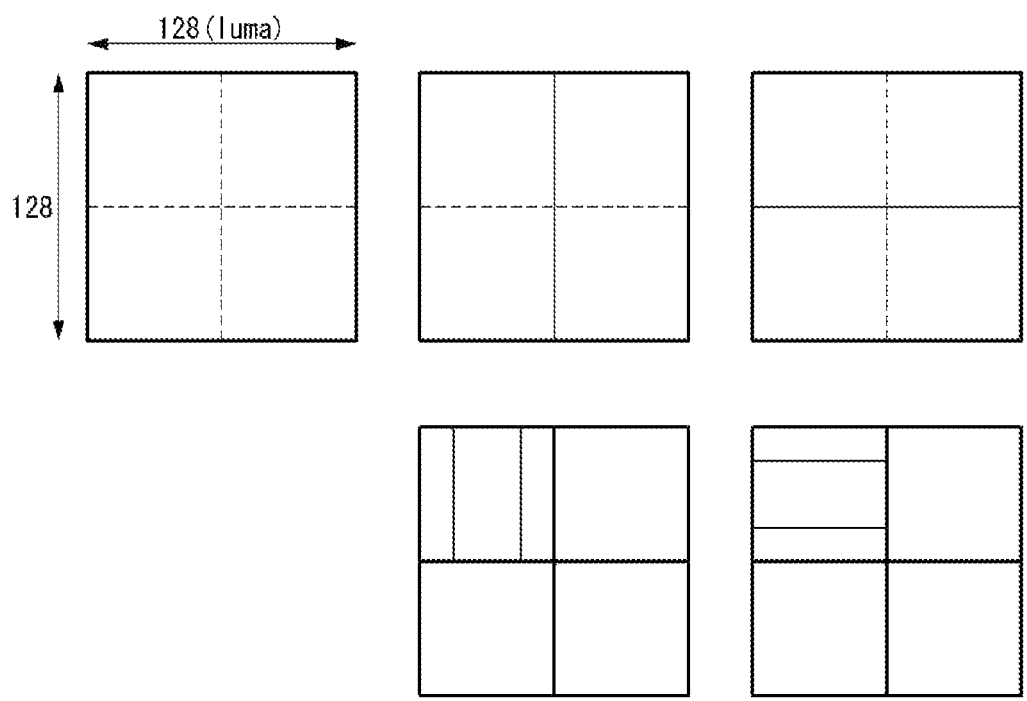

[FIG. 7]
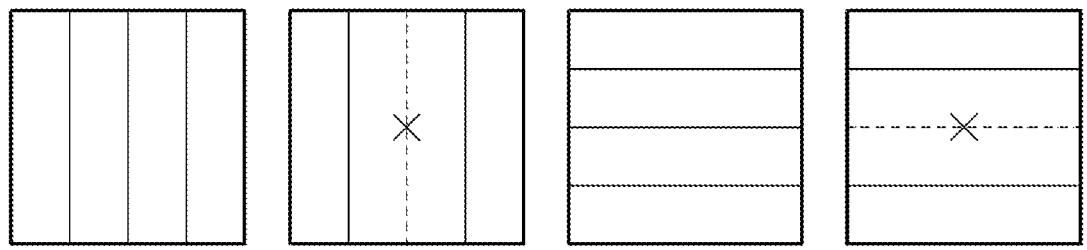

[FIG. 8]
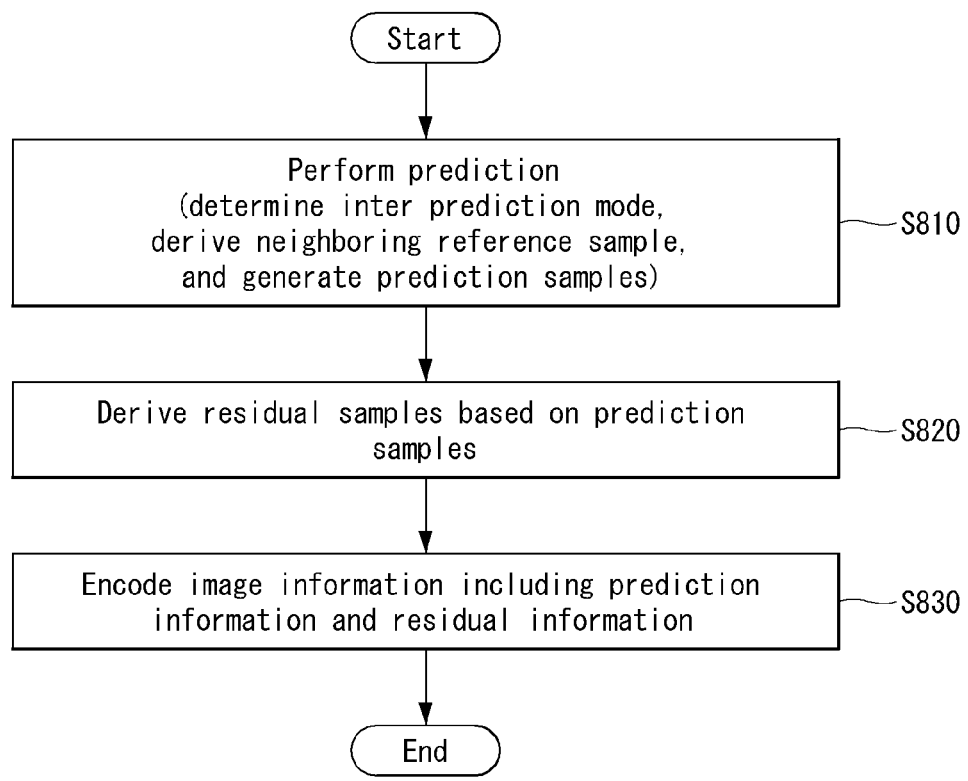

[FIG. 9]
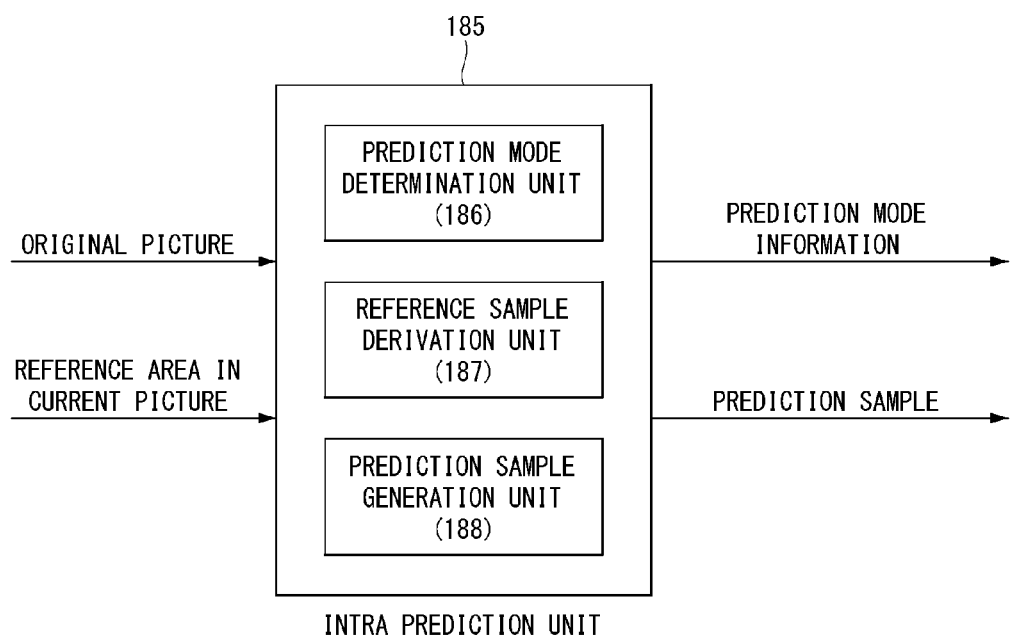

[FIG. 10]
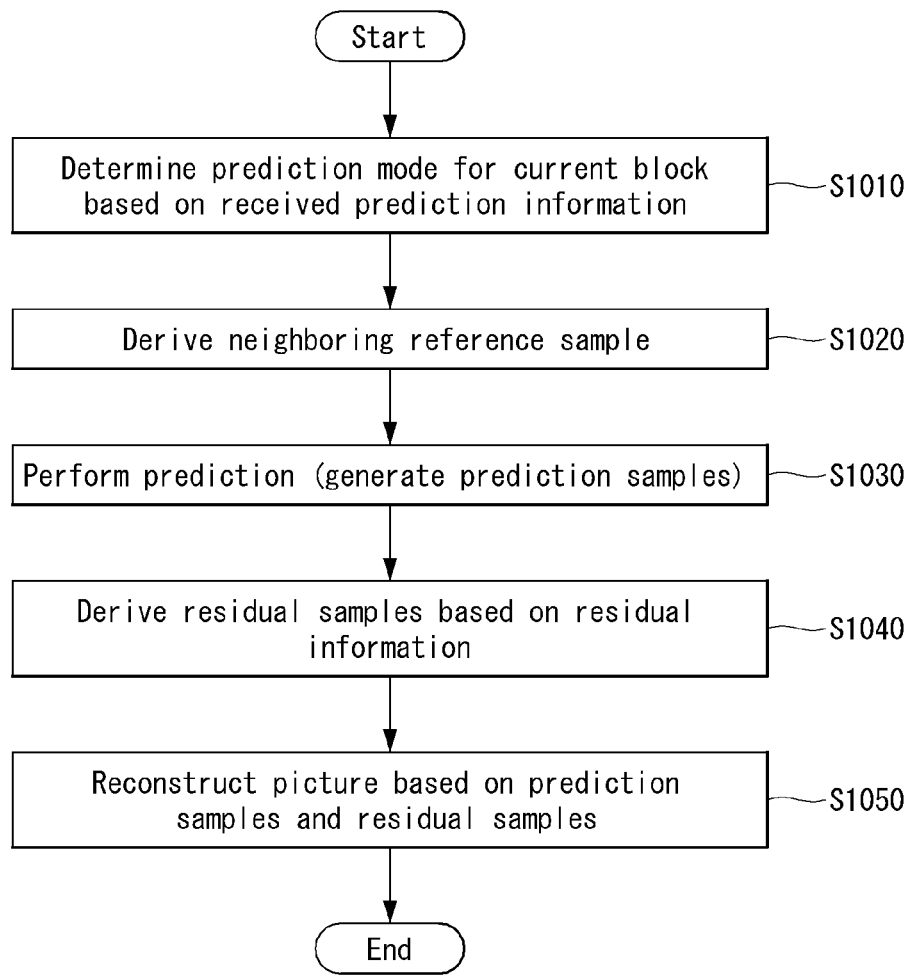

[FIG. 11]
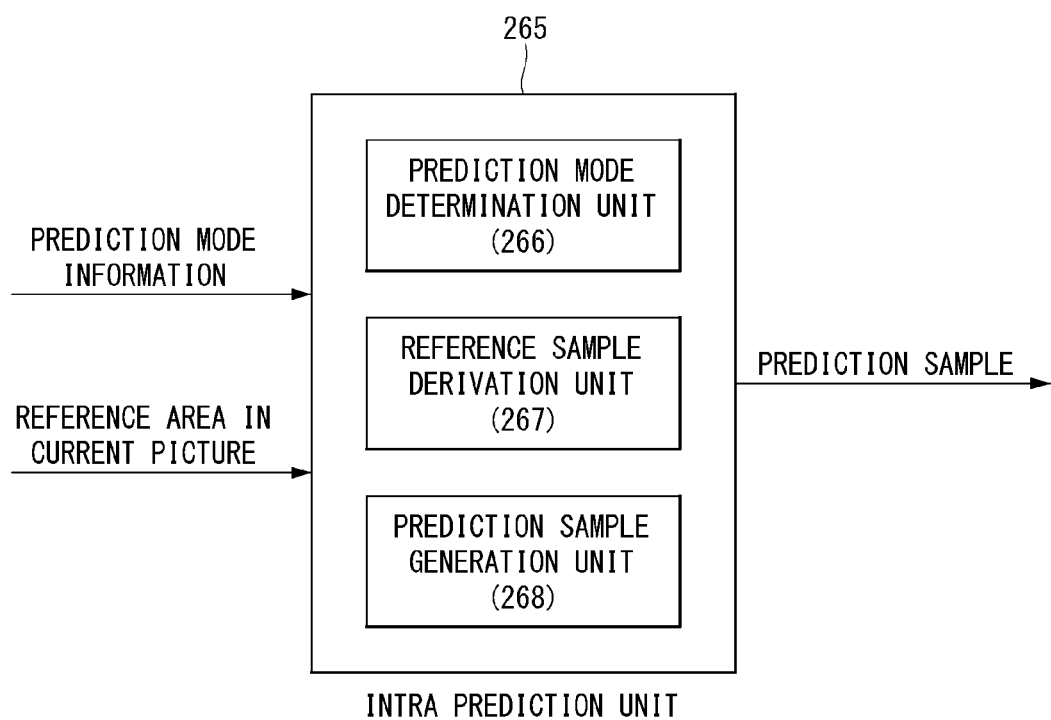

[FIG. 12]
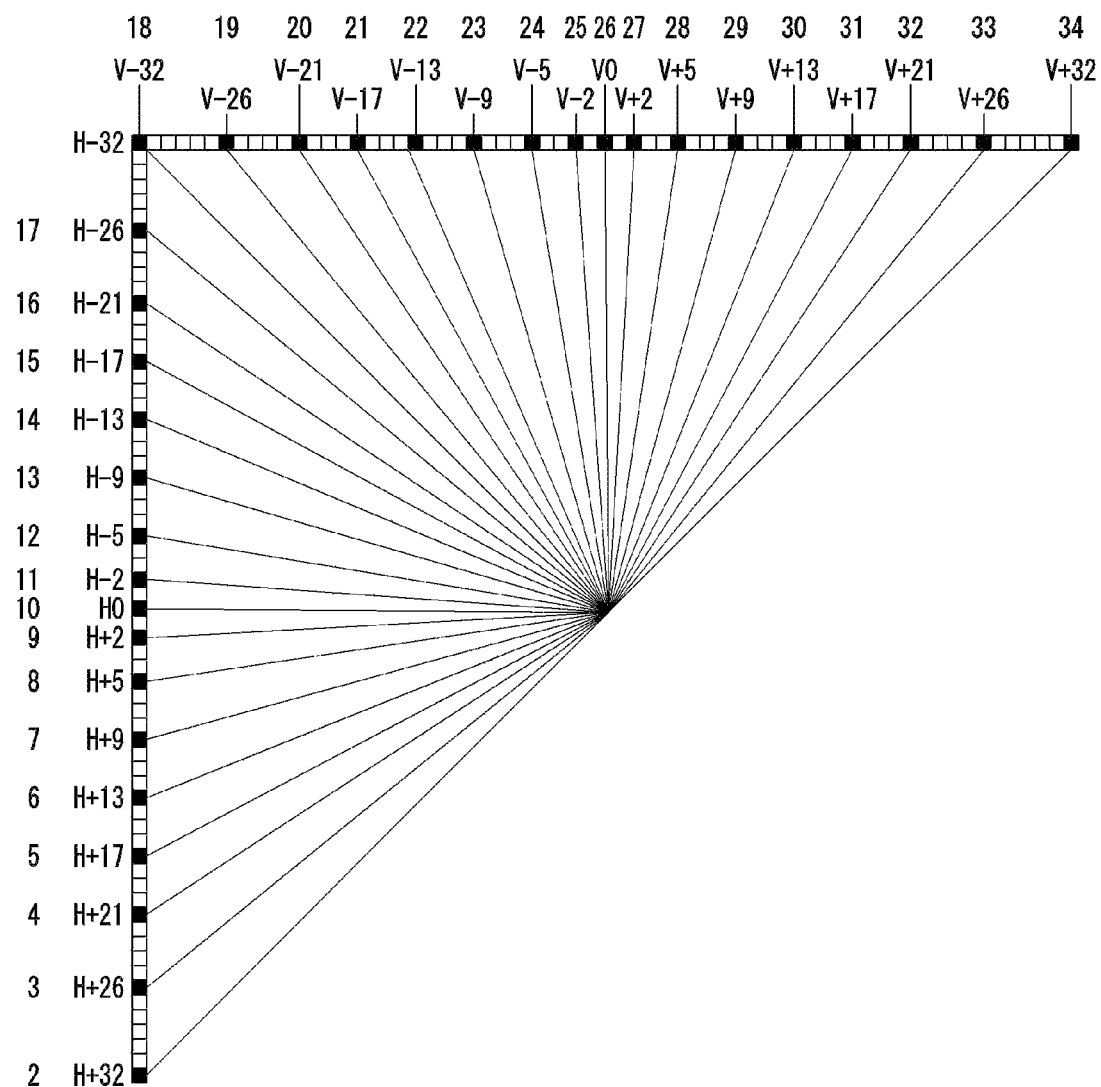

[FIG. 13]
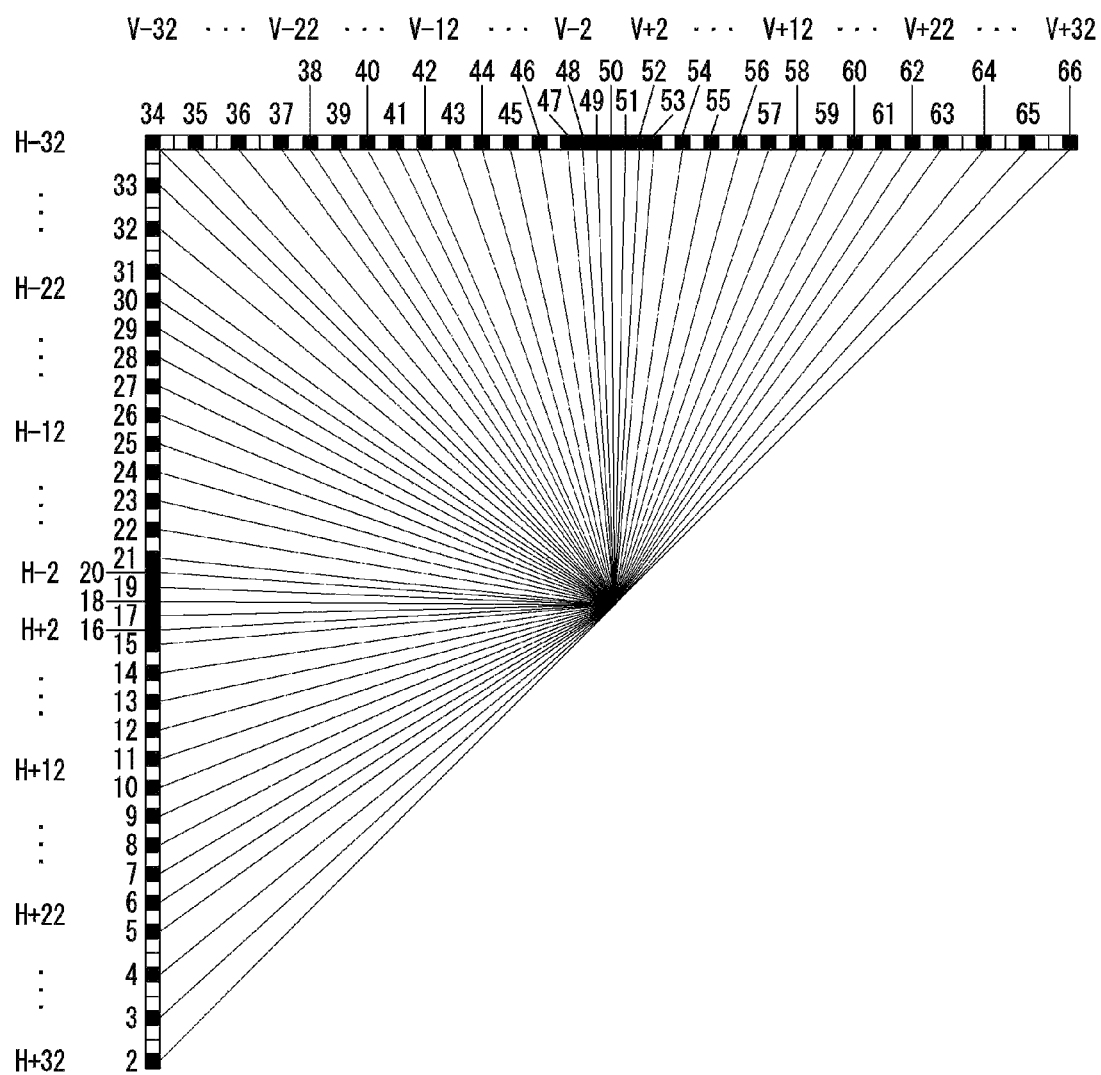

[FIG. 14]
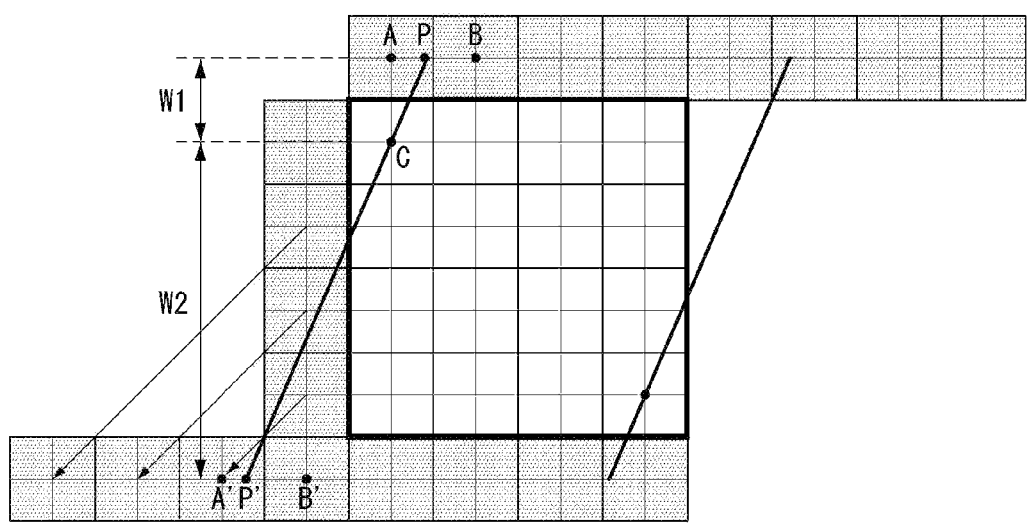

[FIG. 15]
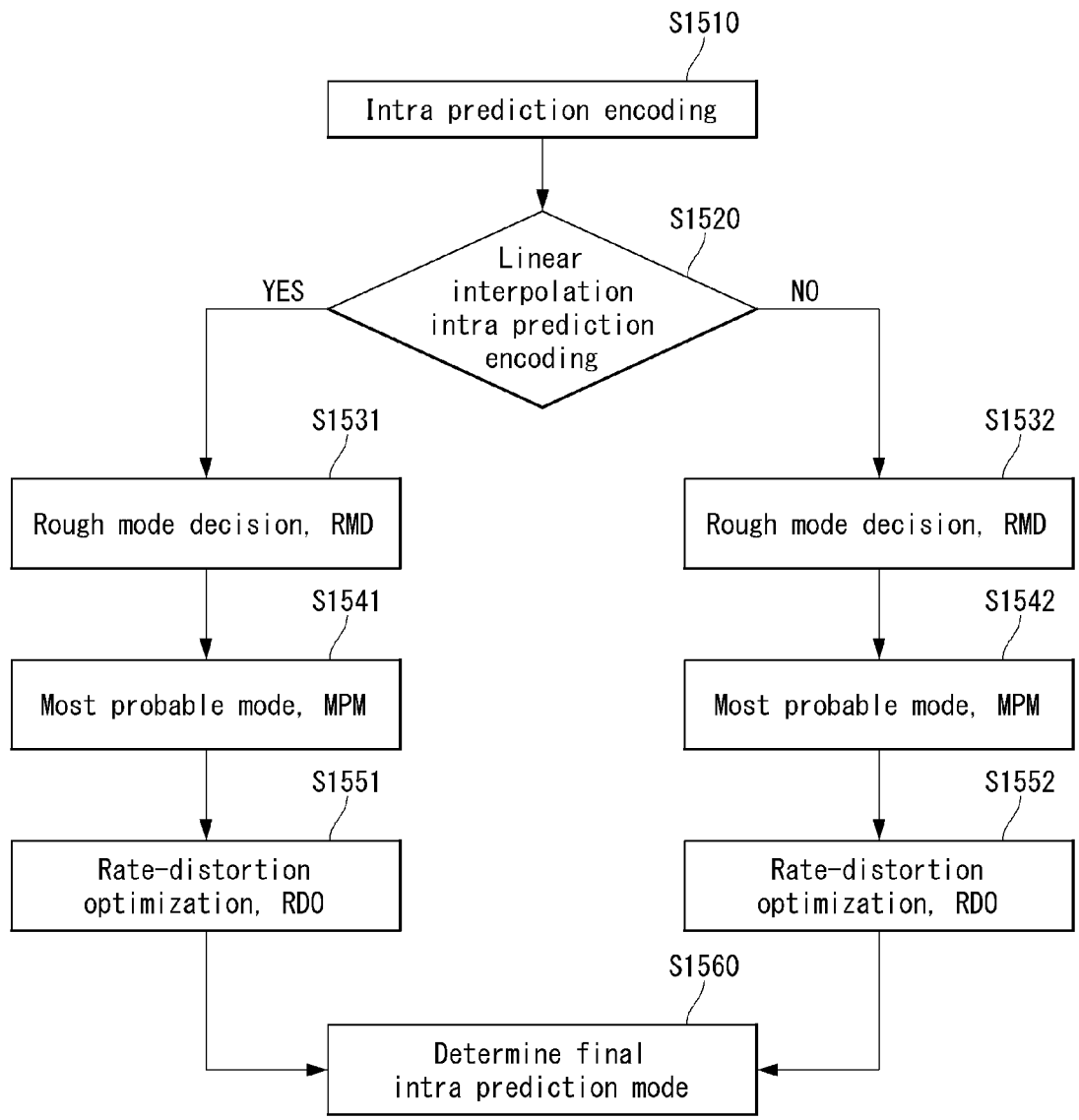

[FIG. 16]
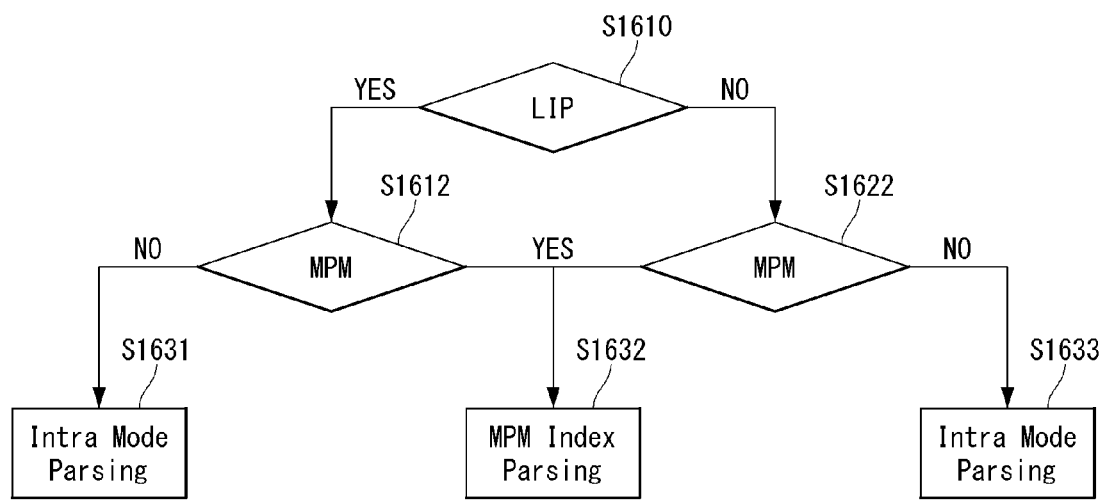

[FIG. 17]
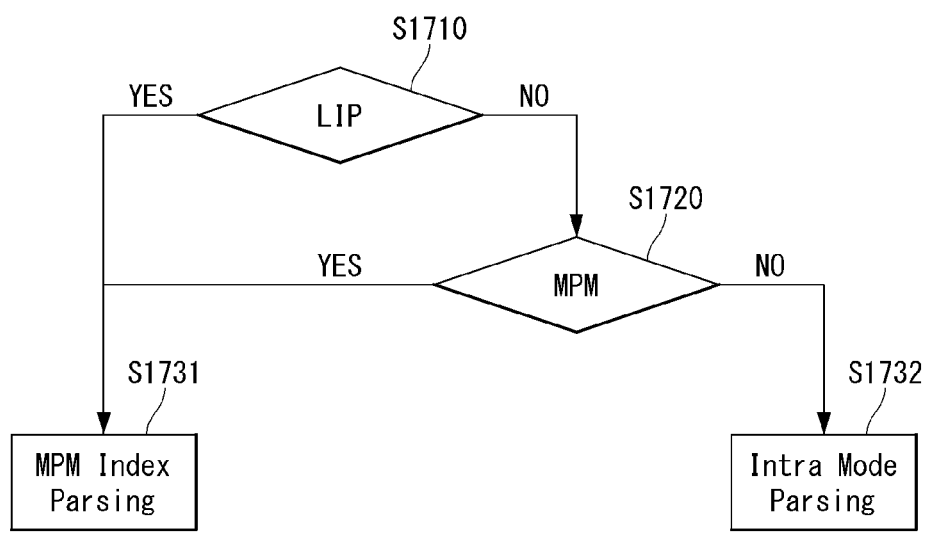

[FIG. 18]
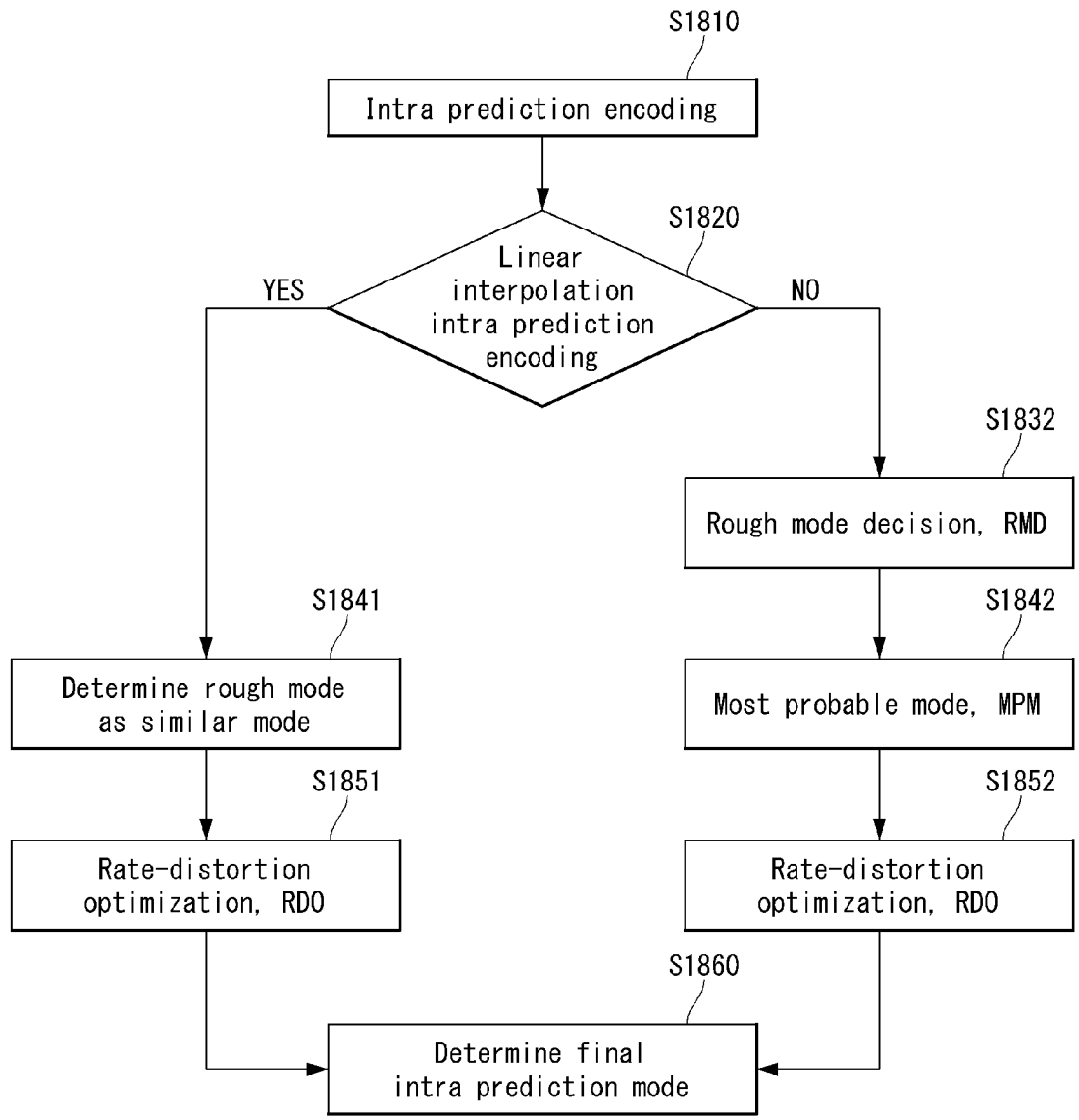

[FIG. 19]
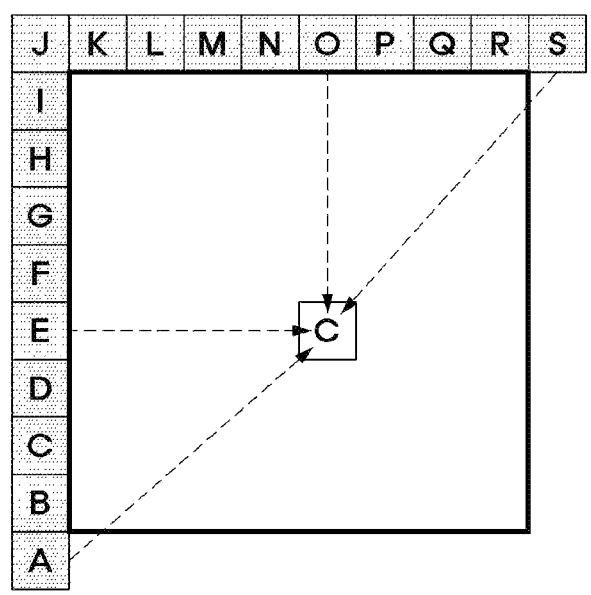

[FIG. 20]
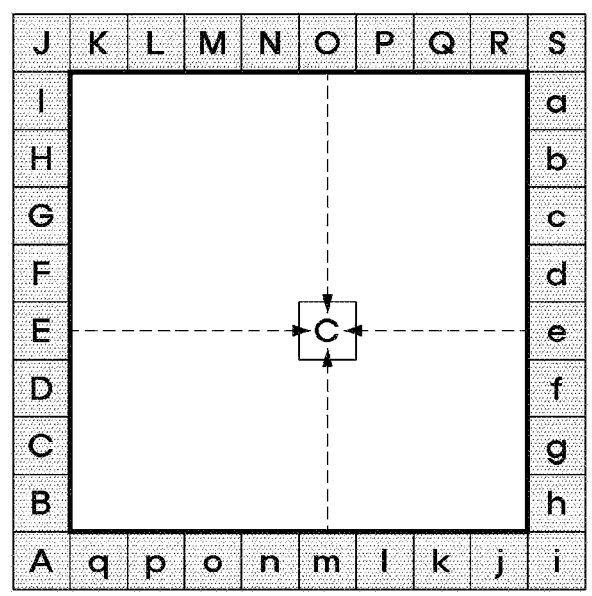

[FIG. 21]
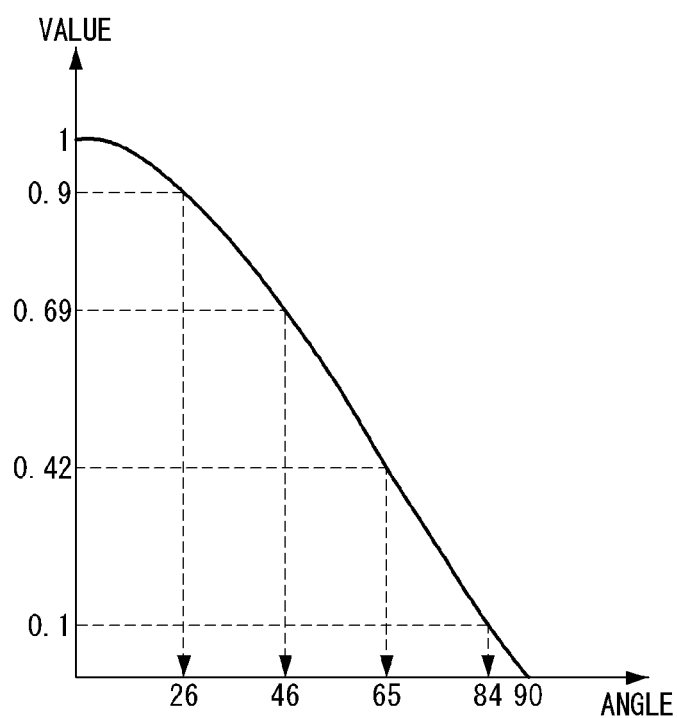

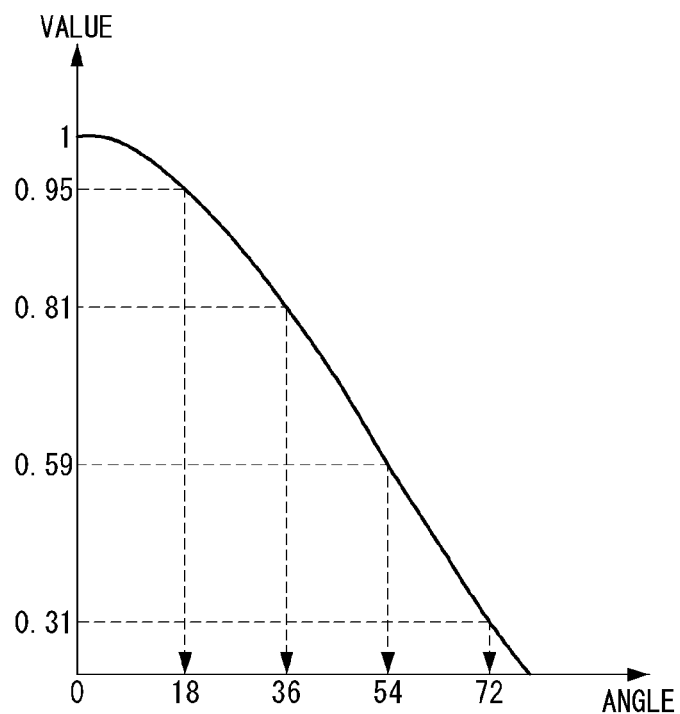
[FIG. 22]

[FIG. 23]
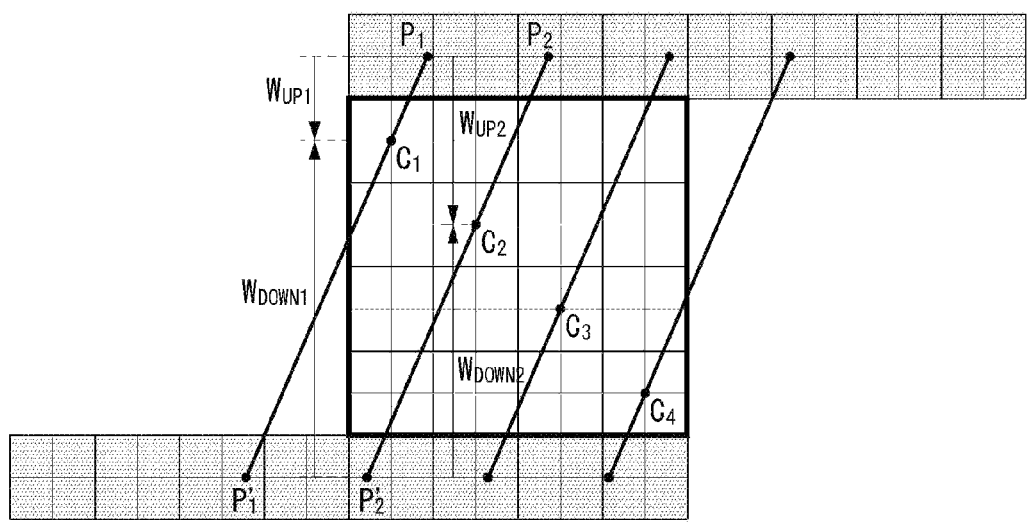

[FIG. 24]
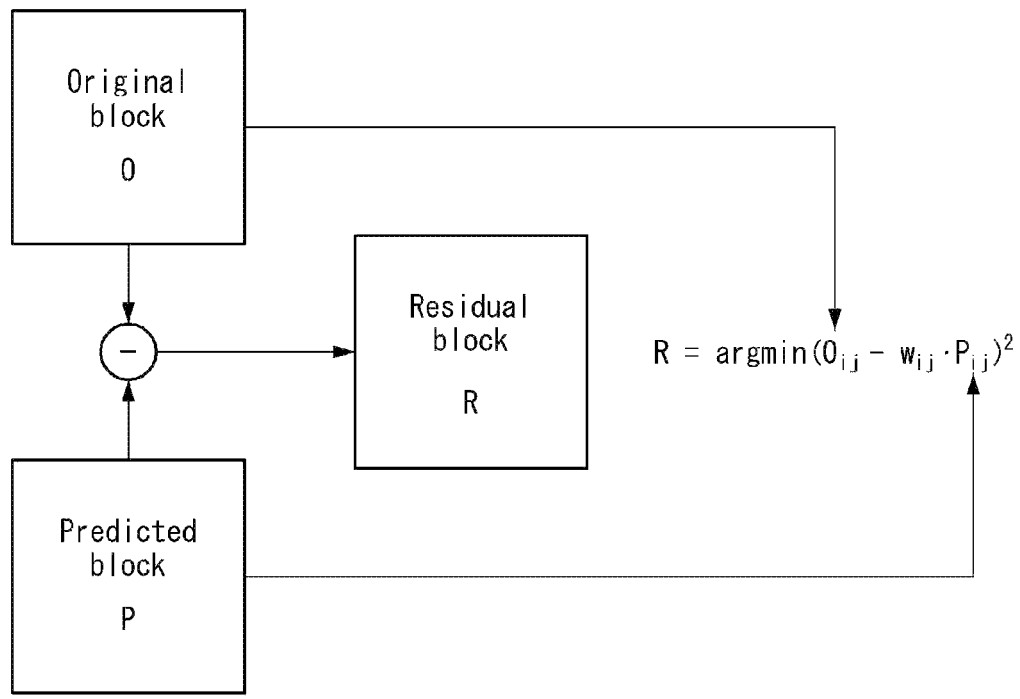

[FIG. 25]
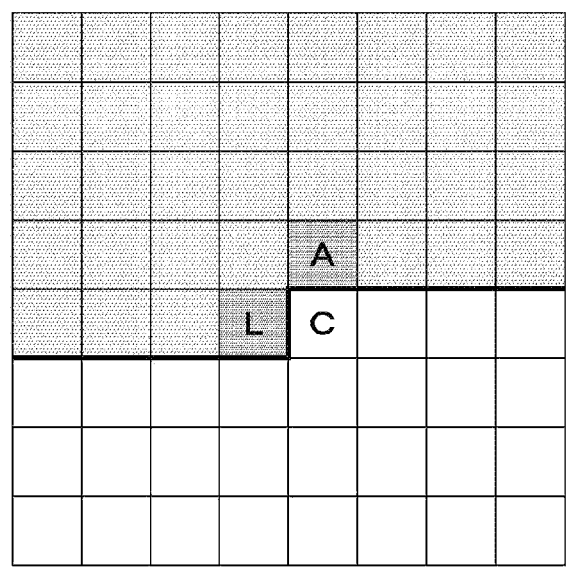

[FIG. 26]
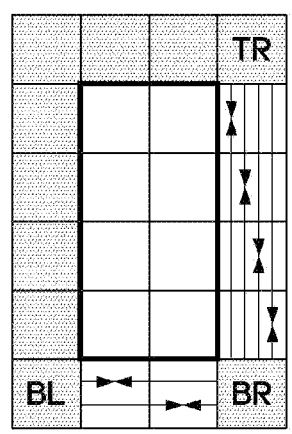

[FIG. 27]
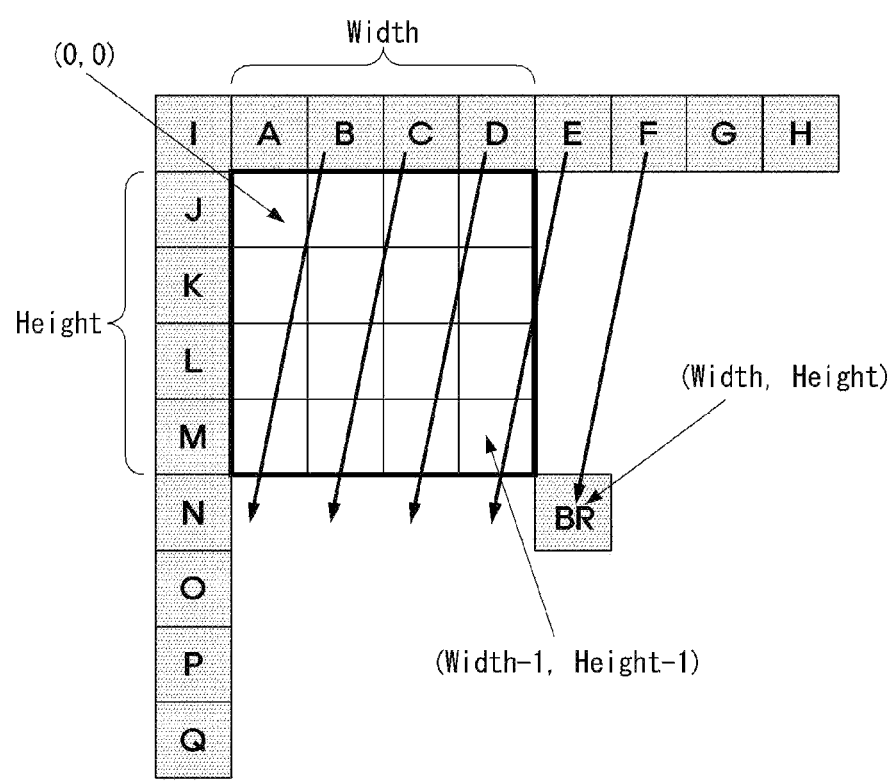

[FIG. 28]
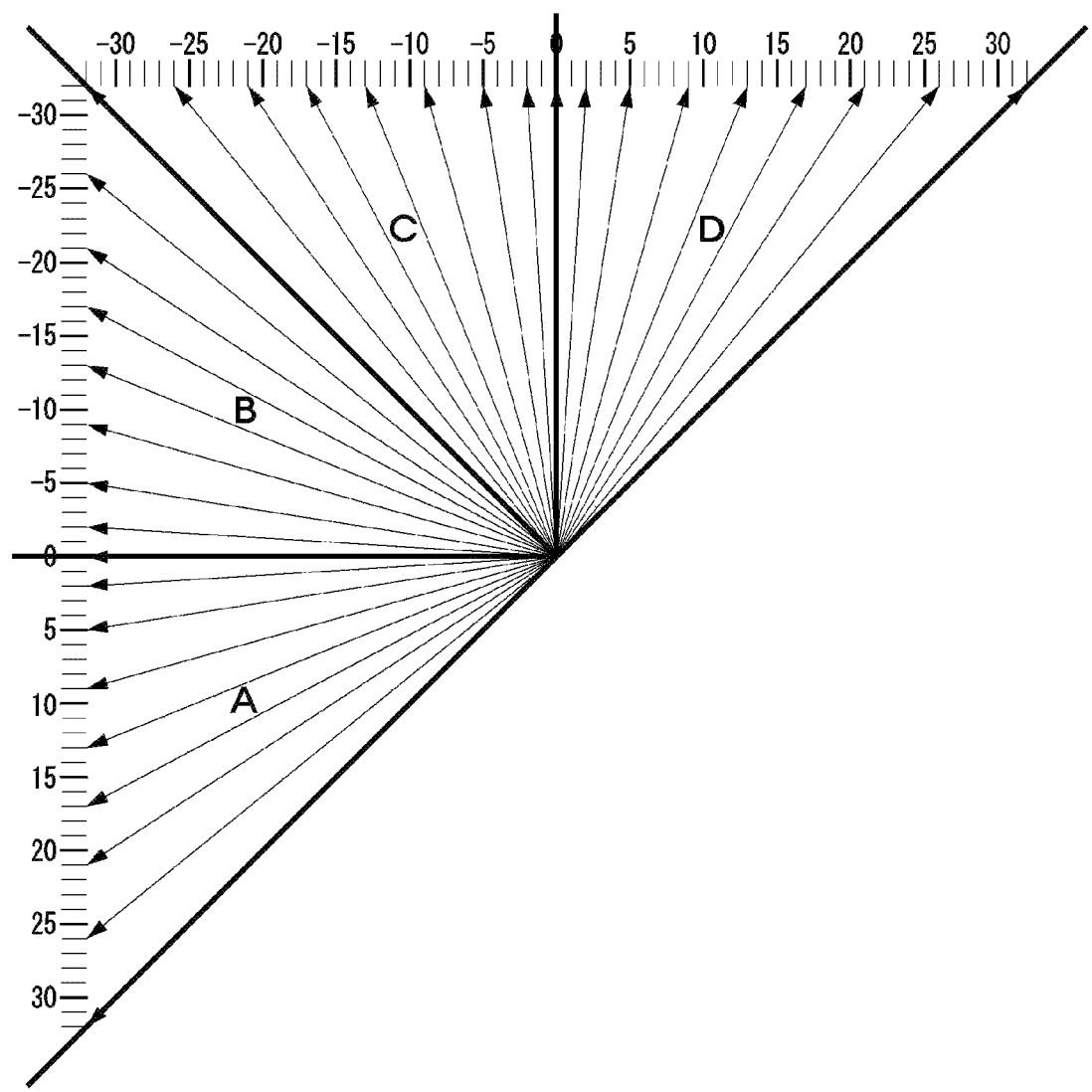

[FIG. 29]
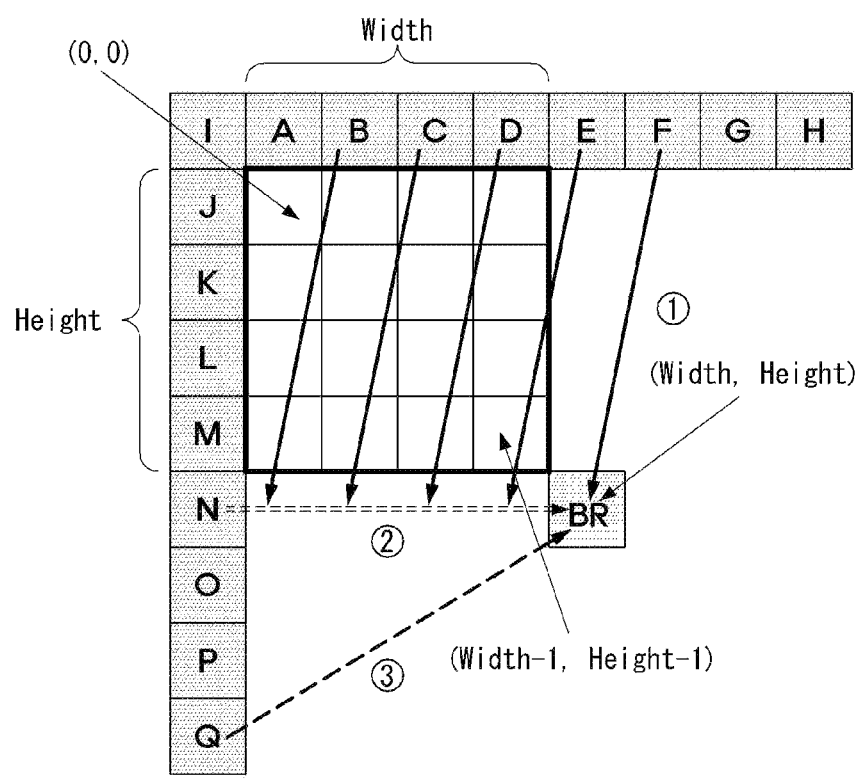

[FIG. 30]

BR POSITION IN ORIGINAL IMAGE

BLOCK TO BE CURRENTLY ENCODED

[FIG. 31]
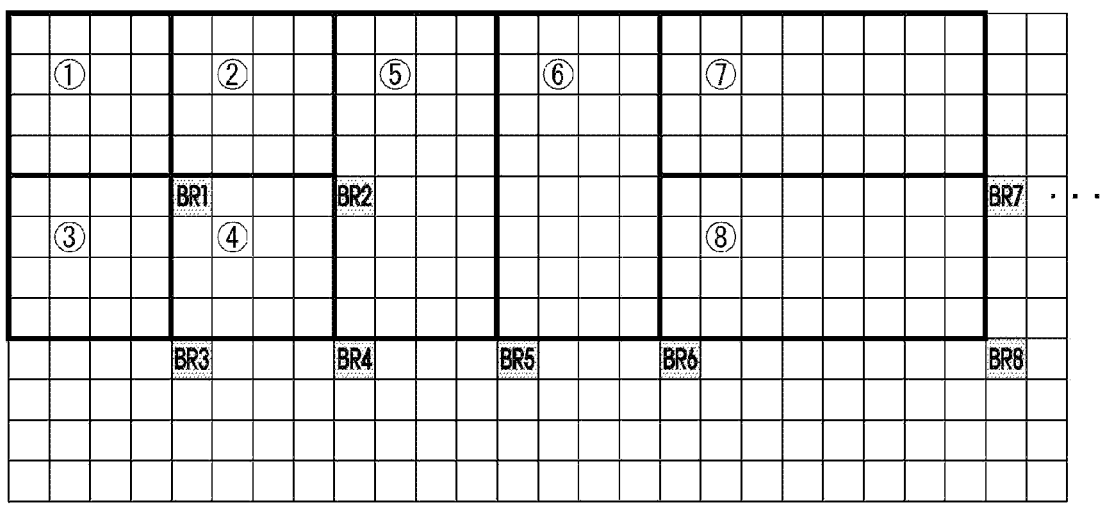

[FIG. 32]
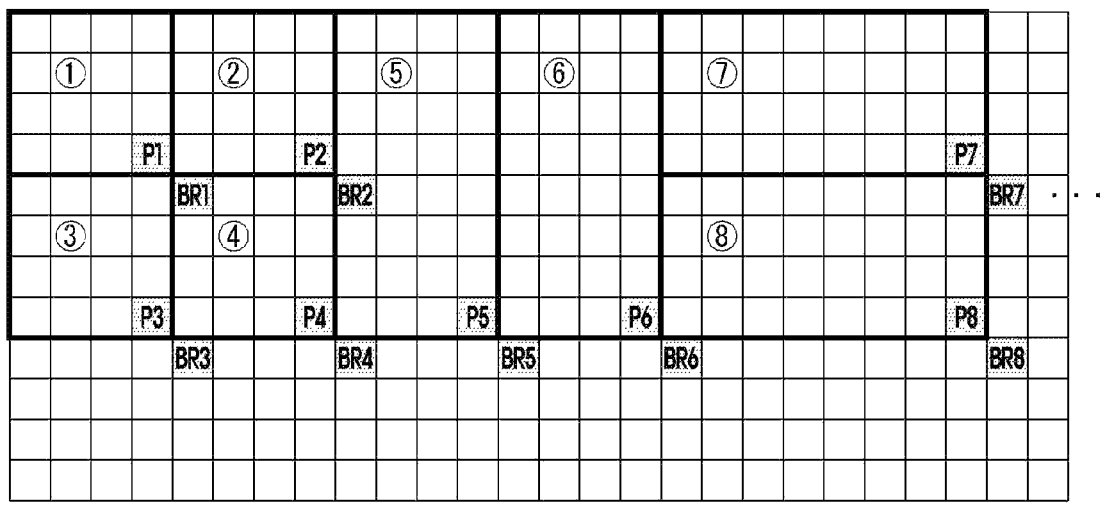

[FIG. 33]
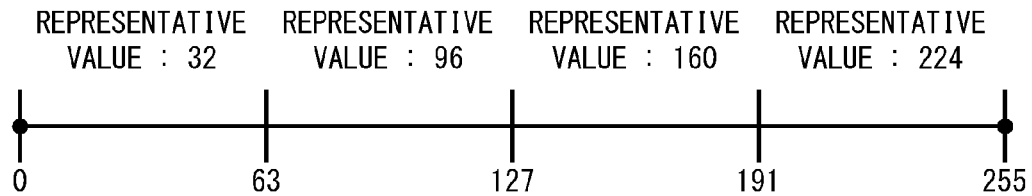

[FIG. 34]
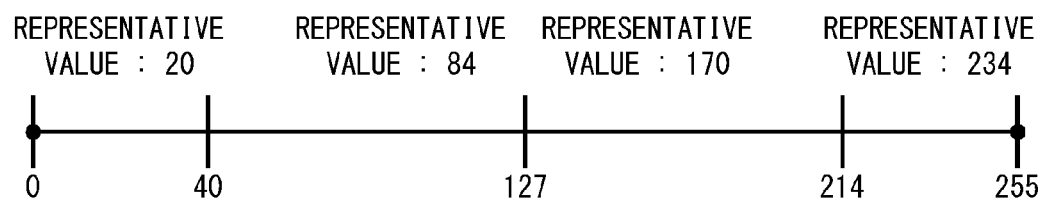

[FIG. 35a]
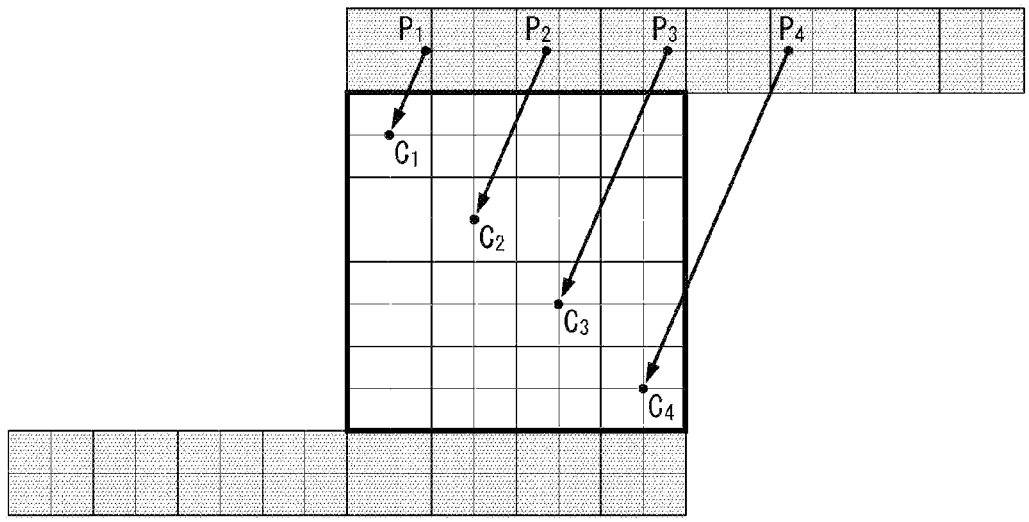
[FIG. 35b]
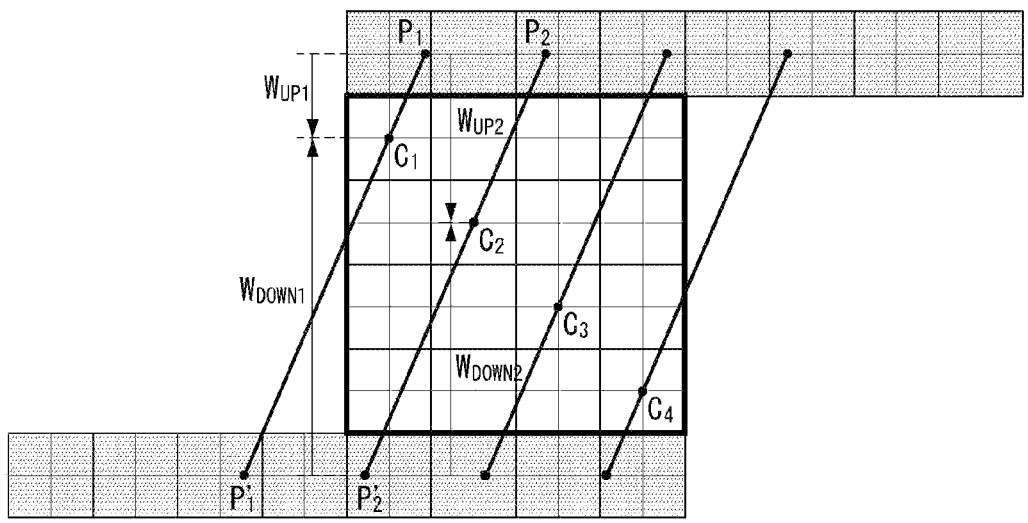

[FIG. 36]
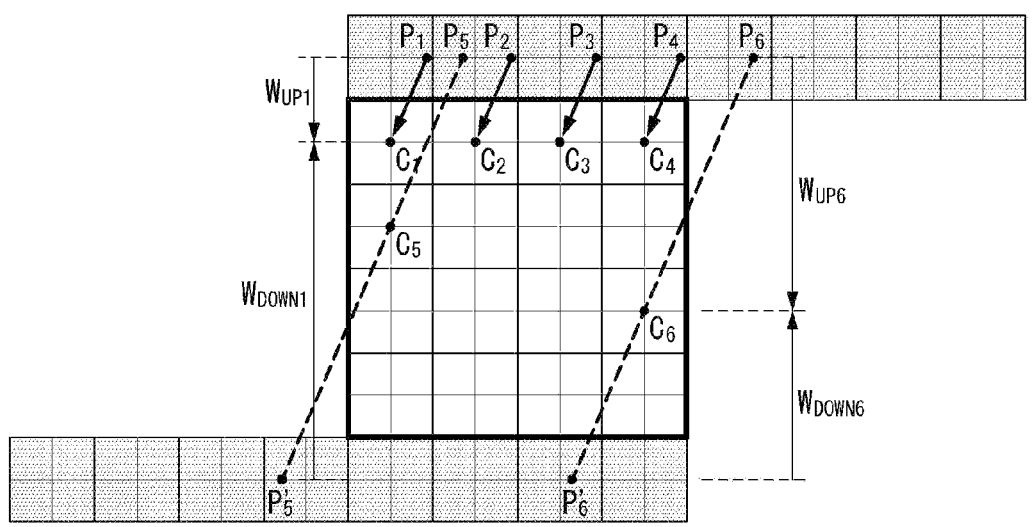

[FIG. 37a]
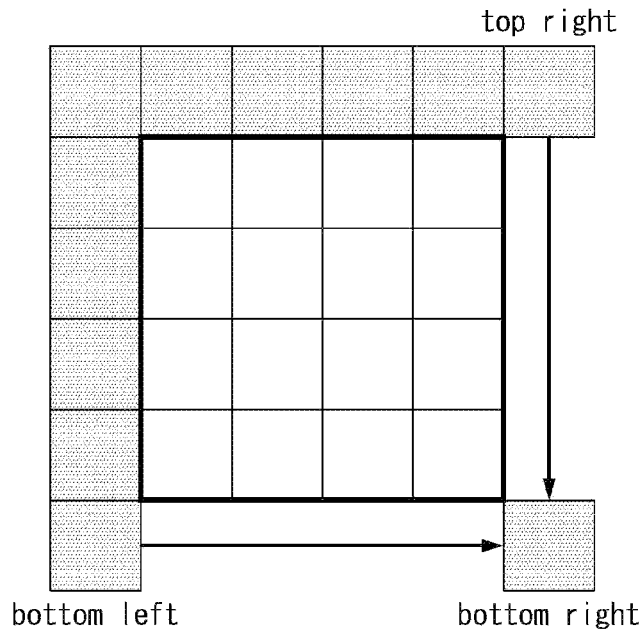
[FIG. 37b]
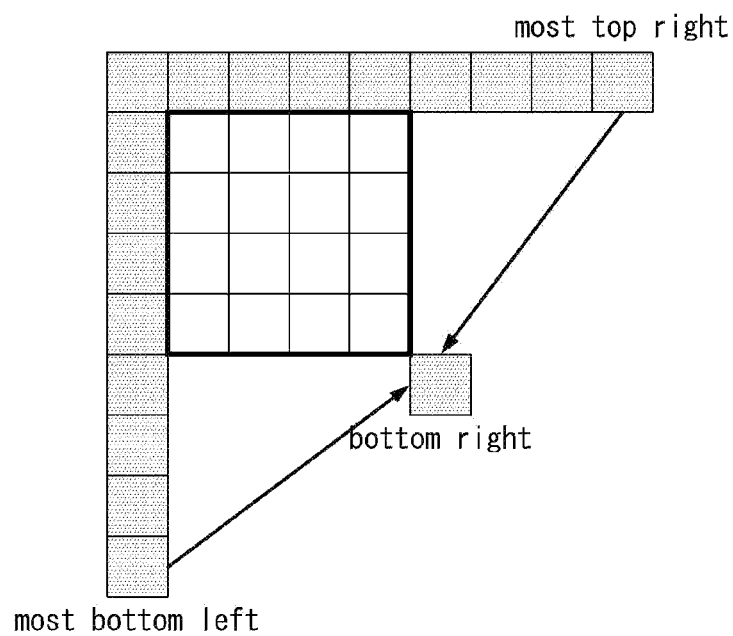

[FIG. 38]
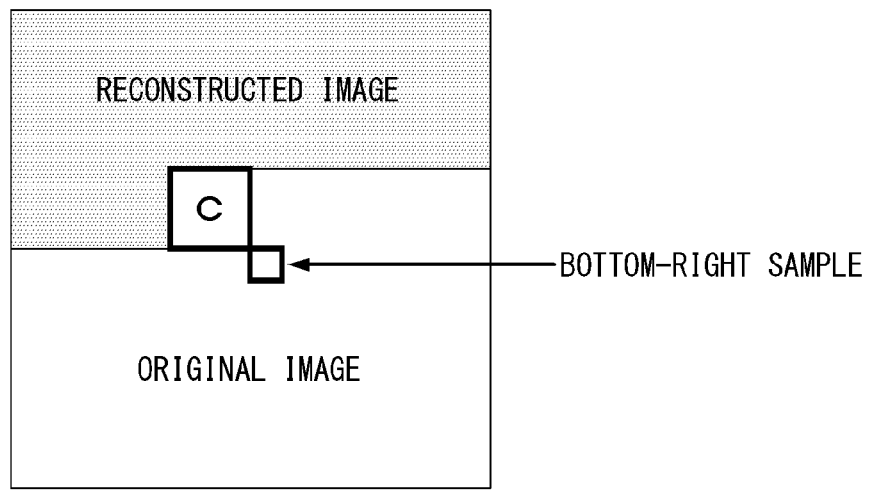

[FIG. 39a]
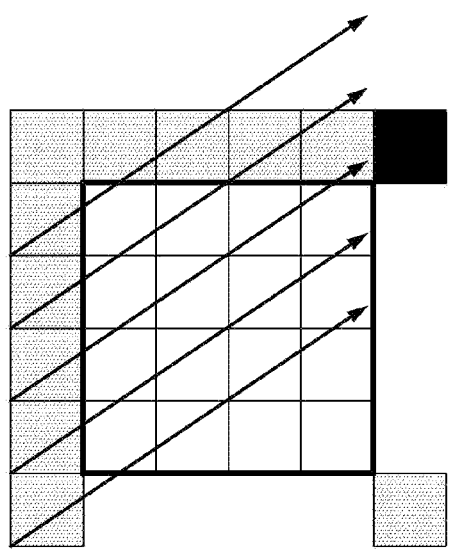
[FIG. 39b]
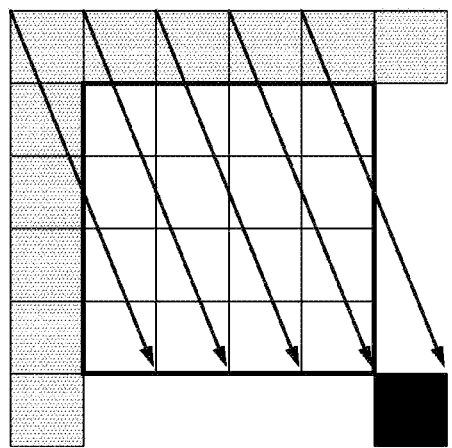

[FIG. 39c]
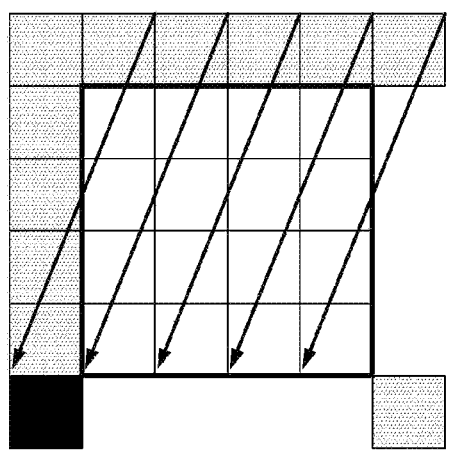

[FIG. 40]
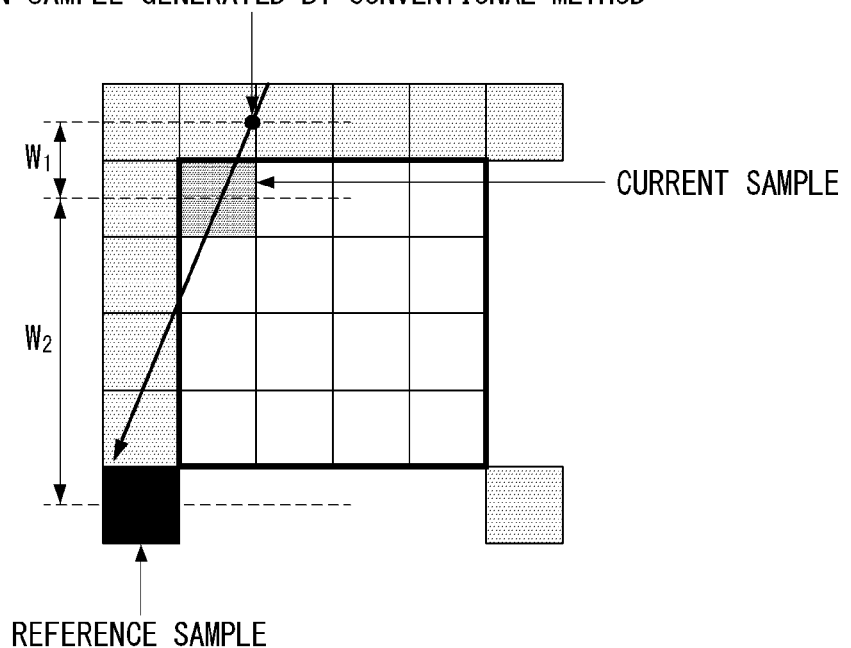

[FIG. 41]
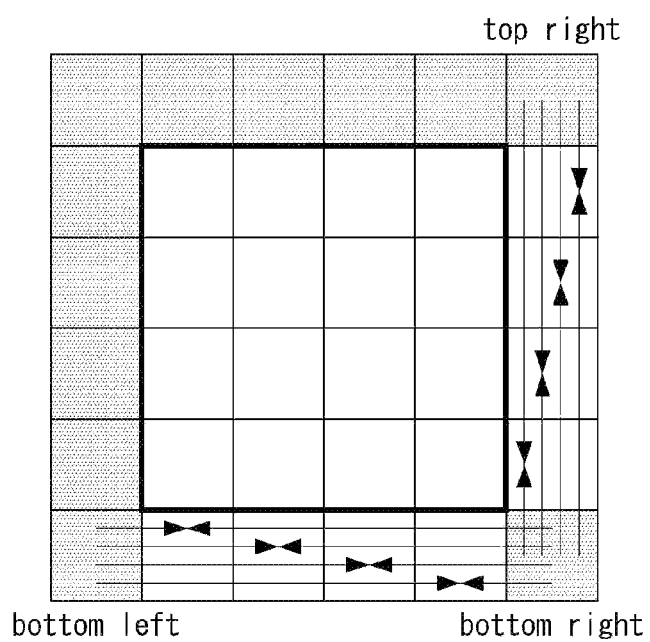

[FIG. 42]
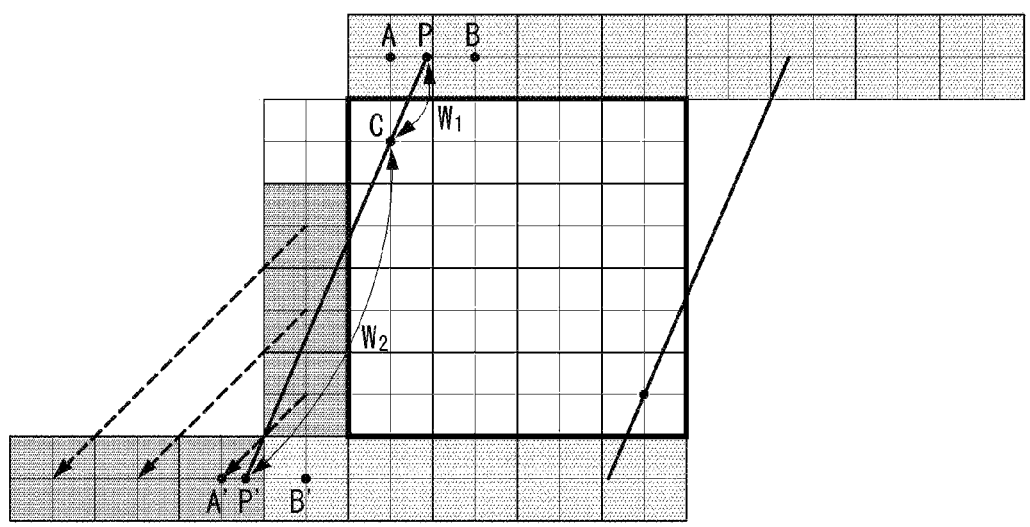

[FIG. 43]
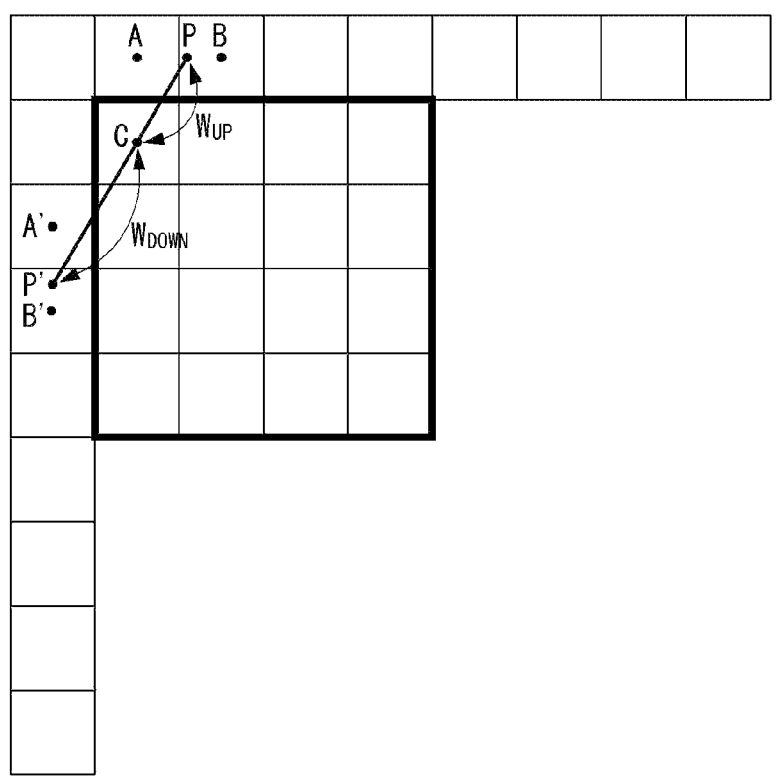

[FIG. 44]
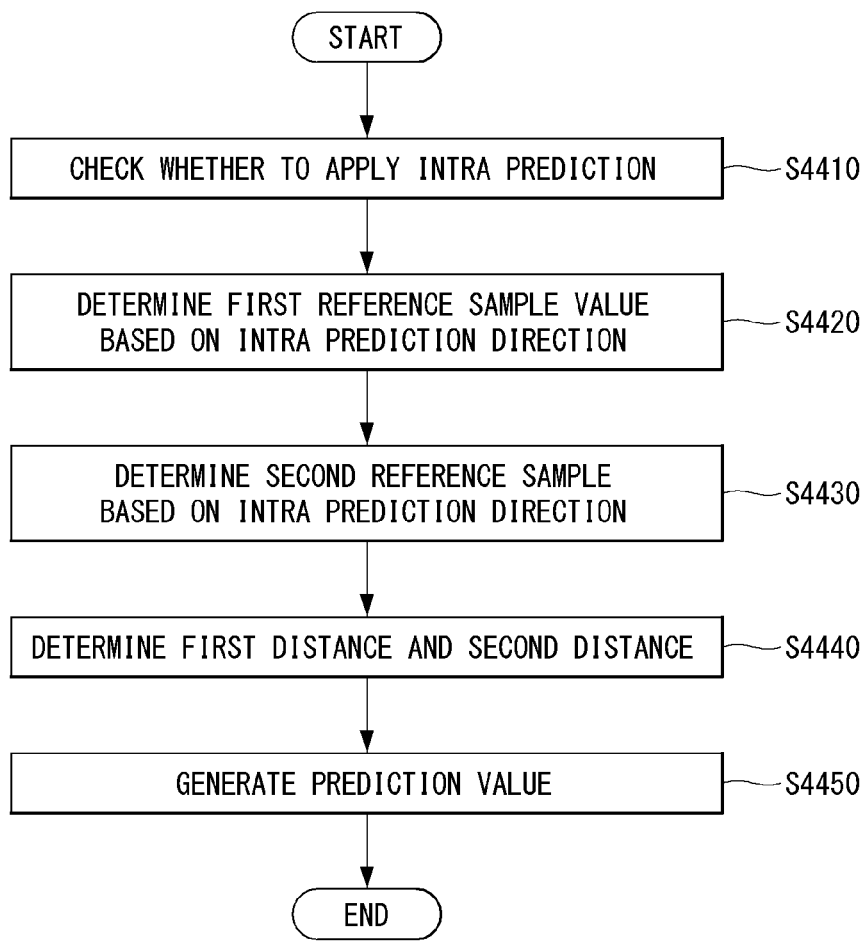

[FIG. 45a]
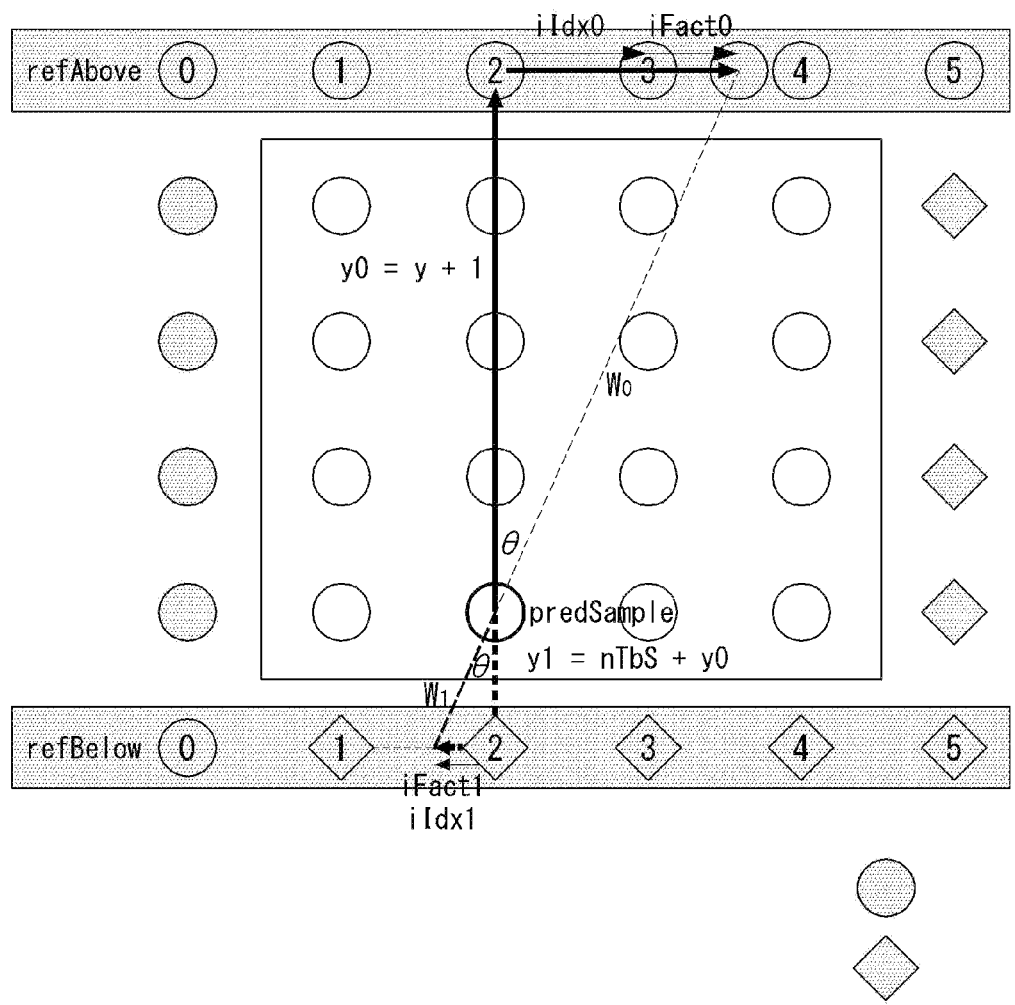

[FIG. 45b]

W1 AND W2 CALCULATING METHOD iIdx0 = (intraPredAngle*y0) >> 5
iFact0 = (intraPredAngle*y0) & 31 iIdx1 = (intraPredAngle*y1) >> 5
iFact1 = (intraPredAngle*y1) & 31

$$w_0 = \sqrt{(iIdx0 \ll 5 + iFact0)^2 + (y0 \ll 5)^2}$$
$$w_1 = \sqrt{(iIdx1 \ll 5 + iFact1)^2 + (y1 \ll 5)^2}$$

[FIG. 46a]
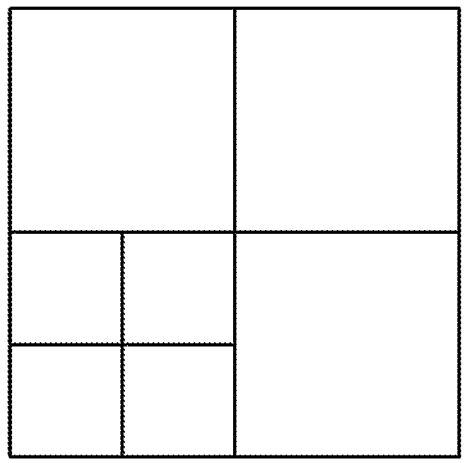
[FIG. 46b]
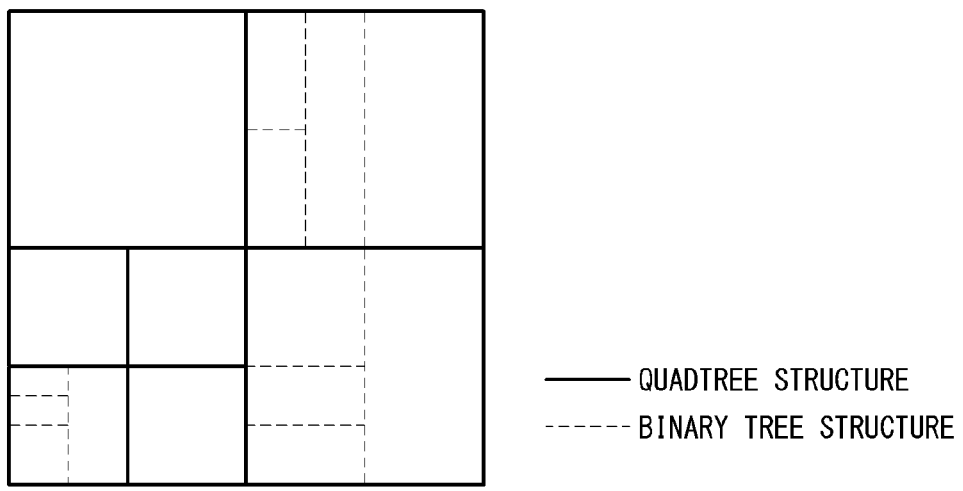
——— QUADTREE STRUCTURE
------ BINARY TREE STRUCTURE

[FIG. 47a]
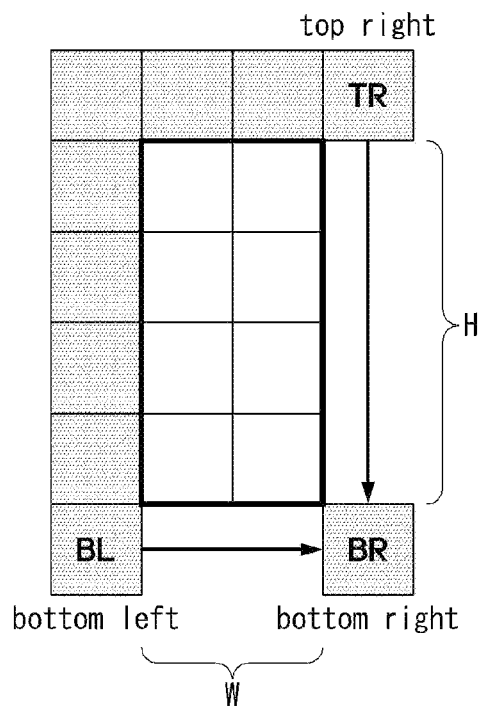
[FIG. 47b]
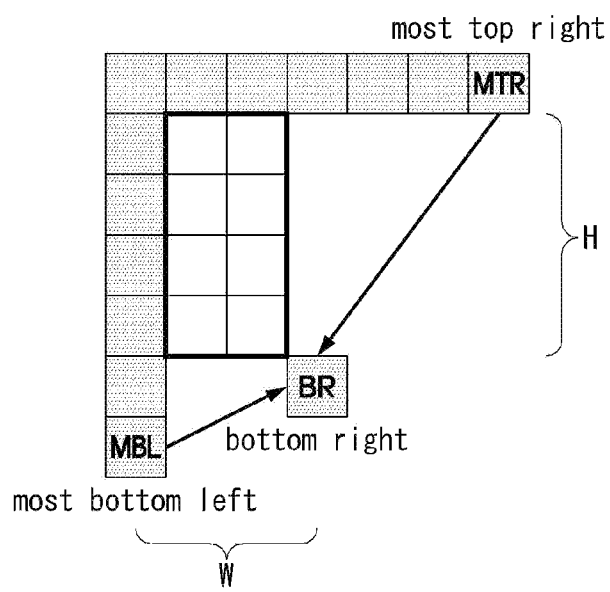

[FIG. 48a]
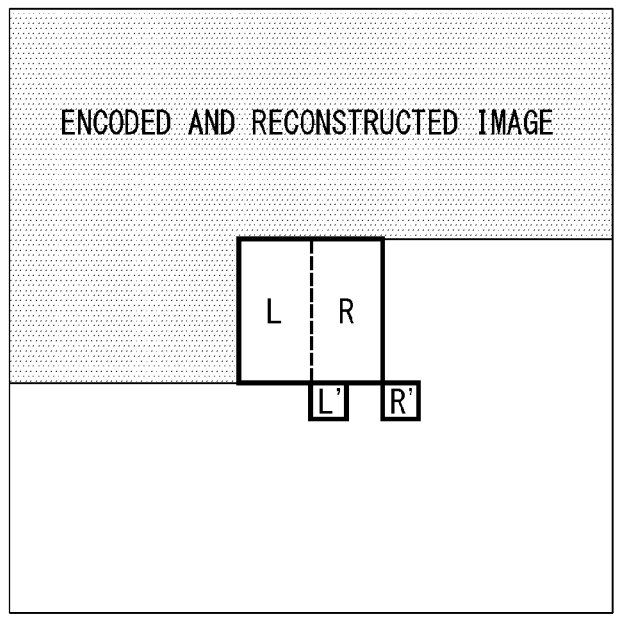
[FIG. 48b]
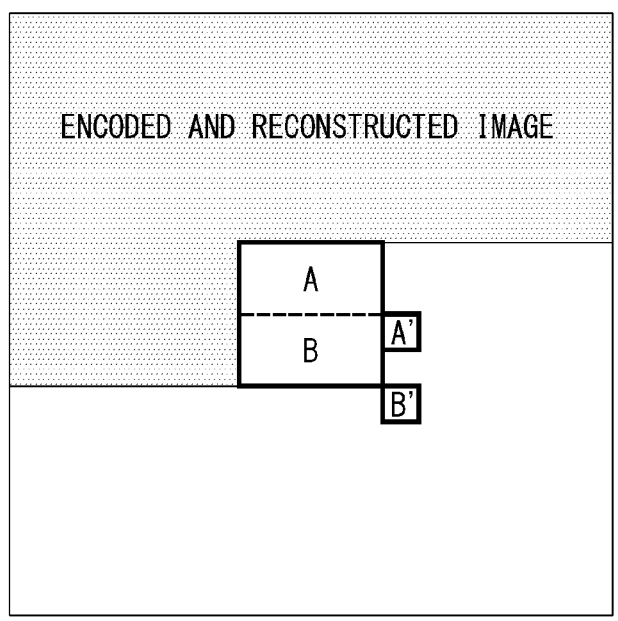

[FIG. 49a]
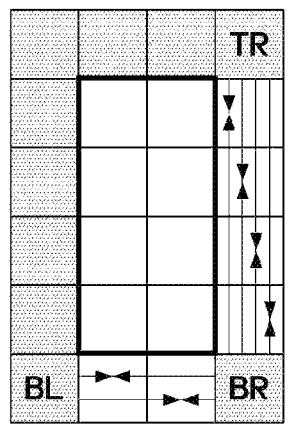
[FIG. 49b]
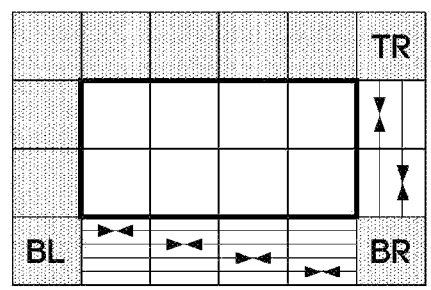

[FIG. 50]
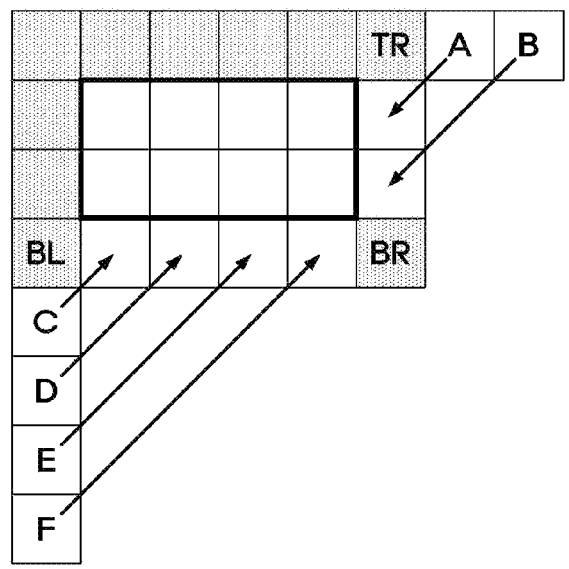
[FIG. 51]
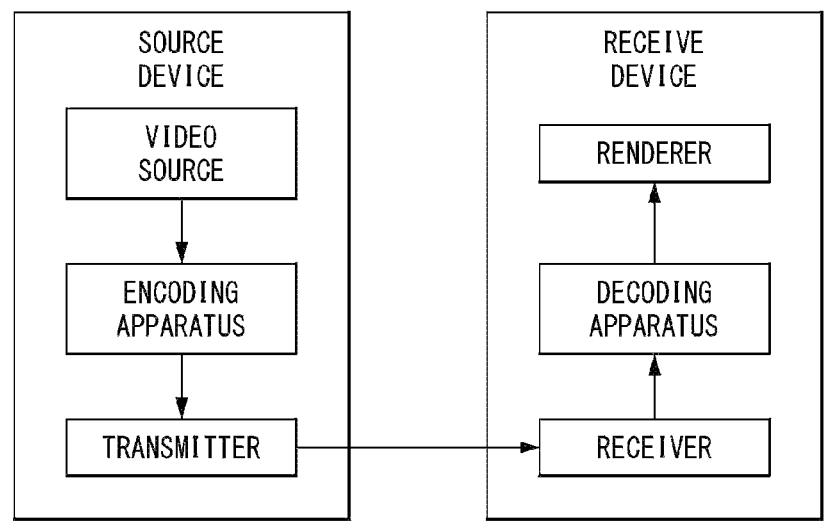

[FIG. 52]
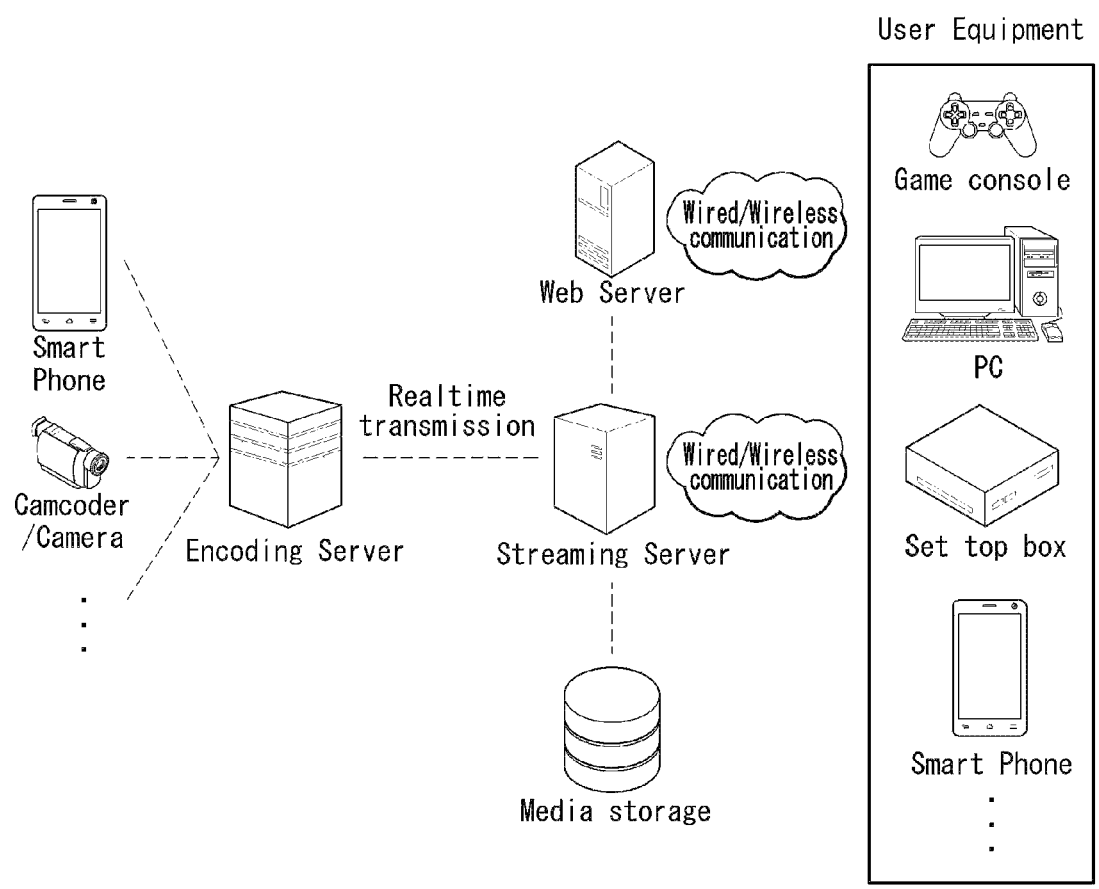

METHOD AND APPARATUS FOR PROCESSING VIDEO SIGNAL BY USING INTRA-PREDICTION

CROSS-REFERENCE TO RELATED APPLICATIONS

This application is the National Stage filing under 35 U.S.C. 371 of International Application No. PCT/KR2019/008004, filed on Jul. 2, 2019, which claims the benefit of U.S. Provisional Application No. 62/692,885 filed on Jul. 2, 2018, and U.S. Provisional Application No. 62/696,784 filed on Jul. 11, 2018, the contents of which are all hereby incorporated by reference herein in their entirety.

TECHNICAL FIELD

The present disclosure relates to a method and device for processing a video signal using an intra-prediction, and more particularly to a method and device for processing a video signal using a linear interpolation intra-prediction.

BACKGROUND ART

A compression encoding means a series of signal processing techniques for transmitting digitized information through a communication lines or techniques for storing the information in the form that is suitable for a storage medium. The media including a video, an image, an audio, and the like may be the target for the compression encoding, and particularly, the technique of performing the compression encoding targeted to the video is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, a coding tool for processing more efficiently the next generation video contents needs to be designed. In particular, video codec standard after high efficiency video coding (HEVC) standard requires an intra-prediction scheme technique for improving prediction accuracy while improving coding efficiency.

DISCLOSURE

Technical Problem

Therefore, an intra prediction technique having higher prediction accuracy is required.

Accordingly, embodiments of the present disclosure provide a method and an apparatus for processing a video signal for enhancing prediction precision.

The technical objects to be achieved by the present disclosure are not limited to those that have been described hereinabove merely by way of example, and other technical objects that are not mentioned can be clearly understood from the following descriptions by those skilled in the art to which the present disclosure pertains.

Technical Solution

In an embodiment of the present disclosure, provided is a method for processing a video signal which may include: checking that intra prediction is applied to a current block including a current sample to be predicted; determining a first reference sample value on a first reference location from at least one of samples positioned at an upper horizontal line and a left vertical line adjacent to the current block, based on an intra-prediction direction of the current block; determining a second reference sample value on a second reference location positioned in an opposite direction to the intra-prediction direction from a location of the current sample or the first reference location; determining a distance between the first reference location and the current sample as a first distance and determining a distance between the second reference location and the current sample as a second distance; and generating a prediction value of the current sample using the linear interpolation prediction based on a sample value of the first reference sample, the first distance, a sample value of the second reference sample, and the second distance.

In another aspect, provided is an apparatus for processing a video signal, which may include: a memory storing the video signal; and a decoder functionally coupled to the memory and decoding the video signal. In an embodiment of the present disclosure, the decoder may be configured to check that intra prediction is applied to a current block including a current sample to be predicted, determine a first reference sample value on a first reference location from at least one of samples positioned at an upper horizontal line and a left vertical line adjacent to the current block based on an intra-prediction direction of the current block, determine a second reference sample value on a second reference location positioned in an opposite direction to the intra-prediction direction from a location of the current sample or the first reference location, determine a distance between the first reference location and the current sample as a first distance and determine a distance between the second reference location and the current sample as a second distance, and generate a prediction value of the current sample based on a sample value of the first reference sample, the first distance, a sample value of the second reference sample, and the second distance.

In an embodiment, the first distance may be an actual distance determined based on a horizontal distance between a horizontal location of the current sample and a horizontal location of the first reference location and a distance between a vertical location of the current sample and a vertical location of the first reference location, and the second distance may be an actual distance determined based on a horizontal distance between a horizontal location of the current sample and a horizontal location of the second reference location and a distance between a vertical location of the current sample and a vertical location of the second reference location.

In an embodiment, the prediction value of the current sample may be determined based on a value acquired by multiplying the first reference sample value by the second distance and a value acquired by multiplying the second reference sample value by the first distance.

In an embodiment, the prediction value of the current sample may be determined by linear interpolation based on the first reference sample value, the first distance, the second reference sample value, and the second distance.

In an embodiment, the first reference sample value may be determined by linear interpolation of sample values of two samples among samples on an upper horizontal line and a left vertical line adjacent to the current block, and the second reference sample value may be determined by linear interpolation of sample values of two samples among samples on a right vertical line and a lower horizontal line adjacent to the current block.

In an embodiment, the first reference sample value may be determined by linear interpolation between sample values of two samples adjacent to a point indicated by the prediction direction from the current sample among upper lines adjacent to the current block, and the sample value of the second reference sample may be determined by linear interpolation between sample values of two samples adjacent to a point indicated by the prediction direction from the current sample among lower lines adjacent to the current block.

In an embodiment, as the second reference sample value, sample values of samples located on a lower line adjacent to the current block may be used, and the samples values of the samples located on the lower line adjacent to the current block may be determined as a sample value of a sample adjacent to a left side or a right side of the current block.

Advantageous Effects

According to an embodiment of the present disclosure, high prediction precision can be enhanced using linear interpolation intra prediction based on actual distance.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates a schematic block diagram of an encoder performing encoding of a video signal as an embodiment to which the present disclosure is applied.

FIG. 2 illustrates a schematic block diagram of a decoder performing decoding of a video/image signal as an embodiment to which the present disclosure is applied.

FIG. 3 illustrates an example of a multi-type tree structure applicable to an embodiment of the present disclosure.

FIG. 4 illustrates an example of a signalling mechanism of split information of a quadtree with nested multi-type tree structure applicable to embodiments of the present disclosure.

FIG. 5 illustrates an example of a method for splitting a coding tree unit (CTU) into multiple CUs based on a quadtree and nested multi-type tree structure applicable to embodiments of the present disclosure.

FIG. 6 illustrates a method for limiting ternary tree split to which the present disclosure is applicable.

FIG. 7 illustrates an example of redundant split patterns that may occur in binary tree split and ternary tree split applicable to embodiments of the present disclosure.

FIGS. 8 and 9 illustrate an intra prediction based video encoding method according to an embodiment of the present disclosure and an example of an intra prediction unit in an encoding apparatus according to an embodiment of the present disclosure.

FIGS. 10 and 11 illustrate an intra prediction based video/image encoding method according to an embodiment of the present disclosure and an example of an intra prediction unit in a decoder according to an embodiment of the present disclosure.

FIGS. 12 and 13 illustrate examples of a prediction direction of an intra prediction mode which may be applied to embodiments of the present disclosure.

FIG. 14 illustrates examples of prediction samples and reference samples to which linear interpolation intra prediction is applied according to an embodiment of the present disclosure.

FIG. 15 illustrates an example of a flowchart for encoding using linear interpolation intra prediction according to an embodiment of the present disclosure.

FIG. 16 illustrates an example of a flowchart for decoding using linear interpolation intra prediction according to an embodiment of the present disclosure.

FIG. 17 illustrates an example of a flowchart for a low-complexity linear interpolation intra prediction decoding process according to an embodiment of the present disclosure.

FIG. 18 illustrates an example of a flowchart for a low-complexity linear interpolation intra prediction encoding process according to an embodiment of the present disclosure.

FIG. 19 illustrates an example of a prediction method according to a planar mode.

FIG. 20 illustrates an example of a planar mode in linear interpolation intra prediction according to an embodiment of the present disclosure.

FIG. 21 illustrates an example of a graph for determining a weight in a 4×4 block using a cosine function in linear interpolation intra prediction according to an embodiment of the present disclosure.

FIG. 22 illustrates another example of a graph for determining a weight in a 4×4 block using a cosine function in linear interpolation intra prediction according to an embodiment of the present disclosure.

FIG. 23 illustrates an example of a process of generating a prediction block using a weight value calculated in linear interpolation intra prediction according to an embodiment of the present disclosure.

FIG. 24 illustrates a conceptual view of calculating a weight using a least square method in linear interpolation intra prediction according to an embodiment of the present disclosure.

FIG. 25 illustrates an example of a current block and a neighboring block for determining a context model in linear interpolation intra prediction according to an embodiment of the present disclosure.

FIG. 26 illustrates a method for generating a right reference sample and a bottom reference sample using a bottom-right sample in linear interpolation intra prediction according to an embodiment of the present disclosure.

FIG. 27 illustrates a method for generating a bottom-right reference sample value considering prediction directivity in linear interpolation intra prediction according to an embodiment of the present disclosure.

FIG. 28 illustrates classification of the type of prediction directivity in linear interpolation intra prediction according to an embodiment of the present disclosure.

FIG. 29 illustrates an example of a method for determining a bottom-right sample value using a top reference sample value and a left reference sample value in linear interpolation intra prediction according to an embodiment of the present disclosure.

FIG. 30 illustrates a method for generating a bottom-right sample value of a current block from an original image in linear interpolation intra prediction according to an embodiment of the present disclosure.

FIG. 31 illustrates an example of a method for transmitting a difference value of a bottom-right sample value of an original image in linear interpolation intra prediction according to an embodiment of the present disclosure.

FIG. 32 illustrates an example of a method for transmitting a difference value of a bottom-right value of a prediction block and a bottom-right adjacent sample value of an original image in linear interpolation intra prediction according to an embodiment of the present disclosure.

FIG. 33 illustrates an example of a method for transmitting a uniform default offset value in linear interpolation intra prediction according to an embodiment of the present disclosure.

FIG. 34 illustrates an example of a method for transmitting a non-uniform default offset value in linear interpolation intra prediction according to an embodiment of the present disclosure.

FIG. 35 illustrates an example of an intra prediction method according to an embodiment of the present disclosure, and FIG. 35a illustrates the conventional intra prediction method and FIG. 35b illustrates an example of a linear interpolation prediction method.

FIG. 36 illustrates an intra prediction method acquired by combining the conventional intra prediction method and a linear interpolation prediction method in intra prediction according to an embodiment of the present disclosure.

FIG. 37 illustrates an example of a method for generating a bottom-right sample using a neighboring reference sample in linear interpolation intra prediction according to an embodiment of the present disclosure, and FIG. 37a illustrates a method for generating a bottom-right sample using a top-right sample and a bottom-left sample and FIG. 37b illustrates a method for generating a bottom-right sample using a most top-right sample and a most bottom-left sample which are distant by twice a length of a block to be currently encoded.

FIG. 38 illustrates a method for generating a bottom-right reference sample from an original image in linear interpolation intra prediction according to an embodiment of the present disclosure.

FIG. 39 illustrates an example of a reference sample used for linear interpolation for each intra prediction mode in linear interpolation intra prediction according to an embodiment of the present disclosure, and FIG. 39a illustrates an example of a top-right reference sample, FIG. 39b illustrates an example of a bottom-right reference sample, and FIG. 39c illustrates an example of a bottom-left reference sample.

FIG. 40 illustrates a method for performing linear interpolation prediction using a reference sample in linear interpolation intra prediction according to an embodiment of the present disclosure.

FIG. 41 illustrates a method for generating bottom samples and right samples in linear interpolation intra prediction according to an embodiment of the present disclosure.

FIG. 42 illustrates a method for performing linear interpolation using a ratio of an actual distance between reference samples in linear interpolation intra prediction according to an embodiment of the present disclosure.

FIG. 43 illustrates another example of a method for performing linear interpolation using a ratio of an actual distance between reference samples in linear interpolation intra prediction according to an embodiment of the present disclosure.

FIG. 44 illustrates an example of a flowchart for linear interpolation intra prediction according to an embodiment of the present disclosure.

FIG. 45 illustrates an example of a method for calculating a weight depending on a distance between reference samples in linear interpolation intra prediction according to an embodiment of the present disclosure.

FIG. 46 illustrates a screen division structure according to an embodiment of the present disclosure.

FIG. 47 illustrates an example of a method for generating a bottom-right reference sample in linear interpolation intra prediction according to an embodiment of the present disclosure, and FIG. 47a illustrates a method for generating a bottom-right sample using a top-right sample and a bottom-left sample and FIG. 47b illustrates a method for generating a bottom-right sample using a most top-right sample and a most bottom-left sample which are distant by horizontal and vertical lengths of a non-square to be currently encoded.

FIG. 48 illustrates an example of a method using a bottom-right sample in an original example in linear interpolation intra prediction according to an embodiment of the present disclosure, and FIG. 48a illustrates an example of an N×2N non-square shape block and FIG. 48b illustrates an example of a 2N×N non-square shape block.

FIG. 49 illustrates a method for generating right samples and bottom samples through linear interpolation in linear interpolation intra prediction according to an embodiment of the present disclosure.

FIG. 50 illustrates a method for generating right samples and bottom samples using top samples and left samples in linear interpolation intra prediction according to an embodiment of the present disclosure.

FIG. 51 illustrates an example of a video coding system as an embodiment to which the present disclosure is applied.

FIG. 52 illustrates an example of a video streaming system as an embodiment to which the present disclosure is applied.

MODE FOR INVENTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Hereinafter, for convenience of description, the processing unit may be referred to as a 'processing block' or a 'block'.

Further, the processing unit may be interpreted into the meaning including a unit for a luma component and a unit for a chroma component. For example, the processing unit may correspond to a coding tree unit (CTU), a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a prediction unit PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

In the present description, a pixel is called a sample. In addition, the use of a sample may mean the use of using a pixel value, etc.

FIG. 1 illustrates a schematic block diagram of an encoder performing encoding of a video signal as an embodiment to which the present disclosure is applied. The encoder of FIG. 1 may be referred to as an encoding device.

Referring to FIG. 1, an encoder 100 may include an image partitioning unit 110, a subtractor 115, a transform unit 120, a quantization unit 130, a dequantization unit 140, an inverse transform unit 150, an adder 155, a filtering unit 160, a memory 170, an inter-prediction unit 180, an intra-prediction unit 185, and an entropy encoding unit 190. The inter-prediction unit 180 and the intra-prediction unit 185 may be commonly called a prediction unit. In other words, the prediction unit may include the inter-prediction unit 180 and the intra-prediction unit 185. The transform unit 120, the quantization unit 130, the dequantization unit 140, the inverse transform unit 150 may be included in a residual processing unit. The residual processing unit may further include the subtractor 115. In one embodiment, the image partitioning unit 110, the subtractor 115, the transform unit 120, the quantization unit 130, the dequantization unit 140, the inverse transform unit 150, the adder 155, the filtering unit 160, the inter-prediction unit 180, the intra-prediction unit 185, and the entropy encoding unit 190 may be implemented as one hardware component (e.g., an encoder or a processor). Furthermore, the memory 170 may include a decoded picture buffer (DPB) 175 and may be implemented by a digital storage medium. The digital storage medium may include various storage media, such as USB, SD, CD, DVD, Blu-ray, HDD, and SSD, for storing data such as a video signal.

The image partitioning unit 110 may partition an input image (or picture or frame) input to the encoder 100 into one or more processing units. For example, the processing unit may be called a coding unit (CU). In this case, the coding unit may be recursively split from a coding tree unit (CTU) or a largest coding unit (LCU) based on a quadtree binary tree (QTBT) structure. For example, one coding unit may be partitioned into a plurality of coding units of deeper depth based on a quadtree structure and/or a binary tree structure. In this case, for example, the quadtree structure may be first applied, and the binary tree structure may be then applied. Alternatively the binary tree structure may be first applied. A coding procedure according to the present disclosure may be performed based on a final coding unit that is no longer partitioned. In this case, the largest coding unit may be directly used as the final coding unit based on coding efficiency according to image characteristics, or the coding unit may be recursively split into coding units of deeper depth, if necessary or desired, and thus a coding unit with an optimal size may be used as the final coding unit. Herein, the coding procedure may include a procedure, such as prediction, transform or reconstruction to be described later. As another example, the processing unit may further include a prediction unit (PU) or a transform unit (TU). In this case, each of the prediction unit and the transform unit may be split or partitioned from the final coding unit described above. The prediction unit may be a unit for sample prediction, and the transform unit may be a unit from which a transform coefficient is derived and/or a unit in which a residual signal is derived from a transform coefficient. A unit may be replaced by terms such as a block or an area, if necessary or desired. In a common case, an M×N block may indicate a set of samples consisting of M columns and N rows or a set of transform coefficients. The sample may generally indicate a pixel or a value of a pixel, and may indicate only a pixel/pixel value of a luma component or only a pixel/pixel value of a chroma component. In the sample, one picture (or image) may be replaced by a pixel or pel.

The encoder 100 may subtract a prediction signal (predicted block or prediction sample array) output by the inter-prediction unit 180 or the intra-prediction unit 185 from an input image signal (original block or original sample array) to generate a residual signal (residual block or residual sample array), and the generated residual signal is sent to the transform unit 120. In this case, as illustrated, in the encoder 100, a unit that subtracts the input image signal (original block or original sample array) may be called the subtractor 115. The prediction unit may perform prediction on a processing target block (hereinafter referred to as a current block), and may generate a predicted block including prediction samples for the current block. The prediction unit may determine whether intra-prediction or inter-prediction is applied on a per current block or coding unit basis. The prediction unit may generate information on prediction such as prediction mode information, and may transmit the generated information on prediction to the entropy encoding unit 190. The information on the prediction may be encoded by the entropy encoding unit 190 and may be output in the form of bitstream.

The intra-prediction unit 185 may predict the current block with reference to samples in a current picture. The referred samples may be positioned in the neighborhood of the current block or positioned apart from the current block according to the prediction mode. In the intra prediction, the prediction modes may include a plurality of non-directional modes and a plurality of directional modes.

The non-directional mode may include, for example, a DC mode and a planar mode. The directional mode may include, for example, 33 directional prediction modes or 65 directional prediction modes according to a minuteness degree of the prediction direction. However, this is merely an example, and more or less directional prediction modes may be used according to a configuration. The intra-prediction unit 185 may determine the prediction mode applied to the current block by using the prediction mode applied to the neighboring block.

The inter-prediction unit 180 may derive a prediction block for the current block based on a reference block (reference sample array) specified by a motion vector on the reference picture. In this case, in order to reduce an amount of motion information transmitted in the inter-prediction mode, the motion information may be predicted on a per block, subblock, or sample basis based on a correlation of the motion information between the neighboring block and the current block. The motion information may include a motion vector and a reference picture index. The motion information may further include inter-prediction direction (L0 prediction, L1 prediction, Bi prediction, etc.) information. In the case of the inter prediction, the neighboring block may include a spatial neighboring block which is present in the current picture and a temporal neighboring block which is present in the reference picture. A reference picture including the spatial neighboring block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, the inter-prediction unit 180 may construct a list of motion information candidates based on information of the neighboring blocks and generate information indicating which candidate is used to derive the motion vector and/or the reference picture index of the current block. The inter prediction may be performed based on various prediction modes. For example, in a skip mode and a merge mode, the inter-prediction unit 180 may use motion information of the neighboring block as motion information of the current block. In the skip mode, a residual signal may not be transmitted, unlike the merge mode. In a motion vector prediction (MVP) mode, a motion vector of the neighboring block may be used as a motion vector predictor, and a motion vector difference may be signaled to indicate a motion vector of the current block.

A prediction signal generated through the inter-prediction unit 180 or the intra-prediction unit 185 may be used to generate a reconstructed signal or to generate a residual signal.

The transform unit 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). The GBT means a transform obtained from a graph if relation information between pixels is represented by the graph. The CNT means a transform obtained based on a prediction signal generated using all previously reconstructed pixels. Furthermore, a transform process may be applied to pixel blocks with the same size in a square shape, or may be applied to blocks with variable sizes in a non-square shape.

The quantization unit 130 may quantize transform coefficients to transmit the quantized transform coefficients to the entropy encoding unit 190. The entropy encoding unit 190 may encode a quantized signal (information on quantized transform coefficients) to output entropy encoded video data in the form of bitstream. The information on the quantized transform coefficients may be called residual information. The quantization unit 130 may rearrange the quantized transform coefficients of a block form in one-dimensional vector form based on the coefficient scan order, and may generate information on the quantized transform coefficients based on the quantized transform coefficients of the one-dimensional vector form. The entropy encoding unit 190 may perform various encoding methods, for example, exponential Golomb, context-adaptive variable length coding (CAVLC), and context-adaptive binary arithmetic coding (CABAC). The entropy encoding unit 190 may encode together or separately information (e.g., information related to syntax elements) necessary for video/image reconstruction, in addition to the quantized transform coefficients. The encoded information (e.g., encoded video/image information) may be transmitted on a per network abstraction layer (NAL) unit basis in the form of bitstream, or may be stored in a digital storage medium. The network may include a broadcast network and/or a communication network. The digital storage medium may include various storage media, such as a universal serial bus (USB), a secure digital (SD) card, a compact disk (CD), a digital video disk (DVD), Blu-ray, a hard disk drive (HDD), and a solid state drive (SSD). A transmitter (not shown) transmitting encoded data such as a signal output by the entropy encoding unit 190 and/or a storage unit (not shown) storing the encoded data may be internal/external elements of the encoder 100. The transmitter may be a component of the entropy encoding unit 190.

The quantized transform coefficients output from the quantization unit 130 may be used to generate the prediction signal. For example, dequantization and inverse transform may be applied to the quantized transform coefficients by the dequantization unit 140 and the inverse transform unit 150 in a loop to reconstruct the residual signal. The adder 155 adds the reconstructed residual signal to the prediction signal output from the inter-prediction unit 180 or the intra-prediction unit 185 to output a reconstructed signal (e.g., a reconstructed picture, a reconstructed block, or a reconstructed sample array) to the memory 170. As in the case where the skip mode is applied, when there is no residual signal for the processing target block, the prediction block may be used as the reconstructed block. The adder 155 may be referred to as a reconstruction unit or a reconstructed block generation unit. The reconstructed signal output from the adder 155 may be used for intra-prediction of a block that is processed after a block reconstructed in the current picture. In addition, the reconstructed signal output from the adder 155 may go through the filtering and may be used for inter-prediction of a next picture as described below.

The filtering unit 160 can improve subjective/objective picture quality by applying filtering to a reconstructed signal. For example, the filtering unit 160 may apply various filtering methods to a reconstructed picture to generate a modified reconstructed picture, and the modified reconstructed picture may be stored in the memory 170, more particularly in the DPB 175 of the memory 170. Examples of the various filtering methods performed by the filtering unit 160 may include deblocking filtering, a sample adaptive offset (SAO), an adaptive loop filter (ALF), and a bilateral filter. The filtering unit 160 may generate a variety of information on filtering and may transmit the information on filtering to the entropy encoding unit 190. The information on filtering may be encoded by the entropy encoding unit 190, and the encoded information on filtering may be output in the form of bitstream through the entropy encoding unit 190.

The modified reconstructed picture sent to the memory 170 may be used as a reference picture in the inter-prediction unit 180. When inter-prediction is applied, the encoder 100 can avoid a prediction mismatch between the encoder 100 and a decoder 200 and improve encoding efficiency.

The DPB 175 of the memory 170 may store the reconstructed picture that is modified to be used as a reference picture in the inter-prediction unit 180. The memory 170 may store motion information of a block in which motion information in the current picture is derived (or encoded) and/or motion information of blocks in an already reconstructed picture. The motion information stored in the memory 170 may be transmitted to the inter-prediction unit 180 to be used as motion information of a spatial neighboring block or motion information of a temporal neighboring block. The memory 170 may store reconstructed samples of the reconstructed blocks in the current picture and send the stored reconstructed samples to the intra-prediction unit 185.

FIG. 2 illustrates a schematic block diagram of a decoder performing decoding of a video/image signal as an embodiment to which the present disclosure is applied. The decoder of FIG. 2 may be referred to as a decoding device.

Referring to FIG. 2, the decoder 200 may include an entropy decoding unit 210, a dequantization unit 220, an inverse transform unit 230, an adder 235, a filtering unit 240, a memory 250, an inter-prediction unit 260, and an intra-prediction unit 265. The inter-prediction unit 260 and the intra-prediction unit 265 may be commonly called a prediction unit. That is, the prediction unit may include the inter-prediction unit 260 and the intra-prediction unit 265. The dequantization unit 220 and the inverse transform unit 230 may be commonly called a residual processing unit. That is, the residual processing unit may include the dequantization unit 220 and the inverse transform unit 230. In some embodiments, the entropy decoding unit 210, the dequantization unit 220, the inverse transform unit 230, the adder 235, the filtering unit 240, the inter-prediction unit 260, and the intra-prediction unit 265 may be implemented as one hardware component (e.g., a decoder or a processor). Further, the memory 250 may include a DPB 275 and may be implemented by a digital storage medium. The digital storage medium may include various storage media, such as USB, SD, CD, DVD, Blu-ray, HDD, and SSD, for storing data such as a video signal.

If a bitstream including video/image information is input to the decoder 200, the decoder 200 may perform an image reconstruction operation corresponding to a process of processing video/image information in the encoder 100 of FIG. 1. For example, the decoder 200 may perform decoding in units of the processing unit applied in the encoder 100. Thus, a processing unit of the decoder 200 may be, for example, a coding unit, and the coding unit may be split from a coding tree unit or a largest coding unit based on a quadtree structure and/or a binary-tree structure. Further, a reconstructed image signal output by the decoder 200 may be reproduced through a playback device.

The decoder 200 may receive a signal output by the encoder 100 of FIG. 1 in the form of bitstream, and the received signal may be decoded through the entropy decoding unit 210. For example, the entropy decoding unit 210 may parse the bitstream to derive information (e.g., video/image coding information) necessary for image reconstruction (or picture reconstruction). For example, the entropy decoding unit 210 may decode information obtained in the form of bitstream based on a coding method such as exponential Golomb encoding, CAVLC or CABAC, and may output information of a syntax element necessary for image reconstruction and quantized values of transform coefficients about a residual. More specifically, a CABAC entropy decoding method may check a bin corresponding to each syntax element from a bitstream, determine a context model using at least one of information of syntax element as a decoding target, decoding information of a current block and a neighboring block, or information of a symbol/bin decoded in a previous step, predict a probability of occurrence of the bin based on the determined context model, and perform arithmetic decoding of the bin to thereby generate a symbol corresponding to information of each syntax element. In this instance, the CABAC entropy decoding method may determine a context model of symbol/bin, and then update the context model using information of a symbol/bin decoded for a context model of a next symbol/bin. Information related to a prediction among information decoded in the entropy decoding unit 210 may be provided to the prediction unit (the inter-prediction unit 260 and the intra-prediction unit 265). Residual data, i.e., quantized transform coefficients and related parameter information, on which entropy decoding is performed in the entropy decoding unit 210, may be input to the dequantization unit 220. Further, information related to filtering among information decoded in the entropy decoding unit 210 may be provided to the filtering unit 240. A receiver (not shown) receiving a signal output from the encoder 100 may be further configured as an internal/external element of the decoder 200, or the receiver may be a component of the entropy decoding unit 210.

The dequantization unit 220 may dequantize the quantized transform coefficients and output transform coefficients. The dequantization unit 220 may rearrange the quantized transform coefficients in a two-dimensional block form. In this case, the rearrangement may be performed based on the coefficient scan order performed in the encoder 100. The dequantization unit 220 may perform dequantization on the quantized transform coefficients using a quantization parameter (e.g., quantization step size information), and may obtain transform coefficients.

The inverse transform unit 230 may obtain a residual signal (residual block, residual sample array) by inversely transforming the transform coefficients.

The prediction unit may perform prediction for a current block and generate a predicted block including prediction samples for the current block. The prediction unit may determine whether the intra-prediction or the inter-prediction is applied to the current block based on information on the prediction output from the entropy decoding unit 210, and determine a detailed intra/inter-prediction mode.

The intra-prediction unit 265 may predict the current block by referring to samples in the current picture. The referred samples may be positioned in the neighborhood of the current block or positioned apart from the current block depending on the prediction mode. In the intra prediction, the prediction modes may include a plurality of non-directional modes and a plurality of directional modes. The intra-prediction unit 265 may determine the prediction mode applied to the current block by using the prediction mode applied to the neighboring block.

The inter-prediction unit 260 may derive a predicted block for a current block based on a reference block (reference sample array) that is specified by a motion vector on a reference picture. In this instance, in order to reduce a data amount of motion information transmitted in an inter-prediction mode, motion information may be predicted on a per block, subblock or sample basis based on a correlation of motion information between a neighboring block and the current block. The motion information may include a motion vector and/or a reference picture index. The motion information may further include inter-prediction direction (e.g., L0 prediction, L1 prediction, Bi prediction, etc.) information. In the case of inter-prediction, the neighboring block may include a spatial neighboring block present in a current picture and a temporal neighboring block present in a reference picture. For example, the inter-prediction unit 260 may construct a list of motion information candidates based on information of neighboring blocks, and may derive a motion vector and/or reference picture index of the current block based on received candidate selection information. The inter-prediction may be performed based on various prediction modes, and information related to the prediction may include information indicating a mode of inter-prediction for the current block.

The adder 235 adds the obtained residual signal to a predicted signal (a predicted block or a predicted sample array) output from the inter-prediction unit 260 or the intra-prediction unit 265 to generate a reconstructed signal (a reconstructed picture, a reconstructed block, and a reconstructed sample array). As in the case where the skip mode is applied, when there is no residual signal for the processing target block, the predicted block may be directly used as the reconstructed block.

The adder 235 may be referred to as a reconstruction unit or a reconstructed block generation unit. The generated reconstructed signal may be used for intra prediction of a next processing target block in the current picture, and may be used for inter prediction of a next picture through the filtering as described below.

The filtering unit 240 can improve subjective/objective picture quality by applying filtering based on a reconstructed signal. For example, the filtering unit 240 may apply various filtering methods to a reconstructed picture to generate a modified reconstructed picture, and may send the modified reconstructed picture to the memory 250, more particularly the DPB 255 of the memory 250. Examples of the various filtering methods may include deblocking filtering, a sample adaptive offset (SAO), an adaptive loop filter (ALF), and a bilateral filter.

The reconstructed picture stored in the DPB 255 of the memory 250 may be used as a reference picture in the inter-prediction unit 260. The memory 250 may store motion information of a block in which motion information in the current picture is derived (or decoded) and/or motion information of blocks in an already reconstructed picture. The motion information stored in the memory 250 may be transmitted to the inter-prediction unit 260 in order to be used as motion information of a spatial neighboring block or motion information of a temporal neighboring block.

In the present disclosure, embodiments described in the filtering unit 160, the inter-prediction unit 180, and the intra-prediction unit 185 of the encoder 100 may be equally or correspondingly applied to the filtering unit 240, the inter-prediction unit 260, and the intra-prediction unit 265 of the decoder 200, respectively.

A video/image coding/decoding method described in the present disclosure may be performed based on various detailed techniques, and each detailed technique is schematically described as below. It is apparent to those skilled in the art that the techniques described herein can be performed in procedures, such as prediction, residual processing (e.g., (inverse) transform, (de)quantization, etc.), syntax element coding/decoding, and partitioning, in a video/image coding/decoding procedure described above or described below.

Block Partitioning

A block partitioning procedure described in the present disclosure may be performed in the image partitioning unit 110 of the above-described encoder 100, and partitioning related information may be encoding processed in the entropy encoding unit 190 and transmitted to the decoder 200 in the form of bitstream. The entropy decoding unit 210 of the decoder 200 may derive a block partitioning structure of a current picture based on the partitioning related information obtained from the bitstream, and may perform a series of procedures (e.g., prediction, residual signal processing, block reconstruction, in-loop filtering, etc.) for video decoding based on the derived block partitioning structure.

Partitioning of Picture into CTUs

A picture may be partitioned into a sequence of coding tree units (CTUs). The CTU may correspond to a coding tree block (CTB). Further, the CTU may include a coding tree block of luma samples and two coding tree blocks of corresponding chroma samples. In other words, for a picture including three sample arrays, the CTU may include an N×N block of luma samples and two corresponding blocks of chroma samples.

A maximum supported size of a CTU for coding/decoding and prediction may be different from a maximum supported size of a CTU for transform. For example, a maximum supported size of luma block in a CTU may be 128×128.

Partitioning of CTUs Using a Tree Structure

A CTU may be partitioned into CUs based on a quadtree (QT) structure. The QT structure may be referred to as a quaternary tree structure. The partitioning based on the QT structure is to reflect various local characteristics. In the present disclosure, the CTU may be partitioned based on multi-type tree structure including binary tree (BT) or ternary tree (TT) in addition to QT. Hereinafter, a QTBT structure may include quadtree and binary-tree based partitioning structures, and a QTBTTT structure may include quadtree, binary-tree, and ternary-tree based partitioning structures. In the coding tree structure, the coding unit (CU) partitioned from the CTU may have a square or rectangular shape. The CTU may be first partitioned into the QT structure. Thereafter, leaf nodes of the QT structure may be additionally partitioned by a multi-type tree structure.

FIG. 3 illustrates an example of a multi-type tree structure applicable to an embodiment of the present disclosure.

In an embodiment of the present disclosure, a multi-type tree structure may include four split types as illustrated in FIG. 3. The four split types illustrated in FIG. 3 may include a vertical binary splitting (SPLIT_BT_VER) 310, a horizontal binary splitting (SPLIT_BT_HOR) 320, a vertical ternary splitting (SPLIT_TT_VER) 330, and a horizontal ternary splitting (SPLIT_TT_HOR) 340. Leaf nodes of the multi-type tree structure may be called as CUs. The CUs may be used as a unit for a prediction and transform procedure. In the present disclosure, a CU, a PU and a TU may have the same block size or different block sizes. If a maximum supported transform length is less than a width or a height of a color component of the CU, the CU and the TU may have different block sizes.

FIG. 4 illustrates an example of a signalling mechanism of split information of a quadtree with nested multi-type tree structure applicable to embodiments of the present disclosure.

In FIG. 4, the CTU corresponds to a root node of the quadtree and first split into the quadtree structure. Thereafter, each quadtree leaf node may be further split into the multi-type tree structure. In the multi-type tree structure of FIG. 4, a flag (e.g., mtt_split_cu_flag) for indicating whether a specific node is additionally split may be signaled. When the corresponding node is additionally split, a flag (e.g., mtt_split_cu_vertical_flag) for indicating a splitting direction may be signaled. Thereafter, a flag (e.g., mtt_split_ cu_binary_flag) for indicating whether a splitting type is binary splitting or ternary splitting may be signaled. For example, based on mtt_split_cu_vertical_flag and mtt_split_cu_binary_flag, a multi-type tree splitting mode may be determined as shown in Table 1 below.

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 illustrates an example of a method for splitting a coding tree unit (CTU) into multiple CUs based on a quadtree and nested multi-type tree structure applicable to embodiments of the present disclosure.

In this figure, bold block edges represent quadtree partitioning, and other edges represent multi-type tree partitioning. The quadtree partitioning accompanying the multi-type tree may provide a content-adapted coding tree structure. The CU may correspond to a coding block (CB). Alternatively, the CU may include a coding block of the luma samples and two coding blocks of the corresponding chroma samples. The size of the CU may set to be as large as the size of the CTU. Further, a luma sample unit of the CU may be set to 4×4. For example, in a 4:2:0 color format (or chroma format), a maximum chroma CB size may be 64×64, and a minimum chroma CB size may be 2×2.

For example, a maximum supported luma TB size may be 64×64, and a maximum supported chroma TB size may be 32×32. If the width or height of the CB partitioned depending on the tree structure is greater than a maximum transform width or a maximum transform height, the corresponding CB may be automatically (or implicitly) partitioned until the TB size limitations in the horizontal and vertical directions are satisfied.

For a quadtree coding tree accompanying the multi-type tree, the following parameters may be defined and identified as syntax elements of a slice parameter set (SPS).
CTU size: the root size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type splitting from a quadtree leaf
MinBtSize: the minimum allowed binary tree leaf node size
MinTtSize: the minimum allowed ternary tree leaf node size As an example of the quadtree coding tree structure accompanying the multi-type tree, the CTU size may be configured as 128×128 luma samples and 64×64 blocks of two corresponding chroma samples (in the 4:2:0 chroma format). In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. The quadtree partitioning is applied to the CTU to generate quadtree leaf nodes. The quadtree leaf node may be referred to as a leaf QT node. The quadtree leaf nodes may have a 128×128 size (i.e., the CTU size) from a 16×16 size (i.e., the MinOTSize). When the leaf QT node is 128×128, the leaf QT node may not be additionally partitioned into the binary tree/ternary tree. In this case, the reason is that even though the leaf QT node is partitioned, the size of the leaf QT node exceeds MaxBtSize and MaxTtSize (64×64). In other cases, the leaf QT node may be additionally partitioned into the multi-type tree structure. When the multi-type tree depth reaches MaxMttdepth (e.g., 4), additional partitioning may not be considered any longer. When the width of the multi-type tree node is equal to MinBtSize and equal to or smaller than 2×MinTtSize, additional horizontal partitioning may not be considered any longer. When the height of the multi-type tree node is equal to MinBtSize and equal to or smaller than 2×MinTtSize, additional vertical partitioning may not be considered any longer.

FIG. 6 illustrates a method for limiting ternary tree split to which the present disclosure is applicable.

Referring to FIG. 6, for the purpose of the design of 64×64 luma block and 32×32 chroma pipeline in the decoder 200, a ternary tree (TT) split may be limited in a specific case. For example, if a width or a height of a luma coding block is greater than a predetermined specific value (e.g., 32 or 64), the TT split may be limited as illustrated in FIG. 6.

Further, a coding tree scheme may support that luma and chroma blocks have a separate block tree structure. For P-slice (slice referencing the previous picture or slice) and B-slice (slice referencing a plurality of pictures or slices), luma CTBs and chroma CTBs in one CTU may be limited to have the same coding tree structure. However, for I-slice (slice to which intra prediction is applied), luma and chroma blocks may have individual block tree structures. If all the individual block tree structures are applied, a luma CTB may be partitioned into CUs based on a specific coding tree structure, and a chroma CTB may be partitioned into chroma CUs based on other coding tree structure. In other words, this may mean that the CTU of I-slice may consist of a coding block of luma component or coding blocks of two chroma components, and the CU of P-slice or B-slice may consist of blocks of three color components.

Although the quadtree coding tree structure with nested multi-type tree has been described above through "Tree structure partitioning of CTU", but a structure in which a CU is partitioned is not limited thereto. For example, BT structure and TT structure may be interpreted as the concept included in a multiple partitioning tree (MPT) structure, and it may be interpreted that a CU is partitioned through QT structure and MPT structure. In an example where a CU is partitioned through the QT structure and the MPT structure, a syntax element (e.g., MPT_split_type) including information about how many blocks a leaf node of the QT structure is split, and a syntax element (e.g., MPT_split_mode) including information about whether a leaf node of the QT structure is split in a vertical direction or a horizontal direction may be signaled, and thus a partitioning structure may be determined.

In another example, a CU may be partitioned in a different method from QT structure, BT structure or TT structure.

That is, unlike that a CU of deeper depth is partitioned to ¼ size of a CU of upper depth according to the QT structure, or a CU of deeper depth is partitioned to ½ size of a CU of upper depth according to the BT structure, or a CU of deeper depth is partitioned to ¼ size or ½ size of a CU of upper depth according to the TT structure, a CU of deeper depth may be partitioned to ⅕, ⅓, ⅜, ⅗, ⅔ or ⅝ size of a CU of upper depth if necessary or desired, but a method of partitioning a CU is not limited thereto.

If a portion (portion a) of a tree node block exceeds a bottom or right picture boundary, the corresponding tree node block may be limited so that all samples of all coded CUs are positioned within the picture boundaries.

The quadtree coding block structure accompanying the multi-type tree may provide a very flexible block splitting structure. However, a coding block structure result by other splitting patterns may potentially have a coding block structure by splitting types supported by the multi-type tree. Therefore, it is possible to reduce the amount of data for transmission of splitting information by using only the splitting type supported by the multi-type tree to limit the occurrence of redundant splitting patterns.

FIG. 7 illustrates an example of redundant split patterns that may occur in binary tree split and ternary tree split applicable to embodiments of the present disclosure.

As illustrated in FIG. 7, continuous binary splitting for one direction of two levels has the same coding block structure as the binary splitting for the central part after the ternary splitting. In this case, the binary tree splitting for the center of the ternary tree splitting may be limited. The limitation of the splitting may be applied to CUs of all pictures. When specific splitting is limited, signaling of syntax elements may be modified by reflecting such a limitation of the splitting and the number of bits signaled for the splitting may be reduced through the modified signaling. For example, as illustrated in FIG. 7, when the binary tree splitting for the central part of the CU is restricted, a syntax element (mtt_split_su_binary_flag) indicating whether the splitting is the binary splitting or the ternary splitting may not be signaled and the decoder 200 may determine a syntax element (mtt_split_su_binary_flag) indicating whether the splitting is the binary splitting or the ternary splitting as 0.

Prediction

In order to reconstruct a current processing unit in which decoding is performed, decoded parts of a current picture or other pictures including the current processing unit may be used.

A picture (slice) using only the current picture for reconstruction, i.e., performing only the intra prediction may be referred to as an intra picture or an I-picture (I-slice), a picture (slice) using one motion vector and one reference index in order to predict each unit may be referred to as a predictive picture or P-picture (P-slice), and a picture (slice) using two or more motion vectors and reference indexes may be referred to as a bi-predictive picture or B-picture (B-slice).

The inter prediction means a prediction method of deriving a sample value of the current block based on data elements (e.g., the sample value or motion vector) of pictures other than the current picture. In other words, the intra prediction means a method for predicting the sample value of the current block by referring to reconstructed areas in other reconstructed pictures other than the current picture.

Hereinafter, the intra prediction will be described in more detail.

Intra Prediction

The intra prediction means a prediction method that derives the sample value of the current block from a data element (e.g., a sample value, etc.) of the same decoded picture (or slice). In other words, the intra prediction means a method for predicting the sample value of the current block by referring to reconstructed areas in the current picture.

The intra prediction may represent prediction of generating a prediction sample for the current block based on a reference sample outside the current block in a picture (hereinafter, referred to as the current picture) to which the current block belongs.

In embodiments of the present disclosure, a detailed technique of the prediction method described in FIGS. 1 and 2 above is described and the embodiment of the present disclosure may correspond to an intra prediction based video/image decoding method of FIG. 10 and an intra prediction unit in a decoder 200 of FIG. 11 to be described below. Furthermore, an embodiment of the present disclosure may correspond to an intra prediction based video/image decoding method of FIG. 8 and an apparatus of an intra prediction unit 185 in an encoder 100 of FIG. 9 to be described below. Data encoded by FIGS. 8 and 9 may be stored in a memory included in the encoder 100 or decoder 200 in the form of a bitstream, or a memory functionally coupled to the encoder 100 or decoder 200.

When the intra prediction is applied to the current block, neighboring reference samples to be used for the intra prediction of the current block may be derived. The neighboring reference samples of the current block may include a sample adjacent to a left boundary of the current block having a size of nW×nH and a total of 2×nH samples adjacent to a bottom left side, a sample adjacent to an upper boundary of the current block, and a total of 2×nW adjacent to a top right side, and one sample adjacent to a top left side of the current block. Alternatively, the neighboring reference samples of the current block may include a plurality of columns of upper neighboring samples of a plurality of rows of left neighboring samples. Furthermore, the neighboring reference samples of the current block may include samples located on left or right vertical lines and upper or lower horizontal lines adjacent to the current block.

However, some of the neighboring reference samples of the current block may not yet be decoded or may not be available. In this case, the decoder 200 may configure the neighboring reference samples to be used for the prediction by substituting samples which are not available as the available samples. Alternatively, the neighboring reference samples to be used for the prediction may be configured through interpolation of the available samples. For example, samples located on a vertical line adjacent to the right side of the current block and samples located on a horizontal line adjacent to the lower side of the current block may be substituted based on samples located on the left vertical line of the current block and samples located on the upper horizontal line of the current block or configured through the interpolation.

When the neighboring reference samples are derived, i) prediction samples may be derived based on an average or interpolation of the neighboring reference samples of the current block, and ii) the prediction sample may be derived based on a reference sample which exists in a specific (prediction) direction for the prediction sample among the neighboring reference samples of the current block. A prediction mode such as i) may be referred to as a non-directional prediction mode or a non-angular prediction mode, and a prediction mode such as ii) may be referred to as a directional prediction mode or an angular prediction mode. In addition, the prediction sample may be generated through interpolation of a first neighboring sample located in the prediction direction of the intra prediction mode of the current block and a second neighboring sample located in an opposite direction to the prediction direction based on the prediction sample of the current block. As such, a prediction technique based on linear interpolation between the reference samples located in the prediction direction and the opposite direction to the prediction direction based on the prediction sample of the current block may be referred to as linear interpolation intra prediction (LIP). Furthermore, a temporary prediction sample of the current block may be derived based on filtered neighboring reference samples, and the prediction sample of the current block may be derived through a weighted sum of at least one reference sample derived according to the intra prediction mode among the conventional neighboring reference samples, i.e., the filtered neighboring reference samples and temporary prediction samples. Prediction through the weighted sum of a plurality of samples may be referred to as position dependent intra prediction (PDPC).

Meanwhile, post-filtering may be performed on the derived prediction sample as necessary. Specifically, an intra prediction procedure may include an intra prediction mode determining step, a neighboring reference sample deriving step, an intra prediction mode based prediction sample deriving step, and may include a post-processing filtering step for the derived prediction sample as necessary.

A video encoding procedure based on the intra prediction and an intra prediction unit 185 in the encoder 100 may be expressed as illustrated in FIGS. 8 and 9.

FIGS. 8 and 9 illustrate an intra prediction based video encoding method according to an embodiment of the present disclosure and an example of an intra prediction unit in an encoding apparatus according to an embodiment of the present disclosure.

In FIG. 8, step S810 may be performed by the intra prediction unit 185 of the encoder 100, and steps S820 and S830 may be performed by a residual processing unit. Specifically, step S820 may be performed by a subtraction unit 115 of the encoder 100, and step S830 is performed by an entropy encoding unit 190 using residual information derived by the residual processing unit and prediction information derived by the intra prediction unit 185. The residual information as information on residual samples may include information on quantized transform coefficients for the residual samples.

As described above, the residual samples may be derived as transform coefficients by the transform unit 120 of the encoder 100 and the derived transform coefficients may be derived as transform coefficients quantized by the quantization unit 130. Information on the quantized transform coefficients may be encoded by the entropy encoding unit 190 through a residual coding procedure.

In step S810, the encoder 100 performs intra prediction for the current block. The encoder 100 determines the intra prediction mode for the current block, derives the neighboring reference samples of the current block, and generates the prediction samples in the current block based on the intra prediction mode and the neighboring reference samples. Here, the determination procedure of the intra prediction mode, the derivation procedure of the neighboring reference sample, and the generation procedure of the prediction samples may be simultaneously performed or sequentially performed. For example, the intra prediction unit 100 of the encoder 100 may include a prediction mode determination unit 186, a reference sample derivation unit 187, and a prediction sample generation unit 188, and the prediction mode determination unit 186 may determine the prediction mode for the current block, the reference sample derivation unit 187 may derive the neighboring reference sample of the current block, and the prediction sample generation unit 188 may derive motion samples of the current block. Meanwhile, although not illustrated, when a prediction sample filtering procedure to be described below is performed, the intra prediction unit 185 may further include a prediction sample filter unit (not illustrated). The encoder 100 may determine a prediction mode to be applied to the current block among a plurality of intra prediction modes. The encoder 100 may compare rate-distortion cost (RD cost) for the intra prediction modes and determine an optimal intra prediction mode for the current block.

Meanwhile, the encoder 100 may perform prediction sample filtering. The prediction sample filtering may be called post filtering. Filtering for some or all of the prediction samples may be performed by the prediction sample filtering procedure. In some cases, the prediction sample filtering may be omitted.

In step S820, the encoder 100 may generate the residual sample for the current block based on the (filtered) prediction sample. Thereafter, in step S830, the encoder 100 may encode video data including prediction mode information including the intra prediction mode and information on the residual samples. The encoded video data may be output in the form of a bitstream. The output bitstream may be transferred to the decoder 200 via a storage medium or a network.

Meanwhile, the encoder 100 described above may generate a reconstructed picture including reconstructed samples and reconstructed blocks based on the reference samples and the residual samples. The derivation of the reconstructed picture by the encoder 100 is to derive the same prediction result as being performed by the decoder 200 by the encoder 100, thereby increasing coding efficiency. Moreover, a subsequent procedure such as in-loop filtering may be performed for the reconstructed picture.

FIGS. 10 and 11 illustrate an intra prediction based video/image encoding method according to an embodiment of the present disclosure and an example of an intra prediction unit in a decoder according to an embodiment of the present disclosure.

Referring to FIGS. 10 and 11, the decoder 200 may perform an operation corresponding to the operation performed by the encoder 100. The decoder 200 may derive the prediction sample by performing prediction for the current block based on the received prediction information.

Specifically, in step S1010, the decoder 200 may determine the intra prediction mode for the current block based on the prediction mode information acquired from the encoder 100. In step S1020, the decoder 200 may derive the neighboring reference sample of the current block. In step S1030, the decoder 200 may generate the prediction sample in the current block based on the intra prediction mode and the neighboring reference samples. Furthermore, the decoder 200 may perform the prediction sample filtering procedure, and the prediction sample filtering procedure may be referred to as post filtering. Some or all of the prediction samples may be filtered by the prediction sample filtering procedure. In some cases, the prediction sample filtering procedure may be omitted.

In step S1040, the decoder 200 may generate the residual sample based on the residual information acquired from the encoder 100. In step S1050, the decoder 200 may generate the reconstructed sample for the current block based on the (filtered) prediction samples and the residual samples and generate the reconstructed picture using the generated reconstructed samples.

Here, the intra prediction unit 265 of the decoder 100 may include a prediction mode determination unit 266, a reference sample derivation unit 267, and a prediction sample generation unit 268, and the prediction mode determination unit 266 may determine the intra prediction mode of current block based on the prediction mode generated by the prediction mode determination unit 186 of the encoder 100, the reference sample derivation unit 267 may derive the neighboring reference sample of the current block, and the prediction sample generation unit 268 may derive the prediction sample of the current block. Meanwhile, although not illustrated, when the prediction sample filtering procedure is performed, the intra prediction unit 265 may further include a prediction sample filter unit (not illustrated).

The prediction mode information used for the prediction may include a flag (e.g., prev_intra_luma_pred_flag) indicating whether a most probable mode (MPM) is applied to the current block or the remaining mode is applied. When the MPM is applied to the current block, the prediction mode information may further include an index (mpm_idx) indicating one of intra prediction mode candidates (MPM candidates). The intra prediction mode candidates (MPM candidates) may be configured as an MPM candidate list or an MPM list. Furthermore, when the MPM is not applied to the current block, the prediction mode information may further include remaining mode information (e.g., rem_inra_luma_pred_mode) indicating one of the remaining intra prediction modes other than the intra prediction mode candidates (MPM candidates).

Meanwhile, the decoder 200 may determine the intra prediction mode of the current block based on the prediction information. The prediction mode information may be encoded/decoded through a coding method to be described below. For example, the prediction mode information may be encoded or decoded through entropy coding (e.g., CABAC, CAVLC) based on a truncated binary code.

Hereinafter, focusing on the operation of the decoder 200, a prediction technique according to an embodiment of the present disclosure will be described. Although embodiments of the present disclosure are described focusing on the decoder 200, the embodiments of the present disclosure may be applied to the encoder 100 as well as the decoder 200.

Determination of Intra Prediction Mode

When the intra prediction is applied, the intra prediction mode to be applied to the current block may be determined using the intra prediction mode of the neighboring block. For example, the decoder 200 may select a candidate indicated by the MPM index received from the encoder 100 among the MPM candidates derived based on an intra prediction mode of a left adjacent block adjacent to the current block and an intra prediction mode of an upper adjacent block adjacent to the upper side of the current block, as the intra prediction mode of the current block. Here, the MPM index may be signaled in the form of a syntax element (e.g., mpm_idx), and the remaining intra prediction mode information may also be signaled in the form of a syntax element (e.g., rem_intra_luma_pred_mode). For example, the remaining intra prediction mode information may include an index indicating a prediction mode applied to the current block from a list in which the remaining intra prediction modes not included in the MPM candidates among all intra prediction modes are arranged in the order of a prediction mode number.

FIGS. 12 and 13 illustrate examples of a prediction direction of an intra prediction mode which may be applied to embodiments of the present disclosure.

Referring to FIG. 12, the intra prediction mode may include 2 non-directional intra prediction modes and 33 intra directional prediction modes. The non-directional intra prediction modes may include a planar intra prediction mode and a DC intra prediction mode, and the directional intra prediction mode may include intra prediction modes #2 to #34. The planar intra prediction mode may be referred to as a planner mode, and the DC intra prediction mode may be referred to as a DC mode.

Meanwhile, in order to capture an arbitrary edge direction presented in a natural video, the directional intra prediction mode may include 33 to 65 directional intra prediction modes of FIG. 12 as illustrated in FIG. 13 to be described below. In FIG. 13, the non-directional intra prediction modes may include a planar mode and a DC mode, and the directional intra prediction modes may include intra prediction modes #2 to #66. As illustrated in FIG. 13, extended directional intra prediction may be applied to blocks of all sizes, and may be applied to both a luma component and a chroma component.

Furthermore, the intra prediction mode may be 2 non-directional intra prediction modes and 129 intra directional prediction modes. Here, the non-directional intra prediction modes may include a planar mode and a DC mode, and the directional intra prediction mode may include intra prediction modes #2 to #130.

In an embodiment, the decoder 200 may generate the prediction sample using 33 (or 65) directional prediction methods and 2 non-directional prediction methods, at least one of a total of 35 (or 67) prediction modes and the neighboring reference sample through the decoder 200. Here, assuming that the neighboring reference samples are decoded in a raster scan order, the neighboring reference samples may become a top reference sample or a left reference sample.

In an embodiment, the decoder 200 may copy the sample value of the reference sample located in the prediction direction from the position of the prediction sample and apply the copied value to the prediction sample. In this case, since a simply copied value is used according to the prediction direction, the accuracy of the prediction may deteriorate as a distance between the reference sample and the prediction sample increases. That is, when the distance between the reference sample and the prediction sample used for the prediction decreases, the prediction accuracy may be high, but when the distance between the reference sample and the prediction sample increases, the prediction accuracy may be low.

In order to reduce such a prediction error, embodiments of the present disclosure provide a linear interpolation intra prediction method for generating a prediction sample to which a weight is applied based on the distance between the prediction sample and the reference sample. In particular, in an embodiment of the present disclosure, a prediction method of generating the reference sample located on the lower side or the right side of the current block and determining the sample value of the prediction sample based on an actual distance between samples adjacent to the current block and the prediction sample in the linear interpolation prediction method will be described.

FIG. 14 illustrates examples of prediction samples and reference samples to which linear interpolation intra prediction is applied according to an embodiment of the present disclosure.

As illustrated in FIG. 14, in the linear interpolation intra prediction method, the prediction sample may be generated by a weighted sum depending on a distance between a top reference sample already reconstructed through encoding or decoding and a temporary reference sample generated through the prediction as the temporary reference sample is not yet encoded or decoded. Referring to FIG. 14, the decoder 200 may generate a top reference sample P and a bottom reference sample P' for prediction of a current sample C, and allocate a distance ratio of the two reference samples as a weight value. That is, the decoder 200 may generate a prediction sample C by allocating a weight value of W1 to the top reference sample P and a weight value of W2 to the bottom reference sample P'. In an embodiment, the weigh value may be determined based on a distance between a current sample to be predicted and each reference sample. In an embodiment, if the distance between the current sample to be predicted and the reference sample is far, the weight value is small, and conversely, if the distance between the prediction sample to be predicted and the reference sample is close, the weight value is large. For example, in FIG. 14, reference samples P and P' are used for prediction of the current sample C, and since the distance between the current sample C and the top reference sample P is relatively close, and conversely, the distance between the current sample C and the bottom reference sample P' is relatively far, and as a result, a large weight value may be allocated to a near reference sample P for prediction of the current sample C, whereas the a small weight value may be allocated to the far reference sample P' (W1>W2). According to an embodiment of the present disclosure, the weight value may be assigned based on the distance between the current sample and the reference sample, and besides, the weight value may be allocated using various methods. For example, a cosine function or a least square method may be used.

Embodiment 1: Linear Interpolation Intra Prediction Encoding/Decoding

Embodiment 1-1: Linear Interpolation Intra Prediction Encoding/Decoding Method

FIG. 15 illustrates an example of a flowchart for encoding using linear interpolation intra prediction according to an embodiment of the present disclosure.

As illustrated in FIG. 15, after confirming that the intra prediction is applied for intra prediction encoding in step S1510, the encoder 100 may determine whether the linear interpolation intra prediction is applied in step S1520. When the linear interpolation intra prediction is applied, the encoder 100 determines candidate modes to be used for determining an optimal mode through rough mode decision in step S1531. Thereafter, in step S1541, the encoder 100 adds a similar mode using the MPM method. Thereafter, in step S1551, the encoder 100 determines an optimal intra prediction mode through rate-distortion (RD) optimization. When the linear interpolation intra prediction is not applied, the encoder 100 determines candidate modes to be used for determining the optimal mode through rough mode decision in step S1532. Thereafter, in step S1542, the encoder 100 adds the similar mode using the MPM method. Thereafter, in step S1552, the encoder 100 determines the optimal intra prediction mode through the RD optimization. In step S1560, the encoder 100 may determine the optimal intra prediction mode determined in step S1551 or S1552 as a final intra prediction mode.

Further, steps S1532 and S1552 may be performed in parallel with steps S1531 to S1551 illustrated in FIG. 15. Since such an intra prediction encoding method applies the conventional intra prediction encoding method and the linear interpolation intra prediction method to all intra prediction modes and then, determines an optimal mode, complexity may increase. Accordingly, embodiments described below provide a linear interpolation intra prediction encoding method that increases encoding efficiency while reducing the complexity.

FIG. 16 illustrates an example of a flowchart for decoding using linear interpolation intra prediction according to an embodiment of the present disclosure. Operations illustrated in FIG. 16 may be performed by the decoder 200.

Referring to FIG. 16, in step S1610, the decoder 200 checks whether the linear interpolation intra prediction (LIP) is applied to the current block. When the LIP is applied to the current block, the decoder 200 checks whether the MPM is used in step S1612. Thereafter, when the MPM is used, the decoder 200 parses the MPM index in step S1632. When the MPM is not used, the decoder 200 parses the intra prediction mode in step S1631. When the LIP is not applied to the current block (as in the conventional intra prediction of HEVC), the decoder 200 checks whether the MPM is used in step S1622. Thereafter, when the MPM is used, the decoder 200 parses the MPM index in step S1632. When the MPM is not used, the decoder 200 parses the intra prediction mode in step S1633.

FIG. 17 illustrates an example of a flowchart for a low-complexity linear interpolation intra prediction decoding process according to an embodiment of the present disclosure. Operations illustrated in FIG. 17 may be performed by the decoder 200.

As illustrated in FIG. 17, compared to the intra prediction encoding method of FIG. 16, in the linear interpolation intra prediction decoding method having low complexity, the MPM index is directly parsed without an MPM flag parsing part when the current block is an LIP block. The reason is that in the linear interpolation intra prediction decoding method having low complexity, if the current block is a block to which LIP is applied, the mode generated through the MPM is limited to a candidate mode. Therefore, when the current block is the LIP block, the number of bits for MPM flag encoding may be reduced.

FIG. 18 illustrates an example of a flowchart for a low-complexity linear interpolation intra prediction encoding process according to an embodiment of the present disclosure. Operations illustrated in FIG. 18 may be performed by the decoder 200.

As illustrated in FIG. 18, after confirming that the intra prediction is applied for the intra prediction encoding in step S1810, the encoder 100 may determine whether the linear interpolation intra prediction is applied in step S1820. When the linear interpolation intra prediction is applied, the encoder 100 determines a rough mode as the similar mode using the MPM method in step S1841.

Thereafter, in step S1851, the encoder 100 determines the optimal intra prediction mode through the RD optimization. When the linear interpolation intra prediction is not applied, the encoder 100 determines candidate modes to be used for determining the optimal mode through rough mode decision in step S1832. Thereafter, in step S1842, the encoder 100 adds the similar mode using the MPM method. Thereafter, in step S1852, the encoder 100 determines the optimal intra prediction mode through the RD optimization. In step S1860, the encoder 100 may determine the optimal intra prediction mode determined in step S1851 or S1852 as the final intra prediction mode. Further, steps S1532 and S1552 may be performed in parallel with steps S1531 to S1551 illustrated in FIG. 15.

In the intra prediction encoding method of FIG. 18, the optimal mode is determined through the same process as the method of FIG. 15. However, in the linear interpolation intra prediction encoding method, unlike the linear interpolation intra prediction encoding method of the intra prediction encoding method of FIG. 15, a rough mode decision process and a selective similar mode adding process are omitted and instead, the rough mode decision method is used as the similar mode to determine the candidate mode for determining the optimal mode.

The method for determining the rough mode as the similar mode of the linear interpolation intra prediction encoding method of FIG. 18 is a method of using the candidate mode selected through the MPM method as a mode used to determine the optimal mode. In the conventional method, after determining a few candidate modes through the rough mode determining method, some of the candidate modes selected through the MPM method are added to the candidate mode and the generated candidate mode is used to determine the optimal mode. However, in the proposed method, all candidate modes selected through the MPM method are used as the candidate mode to determine the optimal mode.

When the linear interpolation intra prediction encoding method with low complexity illustrated in FIG. 18 is used, if the current block is a block encoded in the linear interpolation intra prediction mode, the MPM flag need not be encoded, and as a result, generation bits for the MPM flag may be reduced.

Embodiment 1-2: Linear Interpolation Intra Prediction Encoding/Decoding Method with Reduced Complexity In the embodiment, a method for reducing the complexity of the encoding and decoding procedures of the linear interpolation intra prediction proposed in Embodiment 1-1 is proposed. Regarding the MPM index, a low index number is allocated to an intra prediction mode having a high occurrence frequency and conversely, a high index number is allocated to an intra prediction mode having a low occurrence frequency. From the perspective of entropy encoding, a small quantity of bits are allocated to the intra prediction mode having the high occurrence frequency and conversely, a large quantity of bits are allocated to the intra prediction mode having the low occurrence frequency, thereby enhancing the encoding efficiency. Therefore, there is a high possibility that the intra prediction mode having the low index number will become the optimal intra prediction mode of the current block. Proposed is a method for reducing encoding and decoding complexity using the linear interpolation intra prediction based on the index number allocation.

In the encoding/decoding method according to the embodiment, first, a cost value of MPM index #0 is calculated, and then cost values from MPM index #1 to MPM index #5 and the cost value of MPM index #0 are compared and thereafter, a mode having a smaller cost than MPM index #0 including a mode of MPM index #0 mode is used as the candidate mode for determining the optimal mode. In this case, the cost value may be largely calculated by two methods.

1) Method Considering Distortion

In the method considering the distortion with the cost value, the distortion is calculated using a method such as sum of absolute transformed differences (SATD), sum of absolute difference (SAD), or sum of square difference (SSD) between the prediction block and the original block.

2) Method Considering Rough Mode Decision

As the method considering the rough mode decision with the cost value, a rough mode decision method used in the intra prediction encoding method of FIG. 15 may be used. That is, after determining a distortion value by calculating the degree of distortion (SATD) between the prediction block and the original block and predicting a bit value B used for prediction mode encoding, the cost value is calculated considering a Lagrangian constant $\lambda$. Equation 1 is an equation for calculating the cost value of the rough mode decision method.

$$RMMD_{cost} = SATD + (\lambda * B) \qquad [\text{Equation 1}]$$

A balance between the complexity and performance of the proposed method may be adjusted by changing the cost value of the MPM index #0 mode through Equation 2. Equation 2 is an equation for adjusting the cost value of the MPM index #0 mode.

$$MPM_{index0\_cost'} = \alpha * MPM_{index0\_cost} \qquad [\text{Equation 2}]$$

As shown in Equation 2, the cost value of MPM index #0 may be changed using an $\alpha$ value, and through this, the candidate mode to be used in the optimal mode determination process may be selectively selected from the MPM index #1 mode to an MPM index #5 mode. This allows the balance of the complexity and the performance to be adjusted.

Embodiment 2: Planar Mode in Linear Interpolation Intra Prediction

The embodiment relates to a method for encoding/decoding a still image or a moving image, and more particularly, to a method for encoding/decoding a still image or a moving image based on an increase in accuracy of prediction by performing a method for improving a method for performing linear interpolation prediction using more reference samples in the intra prediction encoding, and an apparatus for supporting the same.

The embodiment proposes a method for replacing the conventional HEVC planar mode with the linear interpolation prediction mode.

The embodiment proposes a method for replacing the planar mode with the linear interpolation prediction mode.

The embodiment proposes a method for allocating a weight value according to a distance during the linear interpolation prediction.

The embodiment proposes a method for determining the weight value using a value of a cosine function.

The embodiment proposes a method for determining the weight value using a least square method.

The embodiment proposes a method for encoding a linear interpolation prediction flag.

The embodiment proposes a method for allocating different context models for each block size.

The embodiment proposes a method for determining the context model using a neighboring linear interpolation prediction block.

The embodiment as a method for improving the method for performing the linear interpolation using more reference samples at the time of intra prediction-encoding the still image or the moving image may more efficiently process a complex image.

Embodiment 2-1: Planar Mode in Linear Interpolation Intra Prediction

FIG. 19 illustrates an example of a prediction method according to a planar mode.

In FIG. 19, a linear combination of corresponding reference samples O and A, and E and S is used for prediction of the current sample C to which the planar mode is applied. Since this is a special case of linear interpolation prediction, the planar mode is applied through general linear interpolation prediction.

FIG. 20 illustrates an example of a planar mode in linear interpolation intra prediction according to an embodiment of the present disclosure.

As illustrated in FIG. 20, in the case of a new planar mode to which a linear interpolation method is applied, a linear combination of respective corresponding top reference sample, right reference sample, bottom reference sample, and left reference sample O, e, m, and E is used for prediction of the current sample C.

Accordingly, if the linear interpolation prediction is used for the current block to be encoded and the intra prediction mode is the planar mode at that time, a planar prediction block is generated using the planar mode to which the linear interpolation method is applied.

Embodiment 2-2: Determination of Weight Value in Linear Interpolation Intra Prediction Referring to FIG. 14, the decoder 200 may generate a top reference sample P and a bottom reference sample P' for prediction of a current sample C, and allocate a distance ratio of the two reference samples as the weight value. That is, the decoder 200 may generate a prediction sample C by allocating a weight value of W1 to the top reference sample P and a weight value of W2 to the bottom reference sample P'. In an embodiment, the weigh value may be determined based on a distance between a current sample to be predicted and each reference sample. In an embodiment, if the distance between the current sample to be predicted and the reference sample is far, the weight value is small, and conversely, if the distance between the prediction sample to be predicted and the reference sample is close, the weight value is large. For example, in FIG. 14, reference samples P and P' are used for prediction of the current sample C, and since the distance between the current sample C and the top reference sample P is relatively close, and conversely, the distance between the current sample C and the bottom reference sample P' is relatively far, and as a result, a large weight value may be allocated to a near reference sample P for prediction of the current sample C, whereas the a small weight value may be allocated to the far reference sample P' (W1>W2). According to an embodiment of the present disclosure, the weight value may be assigned based on the distance between the current sample and the reference sample, and besides, the weight value may be allocated using various methods. For example, the cosine function or the least square method may be used.

Since the weight value applied to the current sample is not particularly proportional to the distance between the reference sample and the current sample, the weight value may be determined using various other methods. The embodiment proposes two methods, i.e., 1) determining the weight value using the value of the cosine function and 2) determining the weight value using the least square method in order to determine the weight value. Respective detailed methods will be described in detail.

1) Determining Weight Value Using Value of Cosine Function

FIG. 21 illustrates an example of a graph for determining a weight in a 4×4 block by using a cosine function in linear interpolation intra prediction according to an embodiment of the present disclosure.

As illustrated in FIG. 21, first, a highest value and a lowest value to be used as the weight value are determined. In FIG. 21, the highest value is set to 0.9 and the lowest value is set to 0.1. The highest value and the lowest value may be determined as arbitrary values. An angle corresponding to the highest value and an angle corresponding to the lowest value are set to a start angle (26°) and an end angle (84°), respectively and a range (84°−26°=58°) of the angle is evenly divided into three ranges according to a 4×4 block. The angles divided into three ranges are 26°-46°, 46°-65°, and 65°-84°, respectively. Conversely, after a value corresponding to each angle indicated in FIG. 21 is determined, this value may be determined as the weight value according to the distance of the 4×4 block.

Weight values to be used in blocks having various sizes, including an 8×8 block, a 16×16 block, and the like may also be determined similarly using the same method.

FIG. 22 illustrates another example of a graph for determining a weight in a 4×4 block by using a cosine function in linear interpolation intra prediction according to an embodiment of the present disclosure.

In the case of the 4×4 block, a distance between the top reference sample P and the bottom reference sample P' may be evenly divided into five ranges. FIG. 22 illustrates a method for determining the weight value using the top reference sample and the bottom reference sample. In the method for determining the weight value according to FIG. 22, the highest value and the lowest value need not be determined unlike the method for determining the weight value of FIG. 21. That is, after the angle is equally divided into 5 as illustrated in FIG. 22, a highest reference sample corresponds to 0°, a lowest reference sample corresponds to 90°, and in the case of the 4×4 block, according to the distance to each reference sample, the weight values are allocated, which correspond to 18°, 36°, 54°, and 72°, respectively. The weight values to be used in the blocks having various sizes, including the 8×8 block, the 16×16 block, and the like may also be determined through the similar method.

FIG. 23 illustrates an example of a process of generating a prediction block using a weight value calculated in linear interpolation intra prediction according to an embodiment of the present disclosure.

As illustrated in FIG. 23, when the weight value calculated in FIG. 21 is used, a weight value wUP1 of 0.9 is allocated to the top reference sample P1 for prediction of the prediction sample C1 located in a first row and a weight value wDOWN1 of 0.1 is allocated to the bottom reference sample P'1. A weight value wUP2 of 0.69 is allocated to the top reference sample P2 for prediction of the prediction sample C2 located in a second row and a weight value wDOWN2 of 0.31 is allocated to the bottom reference sample P'2. In the same method, prediction values of a sample C3 located in a third row and a sample C4 located in a fourth row may be determined.

Further, when the weight value calculated in FIG. 22 is used, a weight value wUP1 of 0.95 is allocated to the top reference sample P1 for prediction of the prediction sample C1 located in the first row and a weight value wDOWN1 of 0.05 is allocated to the bottom reference sample P'1. A weight value wUP2 of 0.81 is allocated to the top reference sample P2 for prediction of the prediction sample C2 located in the second row and a weight value wDOWN2 of 0.19 is allocated to the bottom reference sample P'2. In the same method as above, values of the sample C3 located in the third row and the sample C4 located in the fourth row may be determined.

Table 2 shows the weight value allocated to each sample in the 4×4 block.

TABLE 2

| | Weight value | | | |
|---|---|---|---|---|
| | Method of FIG. 21 | | Method of FIG. 22 | |
| Position | Upside weight value ($w_{UP}$) | Downside weight value ($w_{DOWN}$) | Upside weight value ($w_{UP}$) | Downside weight value ($w_{DOWN}$) |
| Sample located in first row | 0.9 | 0.1 | 0.95 | 0.05 |
| Sample located in second row | 0.69 | 0.31 | 0.81 | 0.19 |
| Sample located in third row | 0.42 | 0.58 | 0.59 | 0.41 |
| Sample located in fourth row | 0.1 | 0.9 | 0.31 | 0.69 |

The weight values shown in Table 2 are values extracted from an actual cosine function values, and if necessary, in order for the weight values to be implemented in an actual system, slight weight fitting may be required to reduce computational complexity and convenience of hardware implementation. For example, the weight value calculated by the method of FIG. 21 may be configured to be represented by a 2N combination as follows. Table 3 is a table in which the weight value of the method of FIG. 21 of Table 2 is fit. In the method of FIG. 22, the weight may also be fitted using the same method.

1) 0.9=½+¼+⅛=0.875
2) 0.69=½+⅛+ 1/16=0.6875
3) 0.31=¼+⅛− 1/16=0.3125
4) 0.42=¼+⅛+ 1/16=0.4375
5) 0.58=½+ 1/16=0.5625
6) 0.1=⅛=0.125

TABLE 3

| | Weight value | |
|---|---|---|
| Position | Upside weight value ($w_{UP}$) | Downside weight value ($w_{DOWN}$) |
| Sample located in first row | 0.875 | 0.125 |
| Sample located in second row | 0.6875 | 0.3125 |
| Sample located in third row | 0.4375 | 0.5625 |
| Sample located in fourth row | 0.125 | 0.875 |

By using the same method for the weight value of each block calculated as above, the weight may be applied to blocks of various sizes, such as the 8×8 block, the 16×16 block, and the like, and the predicted value may be calculated.

2) Method for Determining Weight Value Using Least Square Method

In the method of determining the weight value using the least square method, the original block and the optimal prediction block are first generated, and then a weight value that minimizes residual energy for the original block and the optimal prediction block is calculated through the least square method. In the method of determining the weight value using the least square method, the weight value is pre-calculated through offline training.

FIG. 24 illustrates a conceptual view of calculating a weight value wij using a least square method in linear interpolation intra prediction according to an embodiment of the present disclosure. The weight value is determined so that the energy of the residual block, which is the difference between the original block and the prediction block, is minimized. Here, the weight value is calculated for each sample position and calculated using the least square method as shown in Equation 3.

$$w_{ij} = \frac{E(O_{ij}P_{ij})}{E(P_{ij}^2)} \quad \text{[Equation 3]}$$

Here, wij represents the weight value of the (i,j)-th position. E( ) represents an operator representing an expectation. Here, the weight value wij may be calculated in different methods according to various conditions. For example, the weight value may be calculated according to the block size, or the weight value may be calculated according to the intra prediction mode. That is, the weight value may be calculated according to various conditions and methods. The weight is pre-calculated through the offline training based on different conditions and methods and then, applied at the time of performing encoding/decoding to reduce the residual energy.

Embodiment 2-3: Encoding of Linear Interpolation Prediction Flag

The embodiment proposes a method for encoding a linear interpolation prediction flag (LIP_FLAG). As a method for increasing encoding efficiency, a context-based adaptive binary arithmetic coding (CABAC) method is used. In the embodiment, proposed is a method for selectively determining a context model (CMLIP_FLAG) considering statistical characteristics and a spatial correlation of the linear interpolation prediction flag.

1) Method Considering Statistical Characteristics

The method considering the statistical characteristics is a method for determining different context models considering a selection ratio of the linear interpolation prediction according to a block size or shape (square or non-square shape). For example, assuming that the linear interpolation prediction selection ratio is 20% for the 4×4 block and the 8×8 block, and the linear interpolation prediction selection ratio is 50% for the 16×16 block or more, it is effective to encode the linear interpolation prediction flag using two context models. In other words, if the size of the block to be encoded is equal to or smaller than 8×8, encoding is performed using CMLIP_FLAG1 in which the linear interpolation prediction ratio is initialized to 20% and if the size of the block is larger than 8×8, the encoding is performed using CMLIP_FLAG2 in which the linear interpolation prediction ratio is initialized to 50%.

The above-mentioned example is an example, and after statistically analyzing the occurrence rate of the linear interpolation prediction according to the actual block size, the number and initial values of context models to be used are determined and used for encoding/decoding.

2) Method Considering Spatial Correlation

The method considering the spatial correlation is a method for determining different context models considering a linear interpolation prediction occurrence frequency of a neighboring block.

FIG. 25 illustrates an example of a current block and a neighboring block for determining a context model in linear interpolation intra prediction according to an embodiment of the present disclosure. In the embodiment, the context model for the linear interpolation prediction is determined using two neighboring blocks A and L of the current block C and the context model may be determined using multiple arbitrary neighboring blocks.

As illustrated in FIG. 25, assuming that an upper block A is encoded/decoded using the linear interpolation intra prediction and a left block L is encoded/decoded without using the linear interpolation intra prediction, it is effective to use a context model in which a linear interpolation usage ratio is initialized to 50% as the context model. Assuming that both the upper block A and the left block L are encoded/decoded using the linear interpolation intra prediction, it is effective to use a context model in which the linear interpolation intra prediction usage ratio is initialized to be larger than 50% as the context model. Based thereon, the linear interpolation prediction flag may be encoded/decoded using a context model table shown in Table 4.

TABLE 4

Whether to use linear interpolation prediction

| Left block L | Upper block A | Context model CM |
|---|---|---|
| X | X | $CM_{LIP\_FLAG1}$ |
| O | X | $CM_{LIP\_FLAG2}$ |
| X | O | |
| O | O | $CM_{LIP\_FLAG3}$ |

Embodiment 3: Efficient Bottom-Right Sample Generation for Linear Interpolation Intra Prediction The embodiment relates to a method of for encoding/decoding a still image or a moving image, and more particularly, to a method for encoding/decoding a still image or a moving image based on an accurate bottom-right reference sample generating method in order to increase the accuracy of the prediction block when the linear interpolation prediction is performed in the intra-prediction encoding, and an apparatus for supporting the same.

The embodiment proposes a method for generating a bottom-right reference sample value used for the linear Interpolation prediction.

The embodiment proposes a method for generating the bottom-right reference sample value by considering prediction directivity.

The embodiment proposes a method for using an original bottom-right reference sample value.

In the embodiment, it is possible to more efficiently process the complex image by encoding/decoding the still image or the moving image by performing linear interpolation using a bottom-right sample value generated accurately when intra prediction-encoding the still image or the moving image.

FIG. 26 illustrates a method for generating a right reference sample and a bottom reference sample using a bottom-right sample in linear interpolation intra prediction according to an embodiment of the present disclosure.

As illustrated in FIG. 26, first, a bottom-right sample BR is generated. Next, each of a top-right sample (TR) and a bottom-left sample (BL) which are already reconstructed is linearly interpolated with the bottom-right reference sample to generate a right reference sample and a bottom reference sample and then, the linear interpolation intra prediction is performed using the generated right and bottom reference samples.

As illustrated in FIG. 14, in the linear interpolation intra prediction method, the prediction sample is generated by a weighted sum depending on a distance between the top reference sample already reconstructed through encoding/decoding and a bottom reference sample which is temporarily predicted as being not encoded/decoded at a current encoding time. Accordingly, the accuracy of the prediction block depends on how accurately the reference sample (in FIG. 14, the bottom reference sample) which is not encoded/decoded is generated. That is, in order to increase the encoding efficiency of the linear interpolation intra prediction, how accurately the right reference sample and the bottom reference sample is generated is important. To this end, it is important to increase the accuracy of the bottom-right reference (BR) sample. In the embodiment, proposed is a method for accurately generating the bottom-right reference sample (BR sample) in order to accurately predict a reference sample which is not encoded/decoded around a block to be currently encoded.

Embodiment 3-1: Generation of Bottom-Right Reference Sample Value Considering Prediction Directivity The embodiment proposes a method for generating the bottom-right (BR) reference sample value considering the prediction directivity in the intra prediction encoding.

FIG. 27 illustrates a method for generating a bottom-right reference sample value considering prediction directivity in linear interpolation intra prediction according to an embodiment of the present disclosure.

In FIG. 27, an arrow indicates the prediction direction of the current block. A case where an intra prediction mode in which the block to be currently encoded has specific prediction directivity is selected as the optimal mode means that there is a high possibility that the prediction block generated considering the corresponding prediction directivity will be most similar to the original block. Therefore, as illustrated in FIG. 27, in the case of generating the temporary prediction value (hereinafter, referred to as a BR value) of the bottom-right sample BR, when the BR value is generated considering the prediction block, there is a high possibility that the BR value will also be most similar to a sample value at the original BR position. Therefore, in the embodiment, the BR value is generated considering the prediction directivity. In the case of an example illustrated in FIG. 27, the BR value is determined as the sample value of the top reference sample F. That is, a value corresponding to a specific (width and height) position is generated as the BR value by the same method as the method for generating the prediction block considering the conventional directivity. The method for generating the bottom-right reference sample value considering the prediction directivity may be used in various conditions.

FIG. 28 illustrates classification of the type of prediction directivity in linear interpolation intra prediction according to an embodiment of the present disclosure.

As illustrated in FIG. 28, areas A and B indicate horizontal directivity and areas C and D indicate vertical directivity. In the horizontal directivity, area A indicates positive directivity and area B indicates negative directivity. Furthermore, in the vertical directivity, area C indicates the negative directivity and area D indicates the positive directivity. Considering such a characteristic, the method for generating the BR sample proposed above may be variably applied. As an embodiment, in a directional mode belonging to areas B and C having the negative directivity, the BR sample value may be generated by applying the method for generating the BR described above considering the prediction directivity as illustrated in FIG. 27 and in a directional mode belonging to areas A and D having the positive directivity, the method for generating the BR sample value may be applied using the bottom-left sample and the top-right sample as illustrated in FIG. 26. On the contrary, in a directional mode belonging to areas B and C having the negative directivity, the method for generating the BR sample value may be applied using the bottom-left sample and the top-right sample as illustrated in FIG. 26 and in a directional mode belonging to areas A and D having the positive directivity, the BR sample value may be generated by applying the method for generating the BR considering the prediction directivity as illustrated in FIG. 27.

Another embodiment of generating the BR sample value is a method of using the top reference sample value and the left reference sample value.

FIG. 29 illustrates an example of a method for determining a bottom-right sample value using a top reference sample value and a left reference sample value in linear interpolation intra prediction according to an embodiment of the present disclosure.

As illustrated in FIG. 29, when the prediction direction of the current block is in a vertical direction mode, the top reference sample value for generating the BR sample value may be generated by considering the directivity as in the method described above (a value of the top reference sample F in the example of FIG. 29, ①) and the left reference sample value may be determined as an N value (②) or a Q value (③) of the left reference sample. The left reference sample value may be determined by various methods. The BR sample value may be determined through the weighted sum of two respective determined reference samples. Equation 4 shows an equation using an N value of the left reference sample and Equation 5 shows an equation using a Q value of the left reference sample.

$$BR=(Width*sample\ value\ F+Height*sample\ value\ N+(Width+Height)/2)/(Width+Height) \quad [Equation\ 4]$$

$$BR=(Width*sample\ value\ F+Height*sample\ value\ Q+(Width+Height)/2)/(Width+Height) \quad [Equation\ 5]$$

The example of FIG. 29 is an example of the case where the prediction direction of the current block is in the vertical direction mode, but even when the prediction direction of the current block is in the horizontal direction mode, the BR sample value may also be determined by the same method. That is, since the current direction is in the horizontal direction mode, the left reference sample value may be determined considering the directivity like the method described above and the top reference sample value may be determined using the weighted sum like Equation 4 or 5 by using a reference sample E value located above of the BR sample or a reference sample H located on a most top right end.

Embodiment 3-2: Generation of Bottom-Right Reference Sample Value Using Original Image The embodiment proposes a method for generating the bottom-right reference sample value of the current block using the value of the reference sample of the original image.

FIG. 30 illustrates a method for generating a bottom-right sample value of a current block from an original image in linear interpolation intra prediction according to an embodiment of the present disclosure.

A bottom-right sample (BR sample) at a position which is the same as the position of the bottom-right sample (BR) sample to be currently encoded is found from a left original image of FIG. 30. The BR value of the corresponding original image is copied to the BR sample value of the block to be currently encoded and used. In this case, since the decoder 200 may not use the original image, the encoder 100 should transmit the BR value of the original image to the decoder 200. In the embodiment, the BR value is transmitted to the decoder 200 using three following methods (1) a method for transmitting a difference value of the BR value of the original image, 2) a method for transmitting a difference value between the bottom-right value of the prediction block and the BR value of the original image, and 3) a method for transmitting a default offset value).

1) Method for Transmitting Difference Value of BR Value of Original Image

FIG. 31 illustrates an example of a method for transmitting a difference value of a bottom-right sample value of an original image in linear interpolation intra prediction according to an embodiment of the present disclosure.

In the method for transmitting the difference value of the bottom-right sample value (BR value) of the original image, a difference value between consecutive BR values is transmitted as illustrated in FIG. 31. As illustrated in FIG. 31, a bold color boundary indicates a boundary of each block to be encoded and the number in each block indicates an encoding order. First, when block ① is encoded, a value of a #BR1 position of the original image is used as the BR sample value. In this case, since there is no BR value used previously, a difference value (i.e., BR1−128 in the case of 8 bits and BR1−512 in the case of 10 bits) from an intermediate value (e.g., 128 in the case of 8 bits and 512 in the case of 10 bits) is transmitted. First, when block ② is encoded, a value of a #BR2 position of the original image is used as the BR sample value. In this case, since block ① is already encoded, a difference value (BR2−BR1) from the BR2 value is transmitted using the BR1 value used at that time. By such a method, in respect to the BR sample value of the current block, a difference value between the BR value of the original image corresponding to the current block and the BR value used for previous block encoding is transmitted to generate the BR value.

2) Method for Transmitting Difference Value Between Bottom-Right Value of Prediction Block and BR Value of Original Image FIG. 32 illustrates an example of a method for transmitting a difference value of a bottom-right value of a prediction block and a bottom-right neighboring sample value of an original image in linear interpolation intra prediction according to an embodiment of the present disclosure.

The method for transmitting the difference value between the bottom-right value of the prediction block and the BR value of the original image is a method for transmitting the bottom-right value generated considering the prediction direction of the current block and the value of the BR position of the original image as illustrated in FIG. 32. First, when block ① is encoded, the encoder 100 uses the value of the #BR1 position of the original image as the BR sample value. In this case, the encoder 100 transmits a difference value (BR1–P1) from the bottom-right value P1 generated considering the prediction direction of the current block. By the same method, when block ② is encoded, the encoder 100 uses the value of the #BR2 position of the original image as the BR sample value and also transmits a difference value (BR2–P2) from the bottom-right value P2 generated considering the prediction direction. By such a method, in respect to the BR sample value, the encoder 100 transmits the difference value between the BR value of the original image corresponding to the current block and the bottom-right value generated considering the directivity of the current block to generate the BR value.

3) Method for Transmitting Default Offset Value

FIG. 33 illustrates an example of a method for transmitting a uniform default offset value in linear interpolation intra prediction according to an embodiment of the present disclosure.

The method for transmitting the default offset value is a method for quantizing the sample value considering internal bits of a current image and dividing the quantized sample value into arbitrary intervals and then, transmitting a representative value of an area including the BR value of the original image. The example of FIG. 33 is an example of a case in which the internal bits of an image are 8 bits. Accordingly, the encoder 100 divides a range of samples values 0 to 255 into four intervals and then, transmits a representative value to which the BR value of the original image belongs using two bits (00 (interval of representative value 32), 01 (interval of representative value 96), 10 (interval of representative value 160), and 11 (interval of representative value 224)). In the embodiment, the range is divided into four intervals, but the number of intervals may be arbitrarily determined.

FIG. 34 illustrates an example of a method for transmitting a non-uniform default offset value in linear interpolation intra prediction according to an embodiment of the present disclosure.

FIG. 34 illustrates a method for transmitting a non-uniform default offset value. As the same example as FIG. 33, the encoder 100 divides the range of samples values 0 to 255 into four non-uniform intervals and then, transmits a representative value to which the BR value of the original image belongs using two bits (00 (interval of representative value 20), 01 (interval of representative value 84), 10 (interval of representative value 170), and 11 (interval of representative value 234)). In the embodiment, the range is also divided into four intervals, but the number of intervals may be arbitrarily determined and non-uniformity may also be arbitrarily determined.

Embodiment 4: Prediction of Mixing Linear Interpolation Prediction Method and Conventional Intra Prediction Method The embodiment relates to a method for encoding/decoding a still image or a moving image, and more particularly, to a method for encoding/decoding a still image or a moving image based on a method for generating a mixed intra prediction block using the linear interpolation method in order to increase accuracy of a prediction block in intra prediction encoding, and an apparatus for supporting the same.

The embodiment proposes a linear interpolation intra prediction method that combines the linear interpolation prediction method with the conventional intra prediction method, that is, partially uses the linear interpolation prediction.

The embodiment proposes a generalized mixed intra prediction method by combining the linear interpolation prediction method and the conventional intra prediction method.

In the embodiment, a practical use example of the mixed intra prediction method will be described.

In the embodiment, a more accurate prediction block is generated using the mixed intra prediction method of combining the linear interpolation prediction method and the conventional intra prediction method at the time of intra prediction-encoding the still image or the moving image, and encoded/decoded to thereby more efficiently process the complex image.

As illustrated in FIG. 14, in the linear interpolation intra prediction method, the prediction sample is generated by a weighted sum depending on a distance between the top reference sample already reconstructed through encoding/decoding and a bottom reference sample which is predicted as being not encoded/decoded at a current encoding time.

A method for applying the linear interpolation prediction method to the intra prediction encoding may be largely divided into two types (1) a method for mixing the conventional the intra prediction method and the linear interpolation prediction method and 2) a method for using only the linear interpolation prediction method instead of the conventional prediction method).

1) In the case of the method of mixing and using the conventional intra prediction method and the linear interpolation prediction method, flag information for distinguishing respective methods is used. In this case, there is a problem that encoding bits increase due to the use of the flag. 2) When only the linear interpolation prediction method is used instead of the conventional intra prediction method, if the linear interpolation prediction method is lower in accuracy of the prediction than the conventional intra prediction method, a problem that the encoding efficiency deteriorates occurs. In the embodiment, in order to solve such a problem for each case, a mixed intra prediction method is proposed in which the conventional intra prediction method and the linear interpolation prediction method are combined. The mixed intra prediction method according to the embodiment may be used instead of the conventional intra prediction method in the intra prediction encoding.

In the mixed intra prediction method according to the embodiment, two following problems mentioned above may be solved.

1) Problem that encoding bits increase due to use of flag: Since the mixed intra prediction method according to the embodiment is used instead of the conventional intra prediction method, the flag is not used.

2) Problem that mixed intra prediction method is lower in prediction accuracy than conventional intra prediction method: Since the conventional intra prediction method and the linear interpolation prediction method are combined with each other, the prediction block may be generated more accurately than the conventional intra prediction method.

Embodiment 4-1: Combination of Conventional Intra Prediction and Linear Interpolation Intra Prediction FIG. 35 illustrates an example of an intra prediction method according to an embodiment of the present disclosure, and FIG. 35a illustrates the conventional intra prediction method and FIG. 35b illustrates an example of a linear interpolation prediction method.

In the method for generating the prediction block using the conventional intra prediction method, as illustrated in FIG. 35a, the sample value of the top reference sample is copied to generate the prediction block. In other words, a prediction value of C1 is copied to a top reference sample P1 value and generated. By the same method, all prediction values in the corresponding block are generated.

In the method for generating the prediction block using the linear interpolation prediction method, the prediction block is generated through linear interpolation of the top reference sample and the bottom reference sample as illustrated in FIG. 35b. In other words, the prediction value of C1 is generated by linearly interpolating the top reference sample P1 value and the bottom reference sample P'1 value. In this case, the linear interpolation is performed by allocating weight values wDOWN1 and wUP1 to the sample values of P1 and P'1, respectively. By the same method, all prediction values in the corresponding block are generated.

In the mixed intra prediction method acquired by combining the conventional intra prediction method and the linear interpolation prediction method according to the embodiment, the conventional intra prediction method of FIG. 35a and the linear interpolation prediction method of FIG. 35b are basically used.

FIG. 36 illustrates an intra prediction method acquired by combining the conventional intra prediction method and a linear interpolation prediction method in intra prediction according to an embodiment of the present disclosure.

FIG. 36 illustrates an example of generating a 4×4 prediction block using an intra prediction method acquired by combining the conventional intra prediction method and the linear interpolation prediction method. As illustrated in FIG. 36, a first row (a highest row (a row including 01, C2, C3, and C4)) of the 4×4 block generates the prediction value using the conventional intra prediction method. Accordingly, the decoder 200 generates the prediction values of 01, C2, C3, and C4 by copying the values of P1, P2, P3, and P4, respectively. In addition, from a second row to a last row (a region highlighted by dotted lines in FIG. 36), the prediction value is determined using the linear interpolation prediction method. In the example of FIG. 36, the prediction value of C5 of the second row may be generated through linear interpolation using a top reference sample P5 value and a bottom reference sample P'5 value and weight values of wDOWN5 and wUP5. By the same method, the prediction value of C6 of the third row may be generated through linear interpolation using a top reference sample P6 value and a bottom reference sample P'6 value and weight values of wDOWN6 and wUP6. In other words, the prediction values from the second row up to the last row highlighted by the dotted lines may be generated by the same method as above.

In the mixed intra prediction method acquired by combining the conventional intra prediction method and the linear interpolation prediction method proposed in the embodiment, a prediction value for a specific area is generated using the conventional intra prediction method, and a prediction value for the remaining area is generated using the linear interpolation prediction method, and a final prediction block is generated. Since the top reference sample is a sample value reconstructed through encoding/decoding, the top reference sample has higher accuracy than the bottom reference sample. Therefore, when the prediction sample is closer to the top reference sample as in the first row in FIG. 6, it is efficient to copy and use the top reference sample value as it is by using the conventional intra prediction method. On the contrary, since it is not accurate to generate the prediction sample value using the conventional intra prediction method as the prediction sample is distant from the top reference sample as in the second row to the last row in FIG. 6, it is efficient to generate the prediction value through the linear interpolation with the top reference sample and the bottom reference sample. In other words, the conventional intra prediction method and the linear interpolation prediction method are selectively used considering the distance from the reconstructed reference sample in order to generate one prediction block. In FIG. 36, the 4×4 block is described as an example, but the embodiment may applied to all blocks (a square block and a non-square block) having various sizes and shapes including 8×8, 16×8, and the like. Further, selection of the conventional intra prediction method and the linear interpolation prediction method proposed in one prediction block may be variably determined according to the distance from the reconstructed reference sample.

The mixed prediction method acquired by combining the conventional intra prediction method and the linear interpolation prediction method may be used by replacing all of the conventional directional modes. Accordingly, the mixed intra prediction mode is constituted by the two conventional non-directional modes (planar mode and DC mode) and the mixed prediction directional mode acquired by combining the conventional intra prediction method and linear interpolation prediction method.

Embodiment 4-2: More Generalized Mixed Intra Prediction Method

In the embodiment, a more generalized mixed intra prediction method acquired by combining the conventional intra prediction method and linear interpolation prediction method will be described. First, a generalized new intra prediction value P(i, j) may be defined as in Equation 6 below through an intra prediction value C(i, j) generated through the conventional intra prediction method illustrated in FIG. 35a and an intra prediction value L(i, j) generated using the linear interpolation intra prediction method illustrated in FIG. 35b.

$$P(i,j) = \alpha \times C(i,j) + (1-\alpha) \times L(i,j) \quad (0 \leq \alpha \leq 1) \quad \text{[Equation 6]}$$

Here, (i, j) represent horizontal and vertical locations of the corresponding prediction sample in the prediction block, respectively, and a weight value $\alpha$ is generally a value between 0 and 1. Equation 6 may be expressed like Equation (7) from the viewpoint of practical implementation for removing calculation of a floating point.

$$P(i,j) = \{A \times C(i,j) + B \times L(i,j) + \text{offset}\} >> \text{right\_shift} \quad \text{[Equation 7]}$$

In Equation 7, A and B may represent weights for the conventional intra prediction and the linear interpolation prediction, respectively and both A and B may be expressed as non-negative integers. An offset value may be set to 2(right_shift−1) and an operator a>>b represents a portion obtained by dividing a by a value of 2b. In general, in Equation 7, a condition of A+B=2(right_shift) is satisfied.

Embodiment 4-3: Practical Use Case of Mixed Intra Prediction

In the embodiment, the practical use example of the mixed intra prediction method proposed in Embodiments 4-1 and 4-2 above will be described. The mixed intra prediction method may be represented by combining the conventional intra prediction method and the linear interpolation prediction method and this may be defined as various forms as below.

1) An $\alpha$ value defined in Equation 6 may be pre-defined according to the intra prediction mode. For example, in the case of the planar mode which is the non-directional mode, the $\alpha$ value may be set to '0' and the new intra prediction method may be just replaced with the linear interpolation prediction method. As another example, in the case of the DC mode which is the non-directional mode, the $\alpha$ value may be set to '1' and the new intra prediction method may just adopt the conventional intra prediction method. Furthermore, in the case of the directional modes, the new intra prediction method may be applied considering the pre-defined $\alpha$ value.

2) The $\alpha$ value may be defined differently according to the position of the prediction sample during the intra prediction. For example, in the case of the prediction sample located close to the top reference sample and the left reference sample, the $\alpha$ value may be configured to be relatively larger than other prediction samples. Here, a case where the $\alpha$ value is large means assigning a larger weight to the conventional intra prediction. In this case, as shown in Equation 8 below, the $\alpha$ may be modeled to be changed according to the position like $\alpha(i, j)$.

$$P(i,j)=\alpha(i,j) \times C(i,j)+(1-\alpha(i,j)) \times L(i,j)(0 \leq \alpha(i,j) \leq 1)$$ [Equation 8]

3) The $\alpha$ value may be defined differently according to the size of the prediction block. For example, the $\alpha$ value may be defined to have a relatively small value when the size (width×height) of the current block is smaller than a given threshold (32).

4) The $\alpha$ value may be defined differently according to the shape of the prediction block.

5) In addition, when the defined $\alpha$ value is not '0' or '1', the conventional intra encoding method and the linear interpolation intra encoding method may be selected and used based on additional flag information. For example, in the case of the planar mode which is the non-directional mode, the $\alpha$ value is set to '0' and the additional flag information is not required, but in the case of the horizontal mode, when the $\alpha$ value is set to 0.5, the selected intra encoding method of the conventional intra encoding method and the linear interpolation intra encoding method may be used based on flag information additionally transmitted through the bitstream. Here, a condition in which an additional flag is required may be pre-defined based on the $\alpha$ value or the corresponding prediction mode.

Whether the additional flag information proposed in Clause 5) is transmitted may be pre-defined based on the corresponding prediction mode as follows.

Class A={0, 1, 66}
Class B={2, 3, 4, . . . , 64, 65}

Class A represents a set of prediction modes not requiring the additional flag information, whereas Class B represents a set of prediction modes requiring the additional flag information.

Embodiment 5: Liner Interpolation Intra Prediction Considering Actual Distance from Reference Sample The embodiment relates to a method for encoding/decoding a still image or a moving image, and more particularly, to a method for encoding/decoding a still image or a moving image based on an increase in accuracy of prediction by performing linear interpolation using more reference samples in the intra prediction encoding, and an apparatus for supporting the same.

The embodiment proposes a method for generating a new reference sample.

The embodiment proposes a method for generating the bottom-right sample.

The embodiment proposes a method for generating bottom samples and right samples using the generated bottom-right sample, the conventional top-right sample, and the bottom-left sample.

The embodiment proposes a new prediction method of performing the linear interpolation using more reference samples.

The embodiment proposes a prediction method of performing the linear interpolation using the top-right sample, the bottom-right sample, and the bottom-left sample.

The embodiment proposes a prediction method of performing the linear interpolation using the bottom samples and the right samples.

The embodiment proposes a method for allocating the weight value during the linear interpolation.

In the embodiment, the still image or the moving image is encoded/decoded by performing the linear interpolation using more reference samples at the time of intra prediction-encoding the still image or the moving image to more efficiently process the complex image.

In order to perform the linear interpolation intra prediction, first, the bottom-right reference sample is generated. In the method for generating the bottom-right reference sample, the bottom-right reference sample may be generated using the neighboring reference sample and the sample at the corresponding position of the original image may be used.

Embodiment 5-1: Generation of Bottom-Right Reference Sample Using Neighboring Reference Sample First, a method for generating the bottom-right reference sample using the neighboring reference sample will be described.

FIG. 37 illustrates an example of a method for generating a bottom-right sample using a neighboring reference sample in linear interpolation intra prediction according to an embodiment of the present disclosure, and FIG. 37a illustrates a method for generating a bottom-right sample using a top-right sample and a bottom-left sample and FIG. 37b illustrates a method for generating a bottom-right sample using a most top-right sample and a most bottom-left sample which are distant by twice a length of a block to be currently encoded.

Equations of generating the bottom-right sample using respective samples are shown in Equations 9 and 10 below.

Bottom-right sample=(top-right sample+bottom-left sample+1)>>1 [Equation 9]

Bottom-right sample=(most top-right sample+most bottom-left sample+10>>1 [Equation 10]

Embodiment 5-2: Generation of Bottom-Right Reference Sample Using Original Image In the method according to Embodiment 5-1, the bottom-right sample is generated using the neighboring sample in the reconstructed image which is already encoded, whereas in the method according to Embodiment 5-2, a value at a position corresponding to the bottom-right sample in the original image is directly used as the bottom-right sample value.

FIG. 38 illustrates a method for generating a bottom-right reference sample from an original image in linear interpolation intra prediction according to an embodiment of the present disclosure.

In FIG. 38, an area marked with a shade based on a block C to be currently encoded is an image area which is encoded and reconstructed and a white area is an original image area which is not yet encoded. Unlike the method according to Embodiment 5-1, the bottom-right sample value may be set to the value at the corresponding position of the original image. In this case, there is a disadvantage that information of the bottom-right sample value is transmitted from the encoder 100 to the decoder 200, but the accuracy of the bottom-right sample value may be increased.

Embodiment 5-3: Linear Interpolation Intra Prediction Using Reference Sample FIG. 28 illustrates division of areas according to the prediction direction and the prediction angle. As described through Embodiments 5-1 and 5-2, after the bottom-right sample is generated, the linear interpolation prediction is performed using the bottom-right sample. FIG. 28 illustrates an example of a case in which the directivity of the intra prediction mode is divided into four areas based on a vertical direction and a horizontal direction, and positive and negative angular directions.

Areas A and B and areas C and D are divided based on the horizontal direction and the vertical direction, and A and D which are positive angular areas and B and C which are negative angular areas are divided based on the angle again. Table 5 is a table in which area division according to the direction and the angle is organized.

TABLE 5

| Area | Directivity | Angle |
|---|---|---|
| A | Horizontal | Positive |
| B | Horizontal | Negative |
| C | Vertical | Negative |
| D | Vertical | Positive |

FIG. 39 illustrates an example of a reference sample used for linear interpolation for each intra prediction mode in linear interpolation intra prediction according to an embodiment of the present disclosure, and FIG. 39a illustrates an example of a top-right reference sample, FIG. 39b illustrates an example of a bottom-right reference sample, and FIG. 39c illustrates an example of a bottom-left reference sample. When performing the linear interpolation prediction, reference samples for interpolation are determined based on different reference samples according to the directivity and the angle. FIG. 39 illustrates reference samples used for linear interpolation prediction in an intra prediction mode belonging to each area. That is, the linear interpolation prediction is performed from the top-right sample in the intra prediction mode belonging to area A, the linear interpolation prediction is performed from the bottom-right sample in intra prediction modes belonging to areas B and C, and in the intra prediction mode belonging to area D, the linear interpolation prediction is performed from the bottom-left sample.

FIG. 40 illustrates a method for performing linear interpolation prediction using a reference sample in linear interpolation intra prediction according to an embodiment of the present disclosure. FIG. 40 illustrates a method for performing the linear interpolation prediction of the intra prediction mode belonging to area D. In FIG. 40, a current sample value is calculated by linear interpolation of the prediction sample generated by the conventional method and the reference sample (bottom-left sample). In this case, the weight value of the linear interpolation is determined as a vertical distance between the current sample and the prediction sample and a vertical distance between the current sample and the reference sample. A prediction value of a final current sample is calculated by Equation 11.

Current sample value=$((w_2*$prediction sample value$)+(w_1*$reference sample value$)+(w_1+w_2)/2)/(w_1+w_2)$    [Equation 11]

The same method as above is applied even to an intra mode belonging to areas A, B, and C to perform the linear interpolation prediction.

So far, the method for generating the top-right, bottom-right, and bottom-left reference samples and performing the linear interpolation prediction using the same has been described. From now on, a method for generating both the right samples and the bottom samples and performing the linear interpolation prediction using the same will be described.

Embodiment 5-4: Generation of Bottom Samples and Right Samples

FIG. 41 illustrates a method for generating bottom samples and right samples in linear interpolation intra prediction according to an embodiment of the present disclosure.

As described in Embodiments 5-1 and 5-2, after the bottom-right sample is generated, the bottom samples and the right samples may be generated from the bottom-left sample and the top-right sample. The bottom samples are generated by linear interpolation of the bottom-left sample and the bottom-right sample and the right samples are generated by linear interpolation of the top-right sample and the bottom-right sample.

Embodiment 5-5: Linear Interpolation Prediction Based on Actual Distance

After generation of the bottom samples and the right samples described through Embodiment 5-4, the linear interpolation prediction is performed based on the generated bottom samples and right samples. A difference between the linear interpolation prediction method described in Embodiment 5-3 and the linear interpolation prediction method described in Embodiment 5-5 is described below. In Embodiment 5-3, the intra prediction mode is divided for each area and then, the linear interpolation prediction with the prediction sample is performed using one reference sample. On the contrary, in Embodiment 5-5, the intra prediction mode is divided for each area and then, the linear interpolation prediction with the prediction sample is performed using the reference samples corresponding to respective areas.

FIG. 14 illustrates a method for generating a current prediction sample C in a positive vertical intra prediction mode. The positive vertical intra prediction mode is modes belonging to area D of FIG. 28.

As illustrated in FIG. 14, the current prediction sample C is generated in the following order.

1) Copying left reference samples (dark gray) to a bottom sample buffer and generating generated bottom samples and a bottom buffer 2) Generating the prediction sample value P by interpolating reference sample A and reference sample B (using the conventional method for generating the prediction sample of intra encoding)

3) Generating the prediction sample value P' by interpolating reference sample A' and reference sample B' (using the conventional method for generating the prediction sample of intra encoding)

4) Generating a final prediction value C by linearly interpolating generated P and P' again $$C=(w_1*P+w_2*P'+(w_1+w_2)/2)/(w_1+w_2) \quad \text{[Equation 12]}$$

The prediction value is generated by applying methods 2) to 4) to all samples in the prediction block. The prediction block is generated using the same method to all prediction directions (intra prediction modes belonging to areas A, B, and C of FIG. 28). The linear interpolation intra prediction method according to the embodiment is applied to all modes other than the planar mode and the DC mode without the directivity. Accordingly, when the current block is not in the planar or DC mode, whether to apply the linear interpolation intra prediction method is determined by parsing the flag indicating the linear interpolation intra prediction mode.

FIG. 42 illustrates a method for performing linear interpolation using a ratio of an actual distance between reference samples in linear interpolation intra prediction according to an embodiment of the present disclosure.

In the linear interpolation intra prediction method described through FIG. 14, when P and P' are linearly interpolated, P and P' are calculated using a ratio of a vertical distance other than a ratio of an actual distance of P and P'. In the linear interpolation intra prediction method according to the embodiment, as illustrated in FIG. 42, w1 and w2 are calculated by calculating the ratio of the actual distance of P and P' and the linear interpolation is performed using w1 and w2. In the methods mentioned above, methods 1 to 3) are the same and only 4) the method for generating the final prediction value C is different.

FIG. 43 illustrates another example of a method for performing linear interpolation using a ratio of an actual distance between reference samples in linear interpolation intra prediction according to an embodiment of the present disclosure.

According to FIG. 43, by considering a prediction sample C to be finally generated and the reference samples P and P', in order to accurately generate the prediction sample C, the weight value is calculated considering a distance from the prediction sample to be finally generated at the corresponding position instead of moving the second reference sample in parallel to the first reference sample. The final prediction value C may be calculated using Equation 13. In this case, each of wUP and wDOWN is a weight value generated considering the actual distance ratio.

$$C=(w_{UP}*P+w_{DOWN}*P+(w_{UP}+w_{DOWN})/2)/(w_{UP}+w_{DOWN}) \quad \text{[Equation 13]}$$

In Equation 13, C represents the prediction value of the current sample to be predicted, P represents the sample value of the first reference sample, P' represents the sample value of the second reference sample, wUP represents a distance between the first reference sample P and the current sample, and wDOWN represents a distance between the second reference sample P' and the current sample. In Equation 13, wUP and wDOWN may be used interchangeably.

FIG. 44 illustrates an example of a flowchart for linear interpolation intra prediction according to an embodiment of the present disclosure. Each operation of FIG. 44 may be performed by the encoder 100 or the decoder 200 and hereinafter, the operation of the decoder 200 will be mainly described for convenience of description.

In step S4410, the decoder 200 may confirm that the intra prediction is applied to a current block to be decoded. The decoder 200 may confirm that the intra prediction is applied to the current block to be decoded by parsing a flag or an index indicating information on the prediction mode for the current block. Here, the current block as a block to be decoded or predicted by the decoder 200 at a specific time may be referred to as a processing unit, a processing block, and a prediction unit (PU). Furthermore, each sample included in the current block may be referred to as the current sample. Furthermore, the decoder 200 may confirm the intra prediction mode applied to the current block. For example, the decoder 200 may confirm a non-directional or directional intra prediction mode applied to the current block from an MPM candidate list or the remaining intra prediction mode candidate list. When the directional intra prediction mode is applied to the current block, the decoder 200 may confirm the prediction direction corresponding to the intra prediction mode.

In step S4420, the decoder 200 may determine a first reference sample value based on the intra prediction direction. More specifically, the decoder 200 may confirm checks the intra prediction direction corresponding to the intra prediction mode applied to the current block, and determine the first reference position and the first reference sample value for prediction of the current sample included in the current block based on the intra prediction direction. In other words, the decoder may determine first reference samples from at least one of samples positioned at an upper horizontal line and a left vertical line adjacent to the current block, based on the intra-prediction direction of the current block.

For example, referring to FIG. 42, a first reference sample value corresponding to a first reference position P which is a point corresponding to the intra prediction direction may be determined as the first reference sample from the current sample C among the samples positioned on the upper horizontal line adjacent to the current block divided by a thick line, for prediction of the current sample C.

Here, the upper horizontal line adjacent to the current block may refer to all samples belonging to one or more rows positioned at an upper side of an uppermost row of the current block. Similarly, a lower horizontal line adjacent to the current block may refer to all samples belonging to one or more rows positioned at a lower side of a lowermost row of the current block. Furthermore, a left vertical line adjacent to the current block may refer to all samples belonging to one or more columns positioned at a left side of a leftmost column of the current block. Similarly, a right vertical line adjacent to the current block may refer to all samples belonging to one or more columns positioned at a right side of a rightmost column of the current block.

In step S4420, the decoder 200 may determine a second reference sample value based on the intra prediction direction. More specifically, the decoder 200 may determine a second reference sample value at a second reference position located in an opposite direction to the intra prediction direction from the first reference position determined in step S4420 or the position of the current sample.

For example, in FIG. 42, the decoder 42 may determine a second reference sample value at a second reference position P' located in an opposite direction to the intra prediction direction from the position C of the current sample or the first reference position P. Here, the second reference position P' may be located on the lower horizontal line adjacent to the current block as illustrated in FIG. 42 and located on the left vertical line adjacent to the current block as illustrated in FIG. 43.

Furthermore, the first reference sample value at the first reference position may be determined by linear interpolation of samples values of two samples among the samples located on the upper horizontal line and the left vertical line adjacent to the current block and the second reference sample value at the second reference position may be determined by linear interpolation of sample values of two samples among the samples located on the right vertical line and the lower horizontal line adjacent to the current block. For example, in FIG. 42, the first reference sample value at the first reference position P may be determined by linear interpolation of samples A and B located on the upper horizontal line and the second reference sample value at the second reference position P' may be determined by linear interpolation of samples A' and B' located on the lower horizontal line. Here, as values of samples A' and B' of the lower horizontal line, samples values located on the left vertical line may be used. That is, the second reference sample value may be determined based on the sample values of the samples (A' and B' of FIG. 42) located on the lower line adjacent to the current block and the sample values located on the lower side of the current block may determined as a sample value adjacent to the left side or the right side of the current block.

Further, as illustrated in FIG. 43, the first reference sample value at the first reference position P may be determined by linear interpolation of samples A and B located on the upper horizontal line and the second reference sample value at the second reference position P' may be determined by linear interpolation of samples A' and B' located on the left vertical line.

Furthermore, the first reference sample value may be determined by linear interpolation of samples values of two samples among the samples located on the upper horizontal line and the left vertical line adjacent to the current block and the second reference sample value may be determined by linear interpolation of sample values of two samples among the samples located on the right vertical line and the lower horizontal line adjacent to the current block.

Furthermore, the first reference sample value may be determined by linear interpolation of samples values of two samples adjacent to a point indicated by the prediction direction from the current sample on the upper line adjacent the current block and the second reference sample value may be determined by linear interpolation of sample values of two samples adjacent to a point indicated by the prediction direction from the current sample on the lower line adjacent the current block. For example, in FIG. 43, the first reference sample value at the first reference position P may be determined by linear interpolation of the samples values of two samples A and B adjacent to the point indicated by the prediction direction from the current sample on the upper line adjacent the current block and the second reference sample value at the second reference position P' may be determined by linear interpolation of the sample values of two samples A' and B' adjacent to the point indicated by the prediction direction from the current sample on the lower line adjacent the current block.

In step S4440, the decoder 200 may determine a first distance which is a distance between the current sample and the first reference position and a second distance which is a distance between the current sample and the second reference position. In other words, the decoder 200 may determine the distance between the first reference location and the current sample as the first distance and determine the distance between the second reference location and the current sample as the second distance. For example, in FIG. 42, the first distance w1 may correspond to the distance between the first reference position P and the position C of the current sample and the second distance w2 may correspond to the distance between the second reference position P' and the position C' of the current sample.

Here, unlike the distances w1 and w2 illustrated in FIG. 14, the first distance w1 and the second distance w2 may correspond to the actual distance between the first reference position P and the current sample position C and the actual distance between the reference position P' and the current sample position C. In other words, the first distance w1 may correspond to an actual distance determined based on a horizontal distance between a horizontal position of the current sample C and the horizontal distance of the first reference position P and a distance between a vertical position of the current sample C and the vertical position of the first reference position P and the second distance w2 may correspond to an actual distance determined based on a horizontal distance between the horizontal position of the current sample C and the horizontal position of the second reference position P' and a distance between the vertical position of the current sample C and the vertical position of the second reference position P'. A process of calculating the first distance and the second distance may be performed as illustrated in FIG. 45.

In step S4450, the decoder 200 may generate the prediction value for the current sample using the first reference sample and the second reference sample. More specifically, the decoder may generate a prediction value of the current sample based on a sample value of the first reference sample, the first distance, a sample value of the second reference sample, and the second distance. Here, the prediction value of the current sample may be determined by linear interpolation based on the first reference sample value, the first distance, the second reference sample value, and the second distance. Furthermore, the prediction value of the current sample may be determined based on a value acquired by multiplying the first reference sample value by the second distance and a value acquired by multiplying the second reference sample value by the first distance. For example, the decoder 200 may generate the prediction value of the current sample using Equation 12 or 13.

FIG. 45 illustrates an example of a method for calculating a weight depending on a distance between reference samples in linear interpolation intra prediction according to an embodiment of the present disclosure. FIG. 45 illustrates a method for calculating weight values w1 and w2 according to the distance between P and P' in FIGS. 43 and 44.

The calculated weight values w1 and w2 are applied to Equation 12 to generate the linearly interpolated prediction sample. The same method is applied to all samples which are present in the prediction block to generate the prediction block. Furthermore, the same method is applied to all prediction directions ((intra prediction modes belonging to areas A, B, and C mentioned in FIG. 4) to generate the prediction block.

Embodiment 6: Linear Interpolation Intra Prediction Considering Non-Square Block Shape The embodiment relates to a method for encoding/decoding a still image or a moving image, and more particularly, to a method for encoding/decoding a still image or a moving image based on an increase in accuracy of prediction by efficiently using the linear interpolation method at the time of encoding a non-square shape block in the intra prediction encoding, and an apparatus for supporting the same.

The embodiment proposes a method for generating a new reference sample in the non-square block shape.

The embodiment proposes a method for generating the bottom-right sample.

The embodiment proposes a method for generating bottom samples and right samples using the generated bottom-right sample, the conventional top-right sample, and the bottom-left sample.

The embodiment proposes a method for generating the bottom samples and the right samples using the top samples and the left samples of the block to be currently encoded.

The embodiment relates to an encoding/decoding method for increasing the prediction accuracy of the intra prediction block by performing efficient linear interpolation prediction in the non-square block shape at the time of intra prediction-encoding the still image or the moving image.

FIG. 46 illustrates a screen division structure according to an embodiment of the present disclosure.

As illustrated in FIG. 46a, when intra prediction is performed, prediction is performed by splitting one CU block into square shape PUs. However, in order to increase the encoding efficiency, when the intra prediction is performed as illustrated in FIG. 46b, the prediction is performed by splitting one CU block into non-square shape PUs. Such a structure is mentioned as a quadtree binary tree (QTBT) structure. In the QTBT, a block is additionally split into binary trees using split flag information (split flag syntax) in the conventional quadtree structure.

As illustrated in FIG. 46b, blocks separated by solid lines represent the quadtree structure and this is the same as the structure of the conventional video encoding and blocks separated by dotted lines mean blocks split into the binary tree structure. By the QTBT, according to characteristics of the image, the block may be split into various non-square shape blocks in addition to the square shape blocks. That is, in the case of the conventional intra prediction, the prediction is performed in units of the PU in the square shape block and the TU is performed in a square shape again, but in the case of the intra prediction of the QTBT, the intra prediction is performed in the non-square shape block in addition to the square shape and prediction and transform are performed based on blocks split without separating the PU and the TU.

Embodiment 6-1: Generation of Bottom-Right Sample Using Neighboring Reference Sample In the embodiment, a method for generating the bottom-right sample using the neighboring reference sample in the non-square block shape will be described.

FIG. 47 illustrates an example of a method for generating a bottom-right reference sample in linear interpolation intra prediction according to an embodiment of the present disclosure, and FIG. 47a illustrates a method for generating a bottom-right sample using a top-right sample and a bottom-left sample and FIG. 47b illustrates a method for generating a bottom-right sample using a most top-right sample and a most bottom-left sample which are distant by horizontal and vertical lengths of a non-square to be currently encoded. Equations of generating the bottom-right sample using each sample are described below.

Equations 14 and 15 show examples of a method for generating the bottom-right sample using an average value.

Bottom-right sample=(TR+BL+1)>>1            [Equation 14]

Bottom-right sample=(MTR+MBL+1)>>1          [Equation 15]

Equations 16 and 17 show examples of a method for generating the bottom-right sample using a distance ratio.

Bottom-right sample=($W$*TR+$H$*BL+(($W$+$H$)>>1))/($W$+$H$)            [Equation 16]

Bottom-right sample=($W$*MTR+$H$*MBL+(($W$+$H$)>>1))/($W$+$H$)            [Equation 17]

Unlike the square shape block, since a horizontal length and a vertical length of the non-square shape block are different from each other, it is efficient that the horizontal and vertical lengths of the non-square shape block are different from each other at the time of generating the bottom-right sample.

Embodiment 6-2: Generation of Bottom-Right Reference Sample Using Original Image In Embodiment 6-1, the method for generating the bottom-right sample from the sample of the neighboring block which is already encoded and reconstructed is described, whereas in Embodiment 6-2, a method for directly using the value of the position corresponding to the bottom-right sample in the original image as the bottom-right sample value will be described.

FIG. 48 illustrates an example of a method using a bottom-right sample in an original example in linear interpolation intra prediction according to an embodiment of the present disclosure, and FIG. 48a illustrates an example of an N×2N non-square shape block and FIG. 48b illustrates an example of a 2N×N non-square shape block.

In FIG. 48, based on a block to be currently encoded, a gray area is an image area which is encoded and reconstructed and a white area is an image area which is not yet encoded. Unlike the method in Embodiment 6-1, in the proposed method, the bottom-right sample value is directly used as the value at the corresponding position of the original image. In this case, the accuracy of the bottom-right sample value is high, but there is a disadvantage that information on the bottom-right sample value should be transmitted to the decoder.

In FIG. 48a, in the case of an N×2N type non-square block, bottom-right sample values of L' and R' are derived from the values the corresponding positions of the original image in order to encode blocks L and R. In FIG. 48b, in the case of a 2N×N type non-square block, bottom-right sample values of A' and B' are derived from the corresponding positions of the original image in order to encode blocks A and B.

Embodiment 6-3: Generation of Right and Bottom Reference Samples Using Bottom-Right Reference Sample In order to perform the linear interpolation, all neighboring samples of the block to be currently encoded should be generated. In the case of video encoding as illustrated in FIGS. 48a and 48b, since encoding is performed in a raster scan order, encoding is performed on the left side and the upper side based on the block to be currently encoded, but encoding is not performed on the right side and the lower side. Accordingly, in order to perform the linear interpolation, the encoder 100 needs to generate the bottom samples and the right samples using the bottom-right sample and the neighboring samples generated through Embodiments 6-1 and 6-2. In Embodiment 6-3, a method for generating the right samples and the bottom samples in the non-square shape block using the bottom-right samples generated through Embodiments 6-1 and 6-2 and the already encoded/decoded neighboring samples will be described.

FIG. 49 illustrates a method for generating right samples and bottom samples through linear interpolation in linear interpolation intra prediction according to an embodiment of the present disclosure.

As illustrated in FIG. 49, the bottom samples are generated by linear interpolation of the bottom-left sample BL and the bottom-right sample BR and the right samples are generated by linear interpolation of the top-right sample TR and the bottom-right sample BR.

Embodiment 6-4: Generation of Right and Bottom Reference Samples not Using Bottom-Right Reference Sample In Embodiment 6-3, a method for generating the right samples and the bottom samples using the bottom-right samples generated through Embodiment 6-1 or 6-2 and the already encoded/decoded top-right sample and bottom-left sample is described. In Embodiment 6-4, a method for generating the right samples and the bottom samples using the top samples and the left samples of the block to be currently encoded without using the bottom-right sample.

FIG. 50 illustrates a method for generating right samples and bottom samples using top samples and left samples in linear interpolation intra prediction according to an embodiment of the present disclosure.

In FIG. 50, top samples A and B are copied to the corresponding right samples and left samples C, D, E, and F are copied to the corresponding bottom samples, respectively to generate the right samples and the bottom samples.

The linear interpolation intra prediction may be performed using the bottom-right samples and the right samples, and the bottom samples generated using Embodiments 6-1, 6-2, 6-3, and 6-4.

Last, the linear interpolation intra prediction (LIP) will be summarized and described with reference to FIG. 14. The linear interpolation intra prediction may be additionally applied to the intra prediction (on top of intra prediction). An LIP flag for an intra-coded CU may be signaled at a CU level in order to indicate whether an LIP intra prediction mode is used. The intra prediction method according to an embodiment of the present disclosure may be classified into two prediction types, and includes (i) a conventional intra prediction method and (ii) an LIP method. In the conventional intra prediction method, 35 and 68 modes including two non-angular (planar and DC) predictions are used. However, the LIP prediction method may be applied to 33 and 65 prediction modes except for planar and DC.

In the LIP intra prediction method, first, an intensity value of a bottom-right (BR) adjacent sample is calculated as in Equation 18. In addition, intensity values of a bottom row (Pb(x,y)) and a right column (Pr(x,y)) of the adjacent samples are generated. The samples are used as references on an opposite side of the CU and derived from intensity values of the BR adjacent sample and intensity values of other corner adjacent samples (i.e., a bottom-right adjacent sample and a bottom-left adjacent sample).

$$BR(W, H) = \frac{W \times R(2W-1, -1) + H \times R(-1, 2H-1)}{(W+H)} \quad \text{[Equation 18]}$$

In Equation 18, R(x,y) denotes an intensity value of an adjacent sample reconstructed at (x,y) coordinates, and W and H denote a block width and height, respectively.

FIG. 14 illustrates a sample prediction process using the LIP for an arbitrary directional prediction mode. A line connecting P-C-P' of FIG. 14 indicates the prediction direction. 'A' and 'B' denote samples located at the integer sample positions and 'P' denotes the sample at the 1/32 sample position in the reference sample array. 'A' and 'A' denote samples located at the integer sample positions and 'P' denotes the sample at the 1/32 sample position in the reference sample array.

A first stage of the intra directional prediction mode includes a process of extrapolating samples from a sample position projected based on a given direction. The projected reference sample position is calculated through bilinear interpolation used for acquiring the value of the projected reference sample using two closest reference samples located at integer positions.

A second stage of a prediction process requires the same access as generating another predicted sample value at the same sample position. A second predicted sample value may be acquired by projecting the position of the sample onto the opposite side of the reference sample array by applying the selected prediction direction and interpolating the value with 1/32 sample position accuracy.

The LIP has a differentiated advantage in accuracy between input intensities in a final interpolation process. In particular, large weights are applied to positions closer to more reliable adjacent positions. A final prediction sample value may be determined as in Equation 19 below.

$$C = \frac{(W_1 \times P + W_2 \times P')}{(W_1 + W_2)} \quad \text{[Equation 19]}$$

Here, C represents the final prediction sample value, and P and P' represent predictors generated from the reference sample position and an opposite reference sample position. W1 and W2 are weight values determined according to a distance between the current sample position and the reference (opposite reference) sample position.

FIG. 51 illustrates an example of a video coding system as an embodiment to which the present disclosure is applied.

A video coding system may include a source device and a receiving device. The source device may transmit encoded video/image information or data to the receiving device via a digital storage medium or a network in a file or streaming form.

The source device may include a video source, an encoding apparatus, and a transmitter. The receiving device may include a receiver, a decoding apparatus, and a renderer. The encoder may be called a video/image encoder, and the decoder may be called a video/image decoder. The transmitter may be included in the encoder. The receiver may be included in the decoder. The renderer may include a display, and the display may be implemented as a separate device or an external component.

The video source may acquire a video/image through a capturing, synthesizing, or generating process of the video/image. The video source may include a video/image capture device and/or a video/image generation device. The video/image capture device may include, for example, one or more cameras, video/image archives including previously captured video/images, and the like. The video/image generation device may include, for example, a computer, a tablet, and a smart phone and may (electronically) generate the video/image. For example, a virtual video/image may be generated by the computer, etc., and in this case, the video/image capturing process may be replaced by a process of generating related data.

The encoder may encode an input video/image. The encoder may perform a series of procedures including prediction, transform, quantization, and the like for compression and coding efficiency. The encoded data (encoded video/image information) may be output in the bitstream form.

The transmitter may transfer the encoded video/image information or data output in the bitstream to the receiver of the receiving device through the digital storage medium or network in the file or streaming form. The digital storage medium may include various storage media such as USB, SD, CD, DVD, Blu-ray, HDD, SSD, and the like. The transmitter may include an element for generating a media file through a predetermined file format and may include an element for transmission through a broadcast/communication network. The receiver may extract the bitstream and transfer the extracted bitstream to the decoder.

The decoder may perform a series of procedures including dequantization, inverse transform, prediction, etc., corresponding to an operation of the encoder to decode the video/image.

The renderer may render the decoded video/image. The rendered video/image may be displayed by the display.

FIG. 52 illustrates an example of a video streaming system as an embodiment to which the present disclosure is applied.

Referring to FIG. 52, the content streaming system to which the present disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the present disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the present disclosure may be implemented and performed on a processor, a microprocessor, a controller, or a chip. For example, functional units illustrated in each drawing may be implemented and performed on a computer, the processor, the microprocessor, the controller, or the chip.

In addition, the decoder and the encoder to which the present disclosure may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an OTT (Over the top) video device, an Internet streaming service providing devices, a three-dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the OTT video device may include a game console, a Blu-ray player, an Internet access TV, a home theater system, a smartphone, a tablet PC, a digital video recorder (DVR), and the like.

In addition, a processing method to which the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

In addition, the embodiment of the present disclosure may be implemented as a computer program product by a program code, which may be performed on the computer by the embodiment of the present disclosure. The program code may be stored on a computer-readable carrier.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for processing a video signal using intra prediction by an apparatus, the method comprising:
checking that intra prediction is applied to a current block including a current sample to be predicted;
determining a first reference sample value on a first reference location by linear interpolation of sample values of two samples among samples on an upper horizontal line and a left vertical line adjacent to the current block, based on an intra-prediction direction of the current block;
determining a second reference sample value on a second reference location positioned in an opposite direction to the intra-prediction direction from a location of the current sample or the first reference location by linear interpolation of sample values of two samples among samples on a right vertical line and a lower horizontal line adjacent to the current block;
determining a distance between the first reference location and the current sample as a first distance and determining a distance between the second reference location and the current sample as a second distance; and
generating a prediction value of the current sample using the linear interpolation prediction based on a sample value of the first reference sample, the first distance, a sample value of the second reference sample, and the second distance,
wherein the determining of the second reference sample value includes;
generating a bottom right reference sample by using a reference sample determined based on the intra-prediction direction; and
generating the samples of the right vertical line and the samples of the lower horizontal line based on the bottom right reference sample, a reconstructed top right sample and a lower left sample.

2. The method of claim 1, wherein the first distance is a distance determined based on a horizontal distance between a horizontal location of the current sample and a horizontal location of the first reference location and a distance between a vertical location of the current sample and a vertical location of the first reference location, and wherein the second distance is a distance determined based on a horizontal distance between a horizontal location of the current sample and a horizontal location of the second reference location and a distance between a vertical location of the current sample and a vertical location of the second reference location.

3. The method of claim 1, wherein the prediction value of the current sample is determined based on a value acquired by multiplying the first reference sample value by the second distance and a value acquired by multiplying the second reference sample value by the first distance.

4. The method of claim 1, wherein the prediction value of the current sample is determined by linear interpolation based on the first reference sample value, the first distance, the second reference sample value, and the second distance.

5. An apparatus for processing a video signal using intra prediction, the apparatus comprising:
a memory to store the video signal; and
a decoder functionally coupled to the memory and to decode the video signal,
wherein the decoder is configured to
check that intra prediction is applied to a current block including a current sample to be predicted,
determine a first reference sample value on a first reference location by linear interpolation of sample values of two samples among samples on an upper horizontal line and a left vertical line adjacent to the current block based on an intra-prediction direction of the current block,
determine a second reference sample value on a second reference location positioned in an opposite direction to the intra-prediction direction from a location of the current sample or the first reference location by linear interpolation of sample values of two samples among samples on a right vertical line and a lower horizontal line adjacent to the current block,
determine a distance between the first reference location and the current sample as a first distance and determine a distance between the second reference location and the current sample as a second distance, and
generate a prediction value of the current sample based on a sample value of the first reference sample, the first distance, a sample value of the second reference sample, and the second distance, and
wherein when determining the second reference sample value, the decoder is further configured to:
generate a bottom right reference sample by using a reference sample determined based on the intra-prediction direction; and
generate the samples of the right vertical line and the samples of the lower horizontal line based on the bottom right reference sample, a reconstructed top right sample and a lower left sample.

6. The apparatus of claim 5, wherein the first distance is a distance determined based on a horizontal distance between a horizontal location of the current sample and a horizontal location of the first reference location and a distance between a vertical location of the current sample and a vertical location of the first reference location, and wherein the second distance is a distance determined based on a horizontal distance between a horizontal location of the current sample and a horizontal location of the second reference location and a distance between a vertical location of the current sample and a vertical location of the second reference location.

7. The apparatus of claim 6, wherein the prediction value of the current sample is determined based on a value acquired by multiplying the first reference sample value by the second distance and a value acquired by multiplying the second reference sample value by the first distance.

8. The apparatus of claim 5, wherein the prediction value of the current sample is determined by linear interpolation based on the first reference sample value, the first distance, the second reference sample value, and the second distance.

9. A non-transitory computer-readable medium for storing encoded picture information generated by performing steps of:
checking that intra prediction is applied to a current block including a current sample to be predicted;
determining a first reference sample value on a first reference location by linear interpolation of sample values of two samples among samples on an upper horizontal line and a left vertical line adjacent to the current block, based on an intra-prediction direction of the current block;
determining a second reference sample value on a second reference location positioned in an opposite direction to the intra-prediction direction from a location of the current sample or the first reference location by linear interpolation of sample values of two samples among samples on a right vertical line and a lower horizontal line adjacent to the current block;
determining a distance between the first reference location and the current sample as a first distance and determining a distance between the second reference location and the current sample as a second distance; and
generating a prediction value of the current sample using the linear interpolation prediction based on a sample value of the first reference sample, the first distance, a sample value of the second reference sample, and the second distance,
wherein the determining of the second reference sample value includes:
generating a bottom right reference sample by using a reference sample determined based on the intra-prediction direction; and
generating the samples of the right vertical line and the samples of the lower horizontal line based on the bottom right reference sample, a reconstructed top right sample and a lower left sample.

* * * * *